United States Patent [19]

Tashiro et al.

[11] Patent Number: 4,901,229
[45] Date of Patent: Feb. 13, 1990

[54] PARALLELIZED RULES PROCESSING SYSTEM USING ASSOCIATIVE MEMORY FOR PIPELINED EXECUTION OF PLURAL JOIN OPERATIONS AND CONCURRENT CONDITION COMPARING

[76] Inventors: Tsutomu Tashiro, 1A, Albert Terrace, Edinburgh, United Kingdom, EH10 5EA; Norihisa Komoda, 3-1-9-203, Nijigaoka, Asao-ku, Kawasaki-shi, Kanagawa, Japan; Isao Tsushima, 7-5-18, Nishi-tsuruma, Yamato-shi, Kanagawa, Japan; Kuniaki Matsumoto, 8-39-22-231, Ooshima, Koto-ku, Tokyo, Japan; Kazuhiro Kawashima, 570, Futoocho, Kohoku-ku, Yokohama-shi, Kanagawa, Japan; Riyoji Maekawa, 4-36-5, Nagasawa, Tama-ku, Kawasaki-shi, Kanagawa, Japan

[21] Appl. No.: 820,386

[22] Filed: Jan. 21, 1986

[30] Foreign Application Priority Data

Jan. 21, 1985 [JP] Japan .................................. 60-8906
Jan. 25, 1985 [JP] Japan .................................. 60-12079
Oct. 11, 1985 [JP] Japan .................................. 60-224713
Oct. 21, 1985 [JP] Japan .................................. 60-233298

[51] Int. Cl.⁴ ...................... G06F 15/18; G06F 15/20; G06F 15/46; G06F 9/38
[52] U.S. Cl. .................................. 364/200; 364/221.9; 364/222.0; 364/274.5; 364/275.3; 364/259.1; 364/259.2; 364/221.0; 364/916.2; 364/921.0; 364/967.1; 364/947.2; 364/972.3; 364/513
[58] Field of Search ... 364/900 MS File, 200 MS File, 364/513, 130

[56] References Cited

U.S. PATENT DOCUMENTS

| | | | |
|---|---|---|---|
| 4,357,678 | 11/1982 | Davis | 364/900 |
| 4,497,039 | 1/1985 | Kitakami et al. | 364/900 |
| 4,514,826 | 4/1985 | Iwata et al. | 364/900 |
| 4,628,434 | 12/1986 | Tashiro et al. | 364/130 |
| 4,628,435 | 12/1986 | Tashiro et al. | 364/513 |
| 4,642,782 | 2/1987 | Kemper et al. | 364/513 |
| 4,644,479 | 2/1987 | Kemper et al. | 364/513 |
| 4,656,603 | 4/1987 | Dunn | 364/513 |
| 4,675,829 | 6/1987 | Clemenson | 364/513 |
| 4,704,695 | 11/1987 | Kimura et al. | 364/513 |
| 4,727,487 | 2/1988 | Masui et al. | 364/300 |
| 4,754,410 | 6/1988 | Leech et al. | 364/513 |

*Primary Examiner*—Williams, Jr. Archie E.
*Assistant Examiner*—Ayni Mohamed
*Attorney, Agent, or Firm*—Antonelli, Terry & Wands

[57] ABSTRACT

A plurality of devices for processing IF-THEN JOIN operation of IF-THEN rules are provided to process the JOIN operation in a pipe-line manner. A JOIN operation processing facility has an input buffer for latching status data corresponding to one condition in a certain rule; an associative memory for latching status data corresponding to another condition; an output buffer for latching the result of a JOIN operation; and a data combining arrangement for replacing an item value from the two data by a meaningful value to generate one data so that a series of operations of picking up the data one by one from the input buffer, retrieving associatively the data of the associative memory by using the data picked up as a retrieval data and the common item as a retrieval key, and storing in the output buffer the combined result of the data picked up and the retrieval data.

9 Claims, 49 Drawing Sheets

☒ : CONDITION COINCIDENCE JUDGING
☐ : JOIN OPERATION PROCESSING
▨ : CONCLUSION WRITING

TIME

TIME

FIG. 6(a)

| ENTRY OF STATUS SIGNAL LINE | NUMERIC CODE | PARAMETER PART |
|---|---|---|
| ADDRESS A | 1 | \<x\> |
| ADDRESS B | 8 | \<1\> |

FIG. 6(b)

| ENTRY OF COMMAND SIGNAL LINE | NUMERIC CODE | PARAMETER PART |
|---|---|---|
| ADDRESS C | 9 | \<1\>\<x\>\<z\> |
| ADDRESS D | 10 | \<1\>\<ASSEMBLING A\> |

FIG. 7(a)

| ENTRY OF STATUS SIGNAL LINE | NUMBER OF RULE GROUPS TO BE TRIGGERED |
|---|---|
| ADDRESS A | 1 |
| ADDRESS E | 2 |

FIG. 7(b)

| TRIGGERED RULE GROUP NUMBER |
|---|
| |

FIG. 8(a) — Table 91

| HEAD POSITION OF RULE GROUPS | THE LAST POSITION OF RULE GROUPS |
|---|---|
| 1 | 4 |
| 5 | 7 |

No.1 →  
No.2 →

FIG. 8(b) — Table 92

| RULE TYPE | EVALUATED RULE FLAG | IF PART | | | THEN PART | | |
|---|---|---|---|---|---|---|---|
| | | EVALUATED CONDITION FLAG | NUMERIC CODE | PARAMETER PART | PROCEDURE NAME | NUMERIC CODE | PARAMETER PART |
| 0 | 1 | 1 | 1 | $\langle x \rangle$ | | 2 | $\langle x \rangle$ |
| 0 | 1 | 1 | 6 | $\langle z \rangle \langle x \rangle$ | $\langle minz \rangle$ | 7 | $\langle z \rangle$ |
| | | 1 | 8 | $\langle 1 \rangle$ | | 9 | $\langle 1 \rangle \langle x \rangle \langle z \rangle$ |
| | | 1 | 7 | $\langle z \rangle$ | | 10 | $\langle z \rangle \langle y \rangle$ |
| 1 | | | 2 | $\langle x \rangle$ | | | |
| | | | 4 | $\langle x \rangle \langle y \rangle$ | | | |

FIG. 9(c)

| W | X | Y | Z |  |
|---|---|---|---|---|
|   |   |   | 2 | ~106 |
|   |   |   |   |   |

| W | X | Y | Z |  |
|---|---|---|---|---|
|   |   | 3 | 2 | ~109 |
|   |   |   |   |   |

FIG. 9(d)

ASSEMBLING A

| W | X | Y | Z |  |
|---|---|---|---|---|
|   |   |   | 1 | ~107 |
|   |   |   | 1 |   |
|   |   |   | 2 |   |
|   |   |   |   |   |

PARTS-MANUFACTURING · ASSEMBLING B   ASSEMBLING A

ASSEMBLING A

| W | X | Y | Z |  |
|---|---|---|---|---|
|   |   |   |   | ~110 |
|   |   |   |   |   |
|   |   |   |   |   |
|   |   |   |   |   |

FIG. 9(e)

| THE FIRST RULE PROCESSING FLAG | THE SECOND RULE PROCESSING FLAG |  |
|---|---|---|
| 1 | 0 | ~108 |

PARALLELIZED RULES PROCESSING SYSTEM USING ASSOCIATIVE MEMORY FOR PIPELINED EXECUTION OF PLURAL JOIN OPERATIONS AND CONCURRENT CONDITION COMPARING

BACKGROUND OF THE INVENTION

The present invention relates to a rule processing system and, more particularly, to a rule based system which is suitable for either a control system selecting control commands for facilities by for judging a condition in accordance with control logic described in rules and the statuses of the grouped individual facilities or a production planning system for retrieving an order and a material from given order and material data in accordance with production planning logics described in the rules.

In an FA (i.e., Factory Automation) system, changes in the production line and in its use are frequently conducted in accordance with shortening of the lifecycle of products and diversity of the kinds of the products. This makes it necessary to develop and maintain the control programs promptly.

In the prior art, there has been adopted a method by which the control programs are developed in a general purpose language such as FORTRAN. However, this method has failed to satisfy the above need because it takes much time and requires special programmers to develop, understand and change the control programs. Therefore, we have proposed the "facility group control system" (as is disclosed in U.S. Pat. No. 4,628,434) which is easy to describe, and in which it is easy to understand and change the logics. The above-specified system is called a rule based system which can prepare the programs merely by describing the logics in an arbitrary Japanese letter array into the rule type of "IF (condition) and THEN (conclusion and operation)" (which will be shortly referred to as an "IF-THEN rule" or more shortly as the "rule"). In this system it is easy to develop the programs, and excellent for understanding and changing the logics. According to the above-specified proposal, the rules can be processed at a high speed by coding and handling the information of a letter array representing the condition, conclusion and operation of the rules and the status of a target.

The application of that rule based system is advancing to a large-scaled FA such as an automated warehouse system or a production plan but requires much time for executing the rules and has a poor response time. A first problem in the conventional system is that the time period required for judging one rule condition and the time period for obtaining a final conclusion are increased if the number of the rules necessary for obtaining the final conclusion or the number of the target statuses is increased, because the condition judgement as to whether or not there is present a value meeting simultaneously all the conditions described in the IF part is conducted by picking up the rules one by one. More specifically, there arises no problem in case one group to be processed is composed of about ten facilities, but a practically sufficient processing speed cannot be expected for a production plan handling one hundred and more target statuses or for shelf determination of the automated warehouse.

The facility group control system of the above-referenced Patent is simple in construction, because it picks up the rules one by one for processings, but it processes rules serially even if these rules could be processed in parallel. More specifically, the rules without the relation, in which the conclusion of one rule is used for judging the condition of another rule, i.e., the independent rules may be processed at any time, in any order and simultaneously, but they cannot be processed in parallel according to the method of the referenced Patent. This makes it impossible to retain a sufficient processing speed in accordance with increase in the condition judgement time per one rule due to the increases in the number of the rules and in the target statuses. Therefore, the proposed rule based system takes an outstanding time for processing a large-scaled target having several hundreds of rules or several hundreds to thousands of statuses so that it has been found difficult to apply that system to a large-scaled target.

A second problem is that the time for JOIN operation to generate a variable value meeting and the AND condition is increased in proportion to the product of the numbers of the variable values because of the variable values picked up have to be combined for judgement; therefore, it obstructs the processing speed. The algorithm of the JOIN arithmetic by the conventional programs is exemplified by the proposed rule based system or a system which is disclosed in papers such as "High-Speed Algorithm by Order Maintaining Hash Function: Data Processing Theses, Vol. 15, No. 1, pp 59 to 65, Jan. (1984)". All the systems cannot be expected to have a sufficient processing speed in case the JOIN algorithm is required for many data, because all of them resort to sequential processing using the programs. As a result, those systems raises no problem, when the number of the target statuses corresponding to the conditions described in the IF part is small, but is troubled by the outstanding processing required for the objects having a status number of several hundreds or thousands.

SUMMARY OF THE INVENTION

A first object of the present invention is to provide a rule based system which is able to execute rules in parallel to apply the rule based system to target systems required to handle many rules and statuses and to have a quick response.

A second object of the present invention is to provide a rule based system which can execute the JOIN algorithm with high efficiency.

In order to achieve the above-specified first object, at least two devices for executing the processings of the JOIN operation of the rules are provided so that the rules may be processed in parallel by executing the condition comparing processing of an arbitrary rule while the JOIN operation processing of another rule is executed by one of the devices and after the condition comparing processing the JOIN operation processing is executed by the other device.

In order to achieve the above-specified second object, in a JOIN algorithm for preparing from two sets of data which coincide with each of two condition described in one rule, a set of data composed of all the combinations of said two sets of data having an equal value corresponding to the common item of said two conditions, there is provided a JOIN operation processing device for a rule based system having an input buffer for holding one of said data; an associative memory for holding the other data; an output buffer for holding the result of said JOIN algorithm; and a data superposing device for changing an item value from the two data into a meaningful value to prepare one data, so that a series of operations for picking up the data one by one from the input buffer, associatively retrieving the data of the associative memory a while using a retrieval data as the data picked up and the common item as a retrieval key, and storing the superposed result of the data picked up and the retrieval data in the output buffer are executed repeatedly.

BRIEF DESCRIPTION OF THE DRAWINGS

FIG. 6a-b is a detailed diagram showing an I/O signal vs internal code information memory part;

FIG. 7a-b is a detailed diagram showing an IF-THEN rule trigger event memory part;

FIG. 8a is a diagram showing rule groups memory part

FIG. 8b is a detailed diagram showing an IF-THEN rule memory part;

FIG. 9c-d is a detailed diagram showing variable value memory part;

FIG. 9e is a detailed diagram showing rule flag memory part

DETAILED DESCRIPTION OF THE PREFERRED EMBODIMENTS

First of all, the principle of the present invention will be described in the following.

Figure 2:
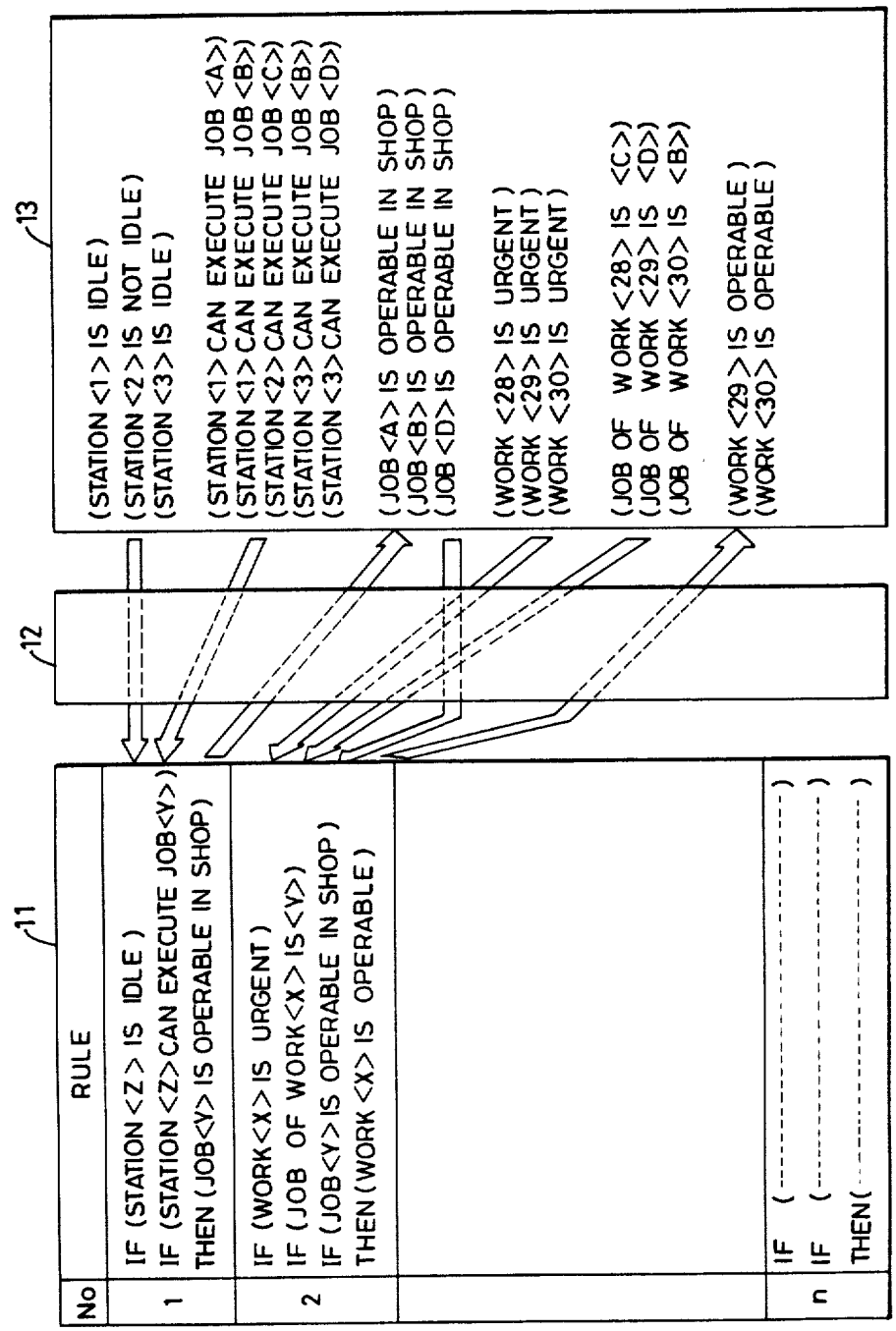
FIG. 2 is a diagram for explaining the operations of the rule based system according to U.S. Pat. No. 4,628,434.

FIG. 2 is a block diagram showing the functions of a rule based system. According to the principle, the process of using the conclusion of a certain rule for judging the condition of another rule is repeated until the condition of the rule having an operation (or a control command) described in the THEN part of the rule is satisfied to determine the control command. In FIG. 2, more specifically, a rule application part 12 retrieves the rules one by one from a rule memory part 11 and compares the content of a status memory part 13 storing a target status with the condition of the IF part of the rule retrieved thereby to judge whether or not the condition is satisfied. If the condition is satisfied, the conclusion of the THEN part of the rule retrieved is added to the status memory part 13. Here, in the condition judgement of the IF part, it is judged whether or not all the sentences (or statuses) coincident with the individual IF sentences (or conditions) stored in the IF part exist in the status memory part 13. For variables (such as x, y or z), it is determined moreover, whether or not a value meeting all the condition described in the IF part exists.

Figure 3:
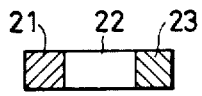
FIG. 3 is a diagram showing the processed content of one rule.

FIG. 3 is a diagram representing the content of processing of one rule. In FIG. 3, reference numeral 21 indicates a condition coicidence judging process (i.e., a process for judging the coincidence between each condition of the IF part and the target status); numeral 22 an JOIN operation process (i.e., a process for judging all conditions in a Rule of the idle IF part and generating variables meeting the AND logic); and numeral 23 a conclusion writing process (i.e., a process for writing the conclusion of the THEN part), and the processings are conducted in the order recited above.

Figure 4:
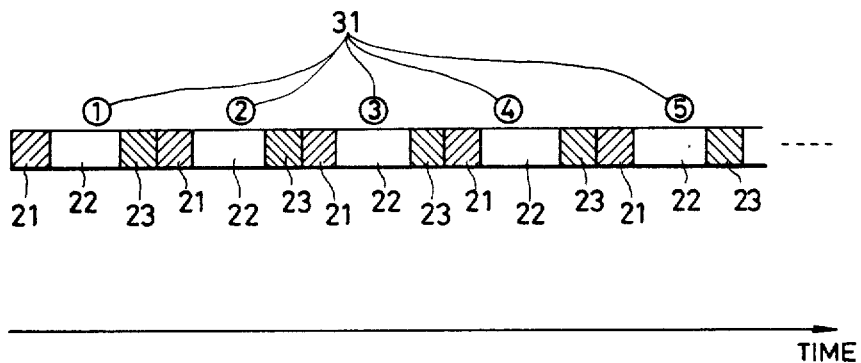
FIG. 4 is a diagram showing the status in which five certain rules are processed by the processing system of the referenced U.S. Pat. No. 4,628,434.

FIG. 4 is a diagram showing the process in which five rules (1) to (5) are processed by a method of the prior art.

Reference numeral 31 indicates a rule number. In the conventional method, the condition coincidence judging process 21 of the five rules (1) to (5), the JOIN operation process 22 and the conclusion writing process 23 are arrayed serially for the serial processings. Thus, according the conventional method, the condition coincidence judging process 21 of the rule (1) and the JOIN operation process 22 are conducted, and the conclusion writing process 23 is then conducted if the condition is satisfied. Next, the processes are executed all serially in the order of 21, 22 and 23 for the rule (2), too. This takes a time period five times as long as that for the one rule processing.

Figure 5:
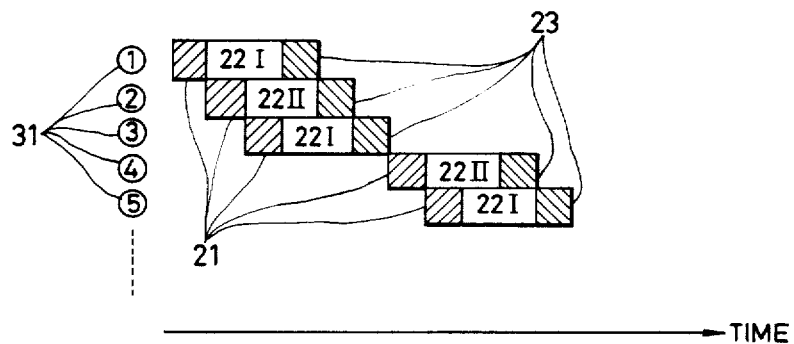
FIG. 5 is a diagram showing the status in which the same five rules as those of FIG. 4 are processed by the system of the present invention.

FIG. 5 is a diagram showing sequentially the status in which the five rules are processed by the method of the present invention.

Reference numerals I and II in the box of the JOIN operation process 22 of FIG. 5 indicate the discriminators of a device especially for the JOIN operation processing. In the present invention, there is separately provided a device for processing the JOIN operation of the IF part, by which the condition coincidence judgement for another rule is conducted, while the JOIN operation of one rule is being processed, so that the plural rules may be processed in parallel to improve the overall processing rate.

In the present invention, as shown in FIG. 5, the condition coincidence judging process 21 of the rule (1) is first conducted, and then the JOIN operation process 22 is conducted in the especial device I. For this period, i.e., until the process of the especial device I is terminated, the condition coincidence judging process 21 of the IF part for the individual rules is conducted sequentially, and the AND logic process 22 is conducted by making use of the other idle especial device II. For this processing period, too, the condition coincidence judging process 21 of a subsequent IF part is conducted. Thus, the pipe-line type process is conducted by using the especial devices I and II alternately. Since this case exemplifies the example in which the JOIN operation process 22 takes a time period just two times as long as that of the condition coincidence judging process 21, the condition coincidence judging processes 21 of the rules (2) and (3) are conducted prior to the time period for which the JOIN operation process 22 of the rule (1) is being conducted. When the process of the especial device I processing the rule (1) is terminated, the conclusion writing process 23 is conducted if all conditions in a rule are satisfied by the result of the terminated process. Otherwise, the condition coincidence judging process 21 of a subsequent rule is then conducted. In this case, the especial device I becomes idle after the end of the JOIN operation process 22 of the rule (1) so that it is then used for the JOIN operation process 22 of the rule (3). Thus, by conducting the process of the subsequent rule while the JOIN operation process 22 of a certain rule is being executed by the especial device, the rules can be processed in parallel to shorten the process time required for obtaining the last conclusion.

Figure 1:
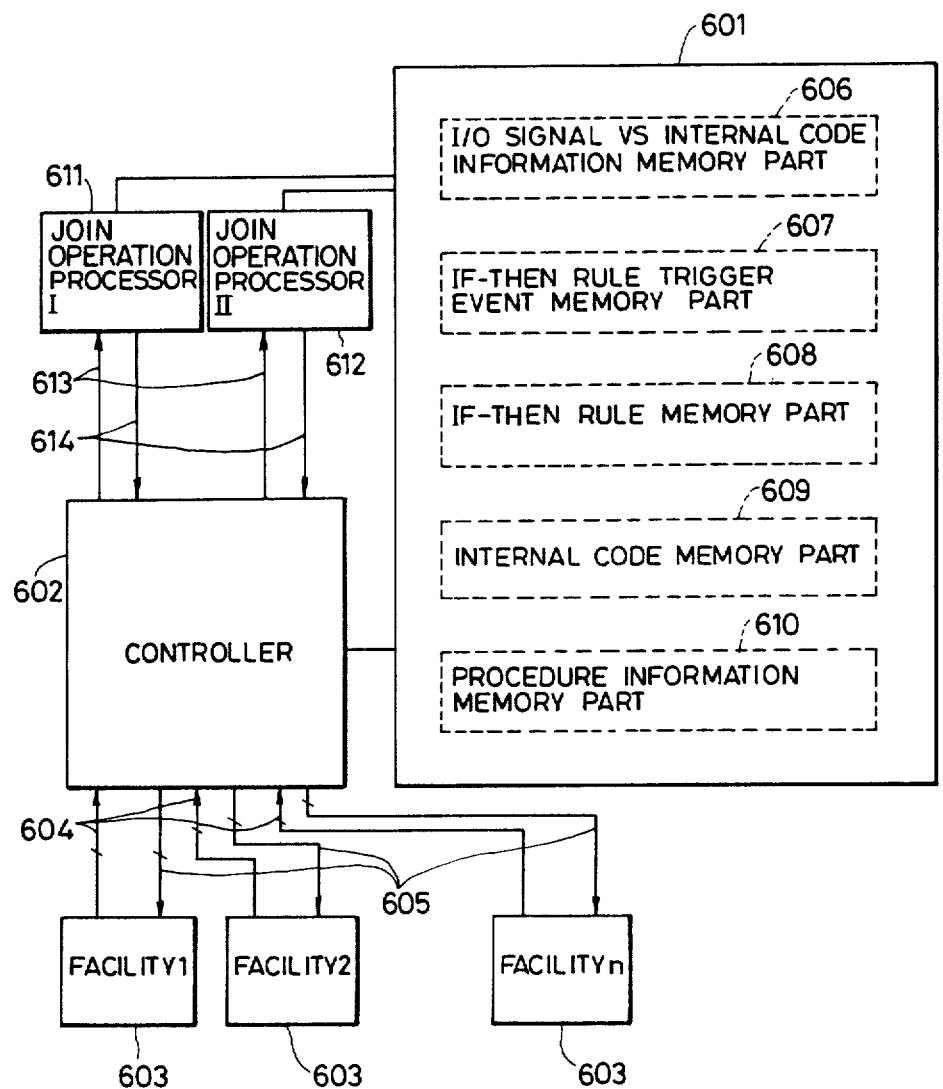
FIG. 1 is a block diagram showing a facility group control system according to one embodiment of the present invention.

FIG. 1 is a block diagram showing a facility set control system according to a first embodiment corresponding to a first object of the present invention.

The control system is constructed of a memory 601, a controller 602, an AND logic processor (I) 611, an JOIN operation processor (II) 612, facility groups 603, trigger signal lines 613, end signal lines 614, status signal lines 604 and command signal lines 605. The memory 601 is composed of a plurality of information memory parts, i.e., formed with areas for an I/O signal vs internal code information memory part 606, IF-THEN rule trigger even memory part 607, IF-THEN rule memory part 608, an internal code memory part 609 and a procedure information memory part 610. The memory 601 is a part for storing the data such as the internally coded IF-THEN rule or the correspondence table of an external signal and an internal code. The controller 602 incorporates a status signal indicating the status of the facility groups 603 through the signal lines 604 on the basis of the information stored in the memory 601 and determines a control command to transmit control signals to the facilities, respectively, through the signal lines 605.

FIG. 6 is a diagram explaining the I/O vs internal code information memory part 606 shown in FIG. 1. FIG. 6(a) shows the correspondence table of the input signals and the internal codes whereas FIG. 6(b) shows the correspondence table of the internal codes and the output signals.

That memory part 606 is a part for storing both the external signals coming from the status signal lines 604 and the command signal lines 605 shown in FIG. 1 and the information for the interface between the internal processings. An input signal vs internal code correspondence table 71 shown in FIG. 6(a) is a table for storing information to be used for transforming the signals of the status signal lines 604 to the internal codes to be handled by the controller, and is constructed of a status signal line entry area for storing the entry addresses of the status signal lines 604, a numeric code area for storing the internal codes representing the facility statuses corresponding to the case in which the signals are generated in those signal lines 604, and a parameter part area. The controller 602 accesses the individual status signal lines on the basis of the data of that table 71 to prepare an internal code corresponding to a signal, if any. The internal code thus prepared is stored in the internal code memory part 609. Here, in case the signals of the status signal lines 604 bear binary ON-OFF information, the controller 602 retrieves the internal code as it is stored in the table 71, thus preparing the internal code. For example, that case is exemplified by the internal code of an addresses B of FIG. 6(a). In case the information of the status signal line 604 is numeric one such as bar code information read out, there is prepared the internal code in which the numeric one is written in such a parameter part of the internal code stored in the table as have variables (W, X, Y, Z and so on) nominated. For example, this case is exemplified by the internal code of an address A of FIG. 6(a). In case numeric information 34 is generated in the status signal line address A, more specifically, the controller 602 prepares the internal code "1<34>" shown in FIG. 9(a) and (b)). This internal code "1<34>" indicates that a work No. 34 exists at the head of a work supply line of an automated factory, for example.

Next, in FIG. 6(b), an internal code vs output signal correspondence table 72 is one for storing information for transmitting control signals to the facility groups 603 through the command signal lines 605 on the basis of the internal codes indicating the control commands determined by the controller 602. Incidentally, the internal code indicating the control command is stored in the internal code memory part 609.

The table 72 is formed with a numeric code area for storing the internal codes indicating the control commands, a parameter part area and a command signal entry area for storing the entry addresses of the command signal lines 605 for transmitting those control commands. The controller 602 compares the internal code indicating the control command determined and the internal code stored in that table 72 to generate a signal to the command signal line 605 corresponding to the coincident internal codes. In this case, if there is no designation of the variables (W, X, Y, Z and so on) in the parameter part in the internal code stored in that table 72, the binary ON-OFF signal is outputted onto the corresponding signal line address. The case, in which the binary signal is outputted, corresponds to an address D of FIG. 6(b), for example, In case there is a designation of a variable, on the other hand, the value of the parameter corresponding to that variable in the internal code indicating the control command determined is outputted onto the signal line address. For example, if the internal code expressing the control command determined is "9 1 34 1", the values 34 and 1 are outputted in the recited order onto a signal line address C. That internal code "9 1 34 1" means a control command instructing a conveyor truck of the automated factory to carry the work No. 34 to the station 1.

FIG. 7 is a diagram explaining the detail of the IF-THEN rule trigger event memory part 607 of FIG. 1. FIG. 7(a) is a table of rule groups trigger logics, and FIG. 7(b) is an area for storing a rule group number used.

This memory part 607 is for storing the information nominating a series of rules to be triggered in accordance with the condition of the facility set established. Here, the phrase "to be triggered" means the phrase "to be used when the controller 602 determines a control command". For example, in case a work is present at the head of the work supply line in the control of the automated factory, a rule set for assigning the work to the working station is triggered to determine a carrying command to the truck and a working command to the working station. In case the working operation is completed at a certain working station, on the other hand, the rule set for delivering the product is triggered, and a product delivering command to the truck is determined. A rule set trigger control table 81 is one for storing the information for nominating the rule set to be triggered, which corresponds to each status of the facility groups 603 established, as has been described hereinbefore. That table 81 is formed with an entry area of status signal lines for storing the entry address of the status signal lines 604 corresponding to the facility status the establishment of which is to be observed, and a number of the rule groups to be triggered when a signal is generated on those signal lines 604. A used rule set number storing area 82 is one for storing the number of the rule set which is to be used by the controller 602. This controller 602 polls each status signal line 604 on the basis of the data of the rule set trigger condition table 81 and stores the trigger rule set number corresponding to that signal line 604 in the used rule set number storing area 82 in case a signal is generated, until it shifts to a subsequent process.

FIG. 8 is a diagram explaining the detail of the IF-THEN rule memory part 608 of FIG. 1, and FIG. 8(a) is a directory of the rule groups whereas FIG. 8(b) is a rule table. That memory part 608 is a part for storing the information concerning the IF-THEN rule having the control condition described with the control condition. Since the IF-THEN rule is handled in an internal code, according to the present invention, that memory unit 608 stores the IF-THEN rule internally coded. The rules are stored after they have been divided into groups such as a rule set for assigning the work to the working station or a rule set for delivering the product.

A rule set directory 91 is composed of a rule set head position area for nominating the head position of each rule group on a rule table 92 which stores the IF-THEN rules. The rules are stored for the respective groups between the head position and the last position. The numbers of the respective rule groups correspond to those of the rows of the rule set directory 91.

In the rule table 92, each rule has its internal codes divided into IF and THEN parts, which are stored in the IF part area and the THEN part area, respectively. The IF part area is further composed of a numeric code area for storing the numeric codes of the internal codes, a parameter part area for storing parameter parts, and an evaluated condition flag area (in which 1: evaluated; and blank: unevaluated) indicating whether or not the condition for each internal code of the IF part of each rule has been checked. On the other hand, the THEN area is formed with a numeric code area for storing the numeric codes of the internal codes, a parameter part area for storing parameter parts, and a procedure name area for storing the procedure names nominated in the IF-THEN rule. In correspondence to each rule, moreover, there are formed a rule Type area and a evaluated rule flag area. The rule Type is composed of a rule for determining the control command finally and information for discriminating another rule so that it designates the rule Type area. The rule for determining the control command finally is designated at 1 whereas the other rules are designated at 0. This information is used for discriminating which conclusion expresses the control command attained finally when the conclusion (or the internal code) of the THEN part is sequentially decided for the controller to evaluate the control command. On the other hand, the evaluated rule flag area indicates that it has executed evaluation of the rule in case it is at 1 and that it has not yet in case it is blanked. The evaluated rule flag area and the evaluated condition flag area are administered by the controller 602.

Figures 9A, 9B:
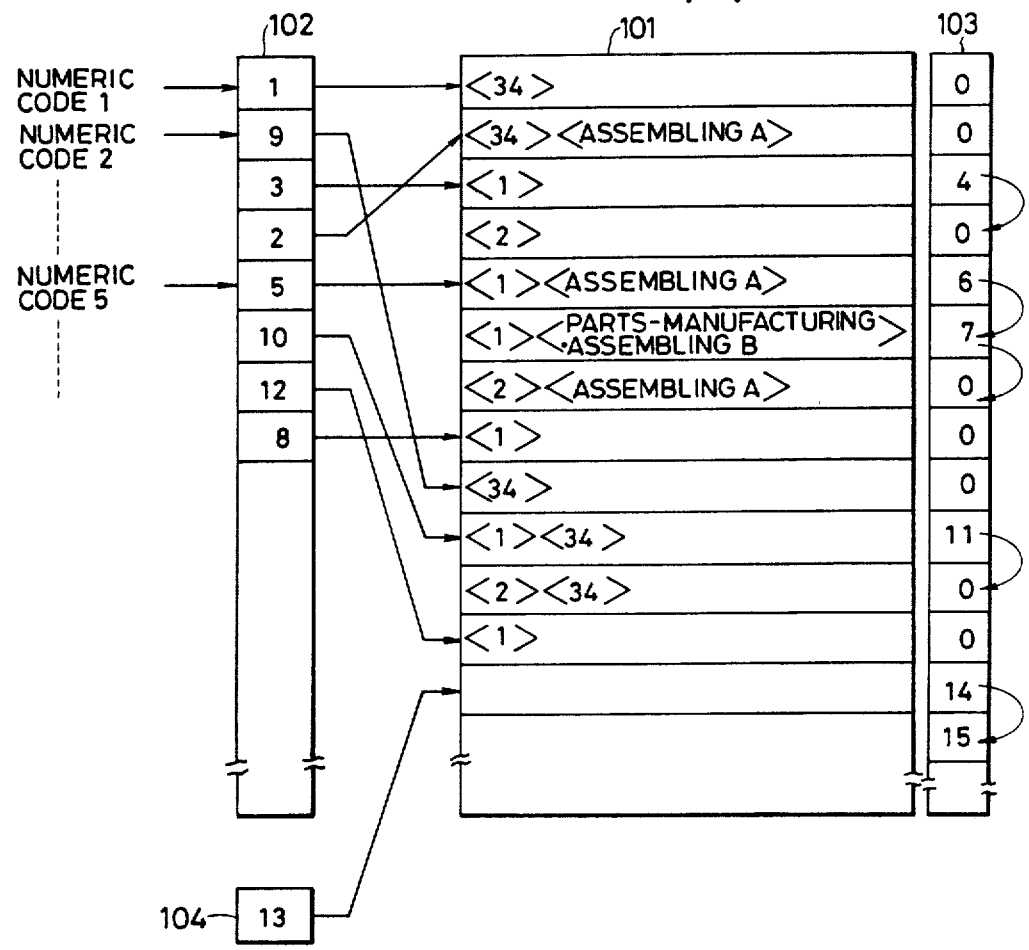
FIG. 9a-b is a detailed diagram showing pointer and control command memory part.

FIG. 9 is a diagram explaining the detail of the internal code memory part 609 of FIG. 1. FIG. 9(a) is a head pointer table and a continuing pointer table; FIG. 9(b) is a control command storing table; FIG. 9(c) is variable value temporarily storing tables I and II; FIG. 9(d) is AND condition met variable storing tables I and II; and FIG. 9(e) is a parallel processing rule flag table.

This memory part 9 is a part for storing pieces of information such as the conclusion (i.e., the internal code) of the THEN part decided sequentially and the control command (i.e., the internal command) determined finally, when the control command is to be determined on the basis of the internal code expressing the status of the facility set incorporated and the IF-THEN rule, the value of the variable to be incorporated when the IF-THEN rule including the variable is to be processed, or the information concerning the rules being processed in parallel. A parameter part storing table 101, a head pointer table 102 and a continuing pointer table 103 are a set of work tables for storing the sequentially decided conclusions (except the finally decided control command of the internal codes nominated in the THEN part) upon processing both the internal codes expressing the status of the facility groups incorporated from the outside and the IF-THEN rules. The parameter part storing table 101 is one for storing the parameter parts of the individual internal codes. The continuing pointer table 103 is one for storing the continuing pointers coupling the respective parts of the internal codes having an identical numeric code. The respective rows of the continuing pointer table 103 corresponding to the respective rows of the parameter part storing table 101 store the positions of the rows of the parameter part storing table 101, which in turn store the parameter parts of the continuing subsequent internal codes. It is indicated by storing the value "0" in the continuing pointer table 103 that the position is located at the last of the continuing parameter part. On the other hand, the head pointer table 102 is for storing the head pointer. This head pointer indicates the head of the parameter part of the internal code having an equal numeric codes coupled by the continuing pointer. Each row of the head pointer table 102 corresponds to each numeric code. More specifically, the numeric codes 1, 2 and 3 correspond to the first, second and third rows, respectively. The position of the head row of a series of parameter parts having the identical numeric code stored in the parameter part storing table 101 is stored in the head pointer table 102. Incidentally, the idle area position is administered by storing the head row of the idle area of the parameter part storing table 101 in an idle area head pointer area 104, by coupling all the idle areas by the pointer, and by storing that pointer information in the continuing pointer table 103.

A control command storing table 105 shown in FIG. 9(b) is one for storing the internal codes expressing the control command determined finally by the control part 602. This table 105 is formed with a numeric code area for storing the numeric codes of the internal codes of the control commands determined, and a parameter part area for storing the parameter parts. On the other hand, a variable value temporary storing table (I) 106, a variable value temporary storing table (II) 109, an AND condition met variable value storing table (I) 107, and an AND condition met variable value storing table (II) 110 of FIGS. 9(c) and 9(d) are those for evaluating the IF-THEN rules including the variables. In order to evaluate two rules simultaneously in parallel, tables I and II are prepared. The variable value temporary storing tables (I) 106 and (II) 109 are tables for storing the parameter values of the parameter parts of the internal codes corresponding to the internal codes stored in the work table groups (i.e., the head pointer table 102, the parameter part storing table 101 and the continuing pointer table 103), i.e., the internal codes nominated in the IF part of the rule, which are incorporated as the variable values corresponding to the parameter parts of the internal codes of the IF parts of the rule, when the coincidence of the internal codes stored in the work table groups is judged. Whether or not the internal codes stored in the work table groups are coincident with the internal codes nominated in the IF parts of the rules is judged by the numeric codes of the internal codes and the parameter parts except the variable nominated parameter. The AND condition met variable value storing tables (I) 107 and (II) 110 are tables for storing such variable values picked up by JOIN operation satisfy the AND condition of the IF part. Of those tables, the tables indicated at I follow the processing of a first one of the two rules being processed in parallel and is processed by the JOIN operation processor (I) 611. The tables II is used for processing the second rule and is processed by the JOIN operation processor (II) 612. The rule flag table 108 in the parallel processing of FIG. 9(e) is used to store the information concerning the processed status of the rule and is formed with first and second rule processing flag areas for indicating that the rules are being processed by the use of the JOIN operation processors I and II, when they are at "1", and that the rules are not being processed, when they are at "0".

Figure 10:
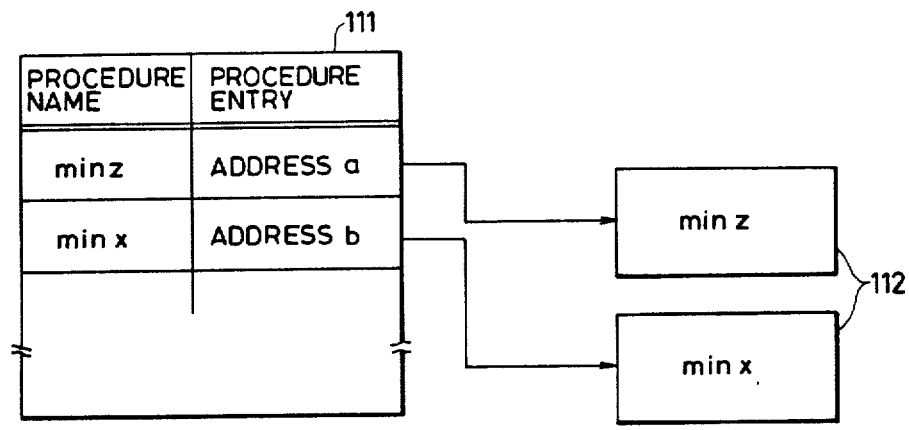
FIG. 10 is a detailed diagram showing a procedure information memory part.

FIG. 10 is a diagram explaining the detail of the procedure information memory part 610.

This memory part 610 is a part for storing both the body of the procedure nominated in the IF-THEN rule and the entry address of the same. The procedure entry table 111 is formed with a procedure name area for storing the individual procedure names and a procedure entry area for storing the entry addresses of those procedures. These individual procedures 112 are stored in the entry address positions nominated in the procedure entry table 111.

Figure 11:
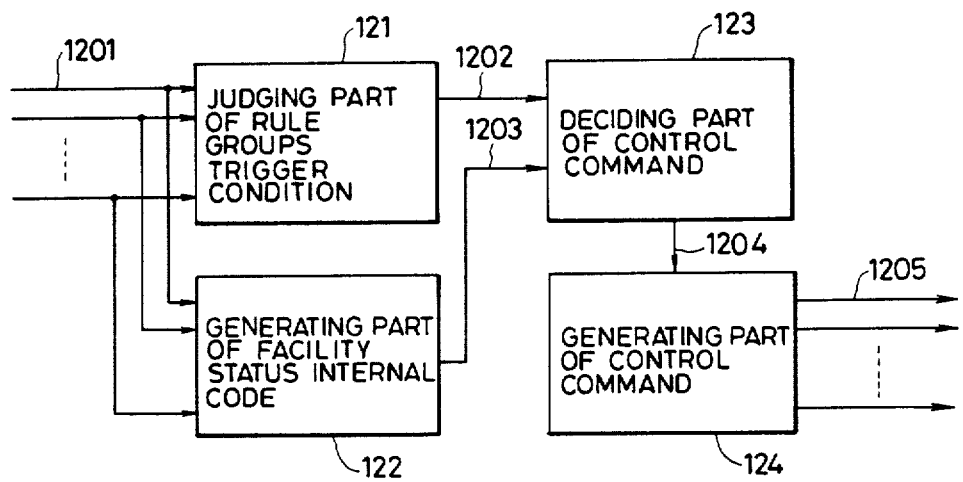
FIG. 11 is a block diagram showing the functions of a controller.

FIG. 11 is a function block diagram of the controller 602 of FIG. 1.

This controller 602 is constructed of a a judging part 121 of rule groups trigger conditions, a generating part 122 of facility status internal codes, a deciding part 123 of control commands, and a generating part 124 of control commands. Information flows 1201, 1202, 1203, 1204 and 1205 indicate a status signal, a rule set number, a facility status internal code, a control command internal code and a command signal.

Figure 12:
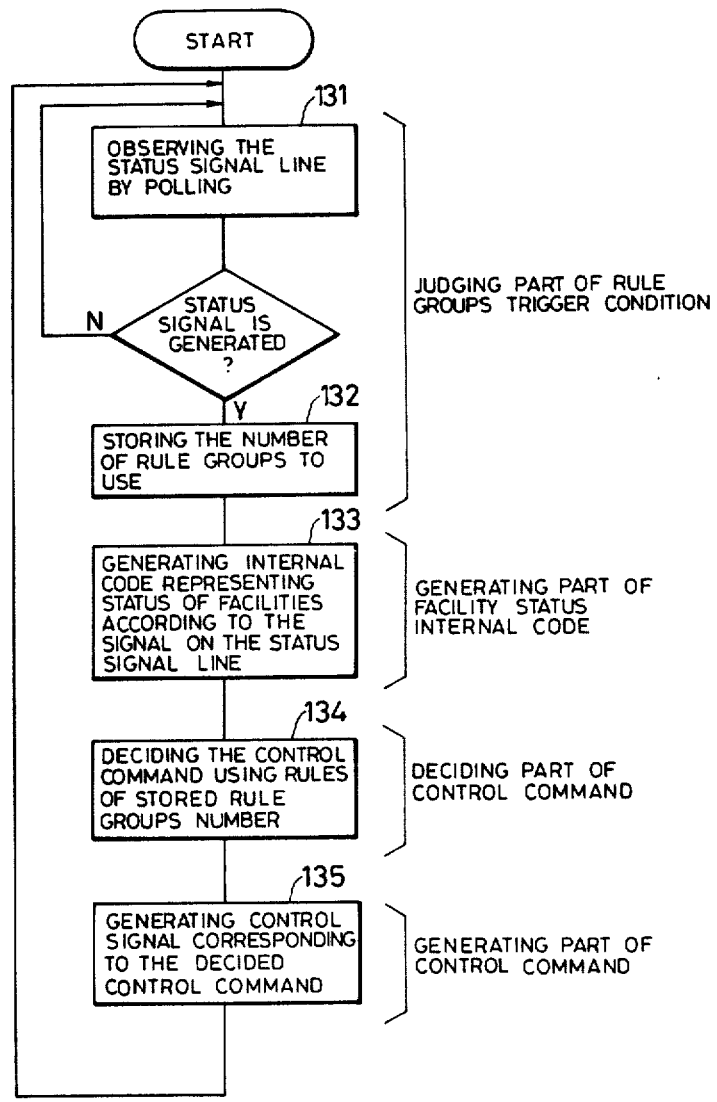
FIG. 12 is a flow chart showing the operations of the controller.

FIG. 12 is a flow chart showing the operations of the controller 602 of FIG. 1.

The operations of the controller 602 will be described in the following with reference to the constructions of FIGS. 7 to 12 in accordance with FIG. 12. In the descriptions, incidentally, the triggers of the JOIN operation processors (I) 611 and (II) 612 are conducted in response to the trigger signals of the trigger signal lines 607, and the ends of the operations of the present processor can be known by the end signals of the end signal lines 608.

When the controller 602 starts its operations, the polling of the status signal lines 604 is first started by the rule set trigger condition judging part 121.

More specifically, the rule set trigger condition judging part 121 sequentially accesses the signal lines of the status signal line entry, which is stored in the rule set trigger condition table 81, to examine whether or not the status signal is generated (at a block 131). If NO, the judging part 121 continues the access of the signal lines 604 cyclically and sequentially. If YES, in the rule set trigger condition table 81, the trigger rule set number 1202 nominated in a manner to correspond to the signal lines 604 is set in the used rule number storing area 82 to trigger the facility status internal code generating part 122 (at a block 132). This facility status internal code generating part 122 first clears the head pointer area 102 to zero and sets the value of the vacant area head pointer area 104 at "1". In other words, the pointer is set at the head of the parameter part storing table 101. Moreover, the continuing pointer table 103 is so set that all the rows of the parameter part storing table may be coupled from the first row by the pointer. In other words, the status is that no internal code information is stored in the work table groups (e.g., the head pointer table 102, the parameter part storing table 101 and the continuing pointer table 103). Next, the signal lines of the status signal line entry stored in the input signal vs internal code table 71 are accessed sequentially to generate the internal codes (i.e., the numeric codes and the parameter parts), which are nominated in the input signal vs internal code table 71 in a manner to correspond to the signal line having the signal generating therein, for this signal line (as shown in FIG. 7) and to store them in the work table groups thereby to trigger the control command deciding part 123 (at a block 133). Here, the storage of the internal codes generated in the work table groups is conducted in the following manner. First of all, the pointer of the row of the head pointer table 102 corresponding to the numeric code of the internal code generated is followed, and it is examined by following the pointer of the continuing pointer table 103 to determine whether or not the pointer coincident with the parameter part of the internal code generated is stored in the parameter part storing table 101. No operation is conducted if the coincident one has already existed. If NO, on the contrary, the row of the parameter part storing table 101, which is nominated by the last one of the pointers followed (or by the continuing pointer before this takes the zero value), is coupled to the head row of the vacant area. In other words, the value of the vacant area head pointer area 104 is set in the row of the continuing pointer table 103 corresponding to the aforementioned row. Next, the parameter part of the internal code generated is stored in the head row of the vacant area, and this row is changed to the last one. The control command deciding part 123 determines the internal codes representing the control commands in the procedures, as will be described in the following, to trigger the control command generating part 124 (at a block 134). Incidentally, if the statuses of the facility groups fail to satisfy the condition of the control logic described in the IF-THEN, nothing is stored in the control command storing table 105. The control command generating part 124 first examines whether or not the control command internal codes are stored in the control command storing table 105. If NO, the generating part 124 conducts no operation to trigger the rule set trigger condition judging part 121 and restarts the polling (at the block 131). If YES, on the contrary, those internal codes are compared with the internal codes stored in the internal code vs output signal table 72 to generate signals for the signal lines of the corresponding command signal line entries of the coincident rows (as shown in FIG. 7). After the aforementioned signal generating process has been conducted for all the internal codes stored in the control command storing table 105, the rule set trigger condition judging part 121 is started (at a block 135) to restart the polling (at the block 131).

Figure 13:
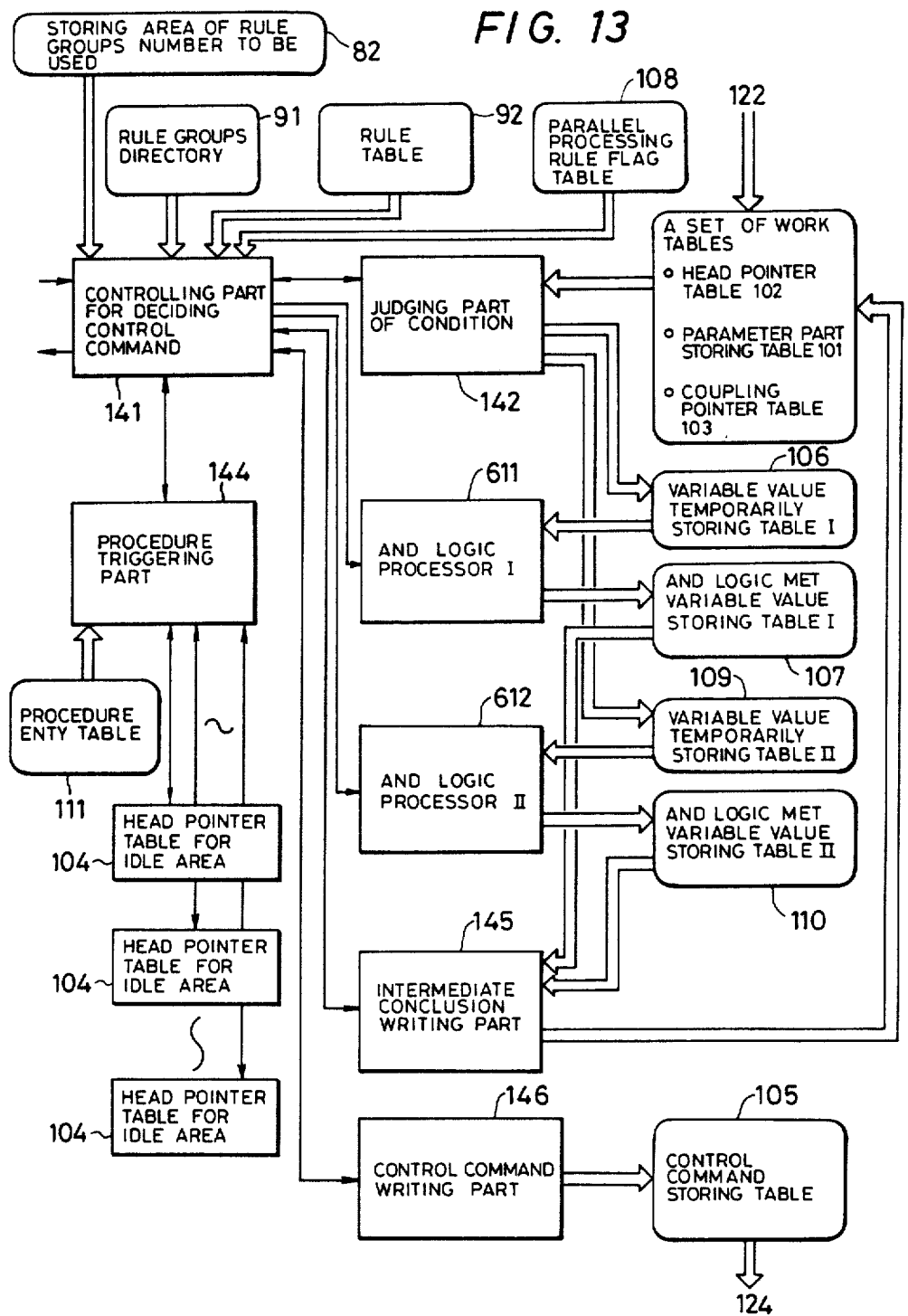
FIG. 13 is a flow chart showing the relations between the function blocks of a control command deciding part and individual tables.
Figure 14A:
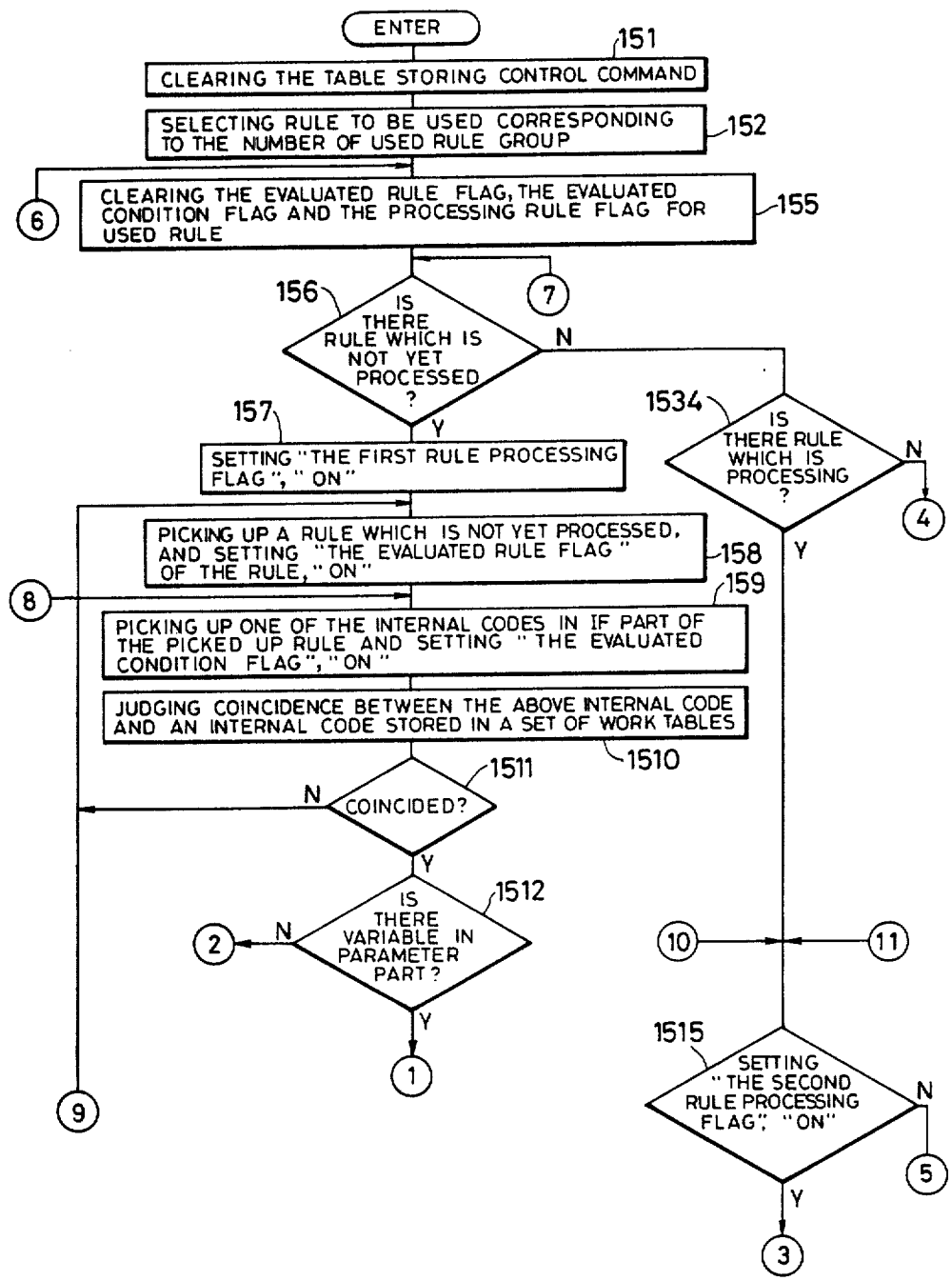
FIG. 14a-c is a flow chart showing the operations of the control command deciding part.
Figure 14B:
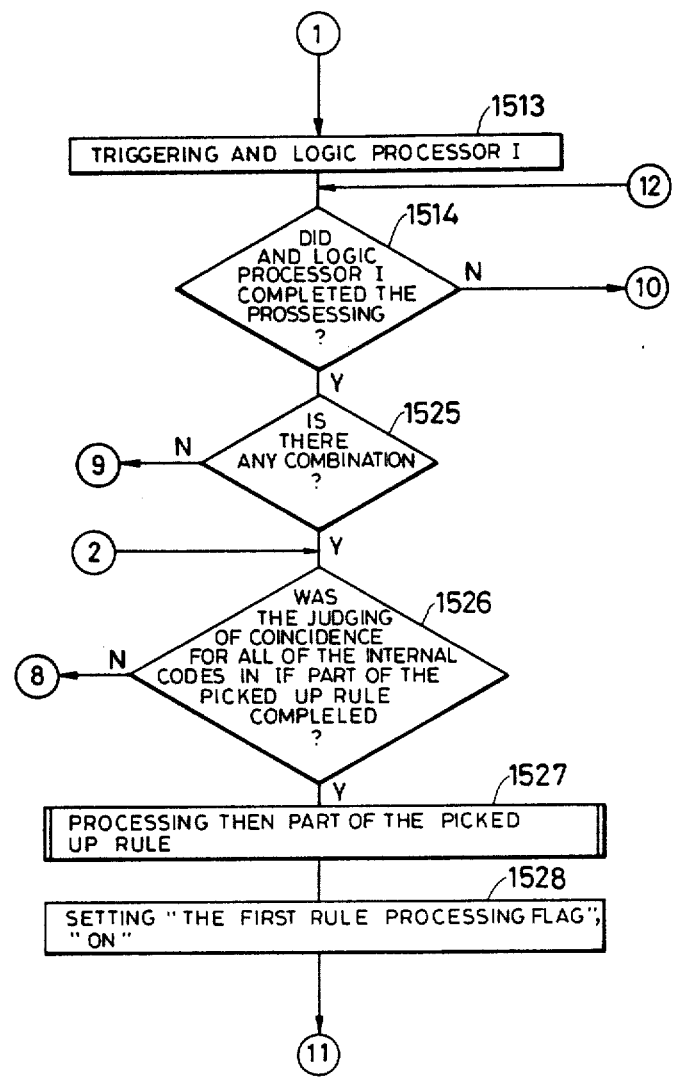
Figure 14C:
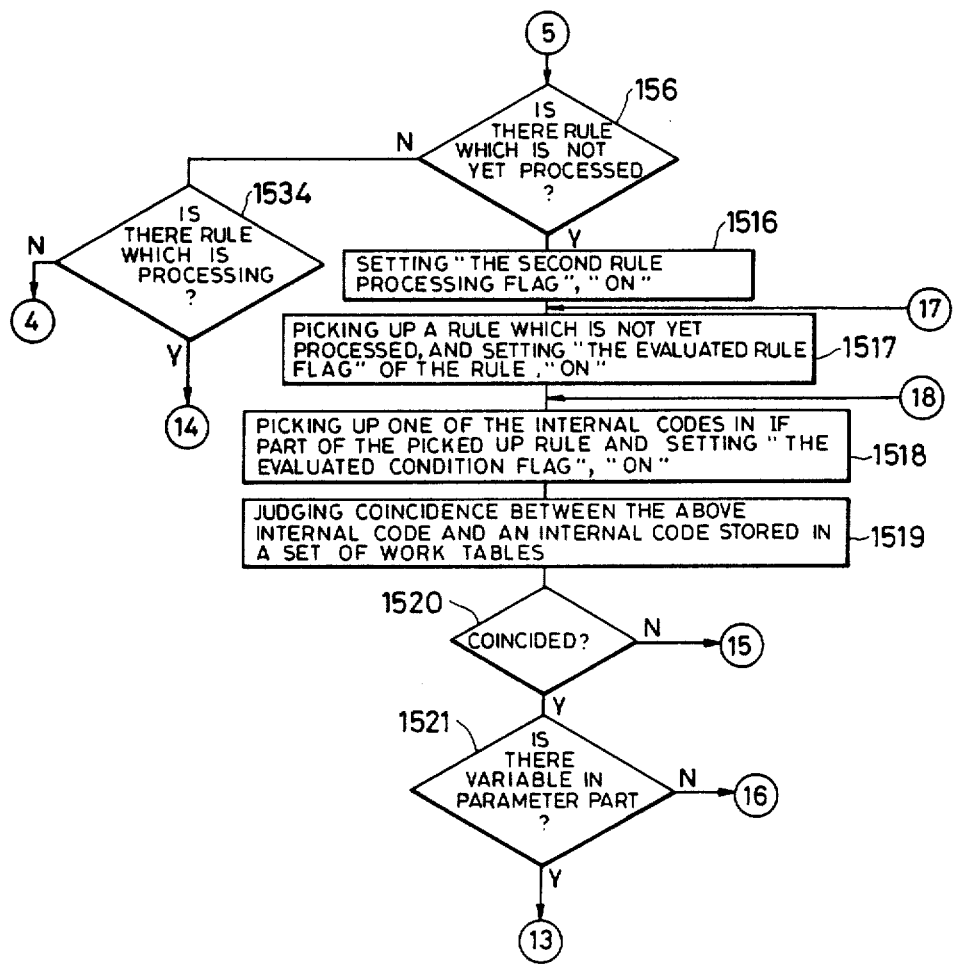
Figure 14D:
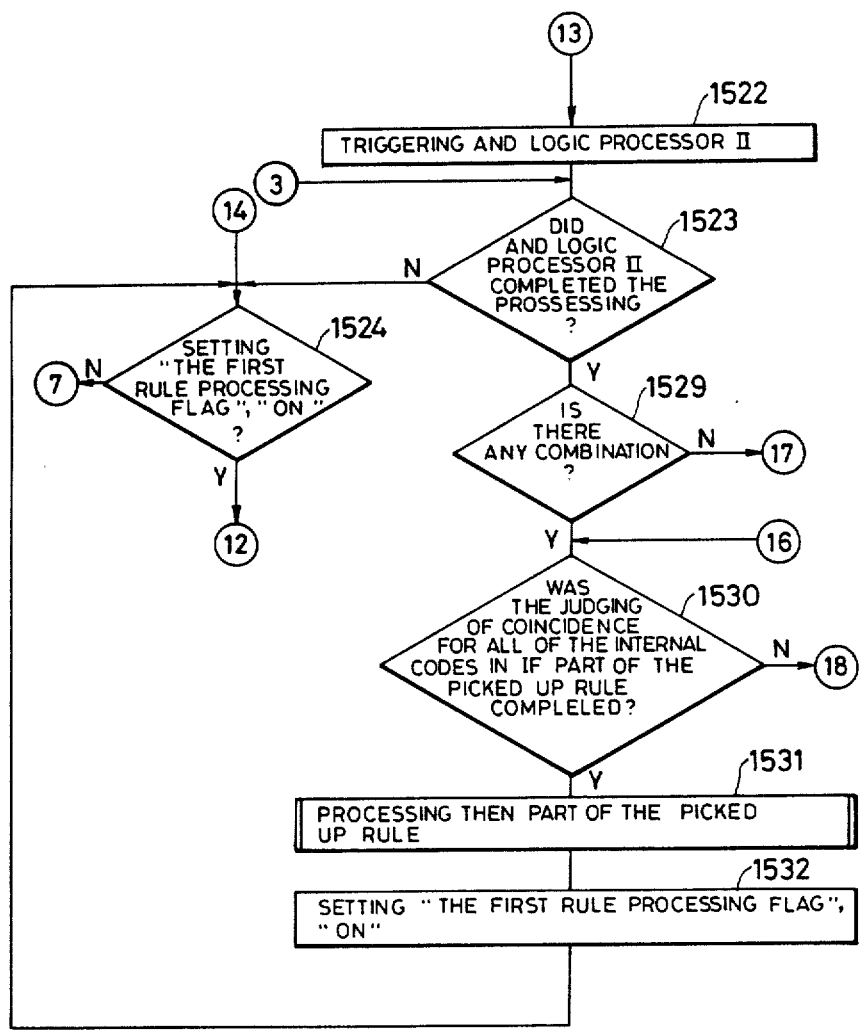
Figure 14E:
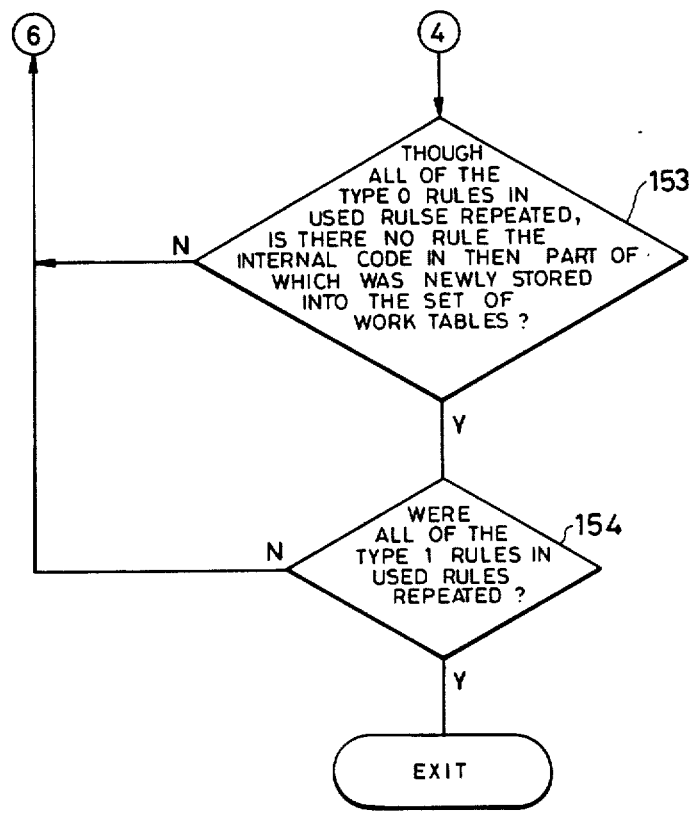

FIG. 13 is a block diagram showing the relationships between the function blocks inside of the control command deciding part 123 of FIG. 11 and the tables.

In FIG. 13, solid lines indicate the flows of the control signals, and thick lines indicate the flows of information. The control command deciding part 123 is composed of a controlling part 141 for deciding the control commands, a judging part 142 of conditions, a procedure triggering part 144, an intermediate conclusion writing part 145, a control command writing part 146, and JOIN operation processors (I) 611 and (II) 612.

Figure 15:
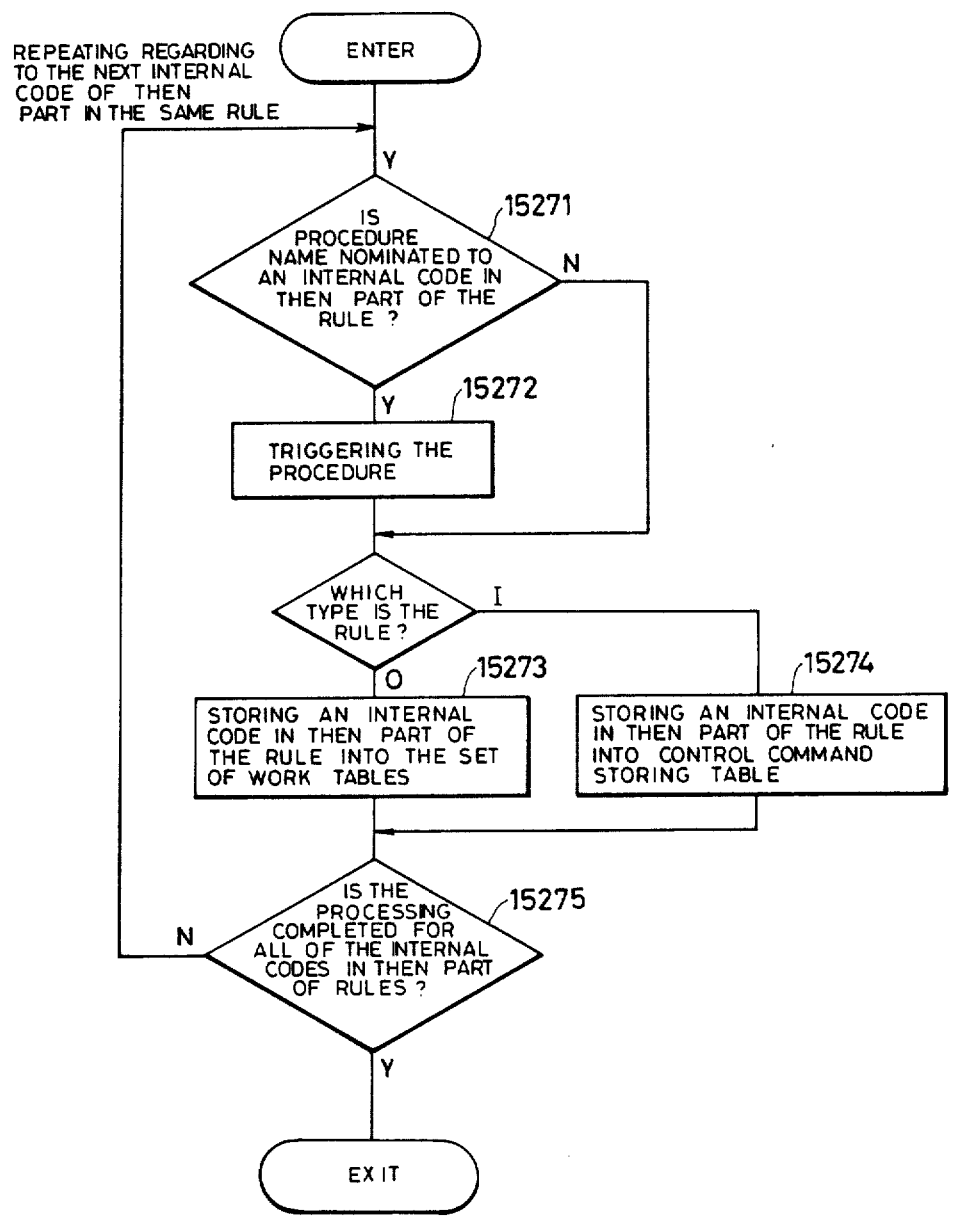
FIG. 15 is a flow chart showing the detailed operations when the control command deciding part processes the THEN parts of the rules.

FIGS. 14 and 15 are operation flow charts of the control command deciding part 123 of FIG. 11.

When the control command deciding part 123 is started, the control is first transferred to the control command deciding controlling part 141. This controlling part 141 determines the control command in the following manner by making use of other function blocks.

The control command deciding controlling part 141 first clears the control command storing table 105 (at a block 151) and decides the head and last in the rule table 92 of the rule to be used from the rule set directory 91 on the basis of the rule set number stored in the used rule set number storing area 82 (at a block 152). The following processings are conducted only for the rules at positions between the head and last.

The control command deciding controlling part 141 conducts the following processings (at a block 153) for all the rules of the rule Type 0 in the rule table 92 until a new rule for adding the internal codes of the THEN part to the inside of the work table groups disappears. In case the new rule disappears, the control command generating part 124 is started after the following processings are conducted (at a block 154) for all the rules of the rule Type 1 in the rule table 92. The control command deciding controlling part 141 first clears the evaluated rule flag and the evaluated condition flag of the rule table 92 and a parallel-processing rule flag table 108 for all the used rules selected (at a block 155). Next, the controlling part 141 conducts the following processings (at a block 156) until the unprocessed rules (i.e., the rules in which the evaluated rule flag of the rule table 92 is blank) disappear. First of all, the processing of the first one of the rules to be processed in parallel is started. More specifically, the controlling part 141 sets the first rule processing flag of the parallel-processing rule flag table 108 at 1, declares that the rules are to be processed by the use of the JOIN operation processor (I) 611 (at a block 157), picks up one rule unprocessed yet, sets the evaluated rule flag of that rule at 1, and triggers the processing of that rule (at a block 158). In the processings of the rules, the internal codes of the IF parts of the rules picked up are processed one by one. More specifically, one of the unprocessed internal code of the IF part of the rule picked up (i.e., the evaluated condition flag of the rule table 92 is not at 1) is picked up, and the evaluated condition flag is set at 1 (at a block 159). The coincidence between the above internal code and an internal code stored in a set of work tables is judged (at a block 1510). The condition judging part 142 starts to follow the pointer of the row of the head pointer table 102 corresponding to the numeric code of the internal codes of the IF parts and then the pointers of the pointer table 103 sequentially and examines, until the continuing pointer value takes the zero value, whether or not anything corresponding to the parameter portion of the internal codes of the IF parts is stored in the parameter part storing table 101. The coincidence judgement is conducted in parts except the variable nominated parameter part of the parameter part of the internal codes of the IF parts. If YES, the value of the parameter part in the parameter part storing table 101 corresponding to the variable nominated parameter part is stored as the value of the variable nominated in the IF parts in the variable value temporary storing table (I) 106. In this case, the variable value is incorporated into the parameter part storing table 101, each time a coincidence with the parameter part of the internal codes of the IF part is found, and is stored sequentially in each row of the variable value temporarily storing table (I) 106. Incidentally, in case no variable is nominated in the parameter part of the internal code of the IF part, its value is not incorporated especially. As a result, in case there is no coincidence, the control command deciding control part 141 picks up a next rule to start the condition judgement again (at a box 1511). If there is a variable nominated parameter part in the internal code of the IF part having been subjected to the coincidence judgement (at a box 1512), moreover, the JOIN operation processor (I) 611 is started to generate a combination of the variable values meeting the AND condition of the IF part in accordance with later-described procedures (at a box 1513). The result of this combination is stored in the AND condition met variable value storing table (I) 107. In the absence of the variable nominated parameter part, later-described JOIN operation processings are not conducted. Here, the control command deciding control part 141 starts the processing of the second rule to be conducted in parallel, while the completion of the processing of the JOIN operation processor (I) 611 is awaited. More specifically, it is confirmed that the second rule processing flag of the rule flag table 108 being processed in parallel is not at 1 (the second rule processing is not started) (at a box 1515), and the processing of the second rule is advanced absolutely like the first rule of the parallel processing (at boxes 1516 to 1522), as has been described hereinbefore. The difference from the processing of the first rule resides only in that the JOIN operation processor (II) 612, the variable value temporary storing table (II) 109 and the AND condition met variable value storing table (II) 110 are used in place of the JOIN operation processor (I) 611, the variable value temporary storing table (I) 107 and the AND condition met variable value storing table (I) 107, respectively. The end of the JOIN operation processing is observed through the loop of the boxes 1514, 1515, 1523 and 1524. If, in this loop, the end (i.e., the end signal of the end signal line 608) of the JOIN operation processors (I) 611 and (II) 612 is detected, the next processing of the rule being processed in those processors is continuously processed. The following description is directed to the case in which the end of the JOIN operation processor (I) 611 is detected. This is similar to the case in which the end of the JOIN operation processor (II) 612 is detected (at boxes 1529 to 1532). If the result of the JOIN operation processings finds no combination of the variable values meeting the AND condition (i.e., if nothing is stored in the AND condition met variable value storing table (I) 107), the control command deciding control part 141 abandons the rule being processed and extracts a next rule to start the condition judgement again (at a box 1525). The control command deciding control part 141 shifts to the later-described THEN part (at a box 1526) after it has conducted the processings thus far described for all the internal codes nominated in the IF part in a certain rule. When the processing of the THEN part of the rule is completed, the control command deciding control part 141 declares the completion of the first rule processing being conducted in parallel by clearing the first rule processing flag of the rule flag table 108, which is being processed in parallel, to zero to enter again the JOIN operation processing termination monitoring loop (at the boxes 1514, 1515, 1523 and 1524). Incidentally, if it is detected in that loop that the loop processing has been terminated, the processing of a next new rule is started again (at the boxes 1515 and 1524). If there is neither the rule unprocessed (at the box 156) nor the rule being processed in parallel and shown in the rule flag table 108 (at a box 1534), the operation is shifted to the termination judgement (at the boxes 153 and 154). Incidentally, while there is a rule being processed, the loop (at the boxes 1514, 1515, 1523 and 1524) is continued.

Next, the processing of the THEN part of the rule (i.e., the boxes 1527 and 1531 of FIG. 14) will be described.

FIG. 15 is a flow chart showing the processing of the THEN part.

In the boxes 1527 and 1531 shown in FIG. 14, there is a difference in that the processing is conducted in the box 1527 in accordance with the information of the JOIN operation met variable value storing table (I) 107 but in the box 1531 in accordance with the information of the AND condition met variable value storing table (II) 110. Therefore, the following description is directed only to the case of the box 1527.

First of all, the control command deciding control part 141 picks up one internal code of the THEN part of the rule being processed. In case a procedure name of that internal code is nominated in the rule table 92, the control command deciding control part 141 triggers calls the procedure triggering part 144 to trigger the nominating procedure (at a box 15272). In case no procedure name is nominated, the procedure triggering part 144 is not called (at a box 15271). The procedure triggering part 144 searches the procedure entry address of the procedure name nominated for the internal code from the procedure entry table 111 and calls that address procedure by using the AND condition met variable value storing table (I) 107 as an argument. In the procedure, the value of the AND condition met variable value storing table (I) 107 can be varied arbitrarily. Next, the control command deciding control part 141 examines the rule Type (i.e., the rule Type in the rule table 92) being processed and calls the intermediate conclusion writing part 145, in case the Type is at 0, to store one extracted internal code of the THEN part of the rule being processed into a set of wrok tables (at a box 15273). In case the Type is at 1, the control command writing part 146 is called, and the picked up one internal code of the THEN part of the rule being processed is stored into the control command storing table 106 (at a box 15274). The control command deciding control part 141 repeats the processings thus far described for all the internal codes nominated in the THEN part (at a box 15275). In case there is in the internal code to be stored a variable nominated parameter part in the parameter parts, the intermediate conclusion writing part 145 first generates an internal code in which the content of that parameter part is replaced by the corresponding variable value of a certain row stored in the AND condition met variable value storing table (I) 107. If there is no variable nominated parameter part, the internal code to be stored is used as it is. Next, the intermediate conclusion writing part 145 the generated internal code in the set of work tables. This storage is conducted by the same method as that of the case in which the generated internal code is stored in the set of work tables. If, in this case, the internal code to be stored is already stored in the set of work tables like the aforementioned method, it is not newly stored. Incidentally, the processings thus far described are repeated with regard to all the rows in which the variable values of the AND condition met variable value storing table (I) 107 are stored. The control command writing part 146 first generates the internal codes to be written like the intermediate conclusion writing part 145.

Next, the internal codes are stored sequentially from their head in the control command storing table 105. If, in this case, the internal code to be stored is already present in the control command storing table 105, it is not newly written. Like the intermediate conclusion writing part 145, moreover, the processings thus far described are repeated for all the rows in which the variable values of the AND condition met variable value storing table (I) 107 are stored. At last, the operations of the JOIN operation processor 606 will be described in the following.

Figure 16:
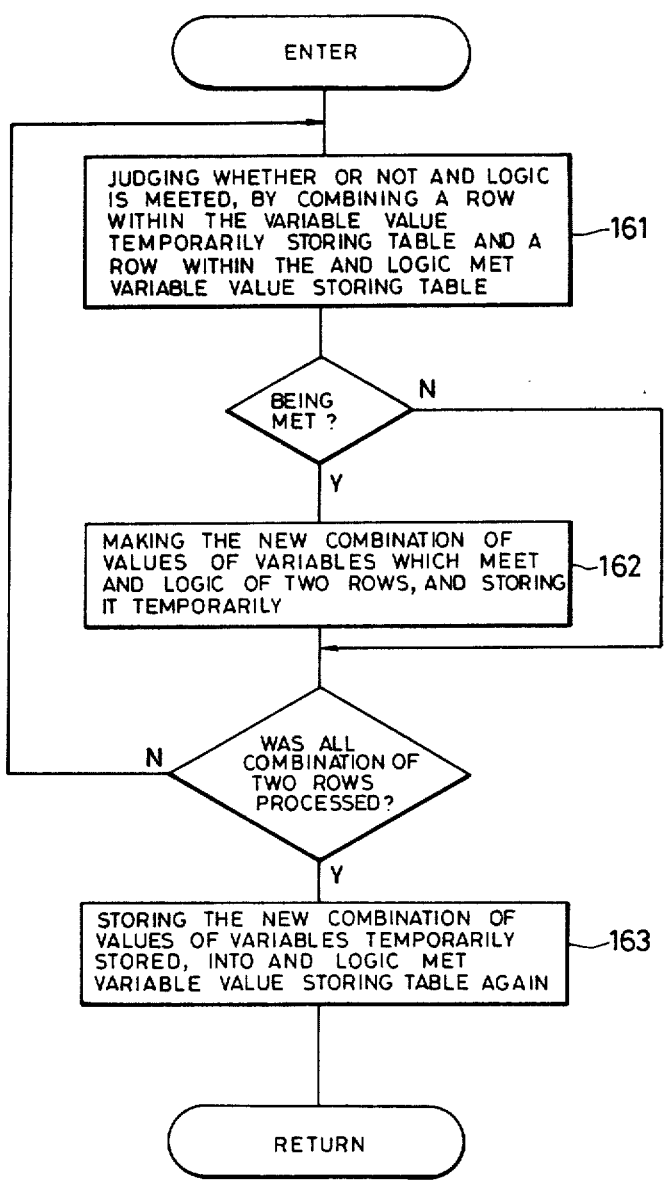
FIG. 16 is a flow chart showing the operations of AND logic processors.

FIG. 16 is a flow chart showing the operations of the JOIN operation processor 606.

The processing contents of the JOIN operation processors I and II are different in the processing tables such as the variable value temporary storing table (I) 106 or (II) 109 or the AND condition met variable value storing table (I) 107 or (II) 110 but are not themselves, and therefore their following descriptions are not especially separated. The JOIN operation processor 606 triggers its operations in response to the trigger signal of the trigger signal line 607. That processor 606 prepares the combination of the values of variables (which is stored in the variable value temporary storing table (I) 106), which are picked up when the coincidence judgement between one internal code of the IF part and the internal code stored in the set of work tables, the combination of the values of variables meeting the AND condition in the internal codes of the IF part having already been subjected to the coincidence judgement, and the combination of the values of variables meeting the AND logic condition including the internal codes subjected newly to the coincidence judgement. As shown in FIG. 16, more specifically, it is determined whether or not the AND condition is satisfied for all the combinations of the individual rows of the variable value temporary storing table (I) 106 and the individual rows of the AND condition met variable value storing table (I) 107 (at a box 161), and if the result is yes, the combination of the variable values met in the AND condition is prepared and newly stored (at a box 162). Finally, the new combination of the variable values stored is stored again in the AND condition met variable value storing table (I) 107 (at a box 163). Here, the meeting of the AND condition occurs in case the values nominated at an identical variable name are coincident at the sides of the variable value temporary storing table (I) 106 and the AND condition met variable value storing table (I) 107 or in case one variable has no value (or is blanked). On the other hand, the combination of the variable values meeting the new AND condition, too, is made by correcting, in one combination meeting the AND condition in the row of the variable value temporary storing table (I) 106 and the AND condition met variable value storing table (I) 107, the variable of coincident value to the coincident value and the blank variable to the value of the variable having the value.

Figure 17:
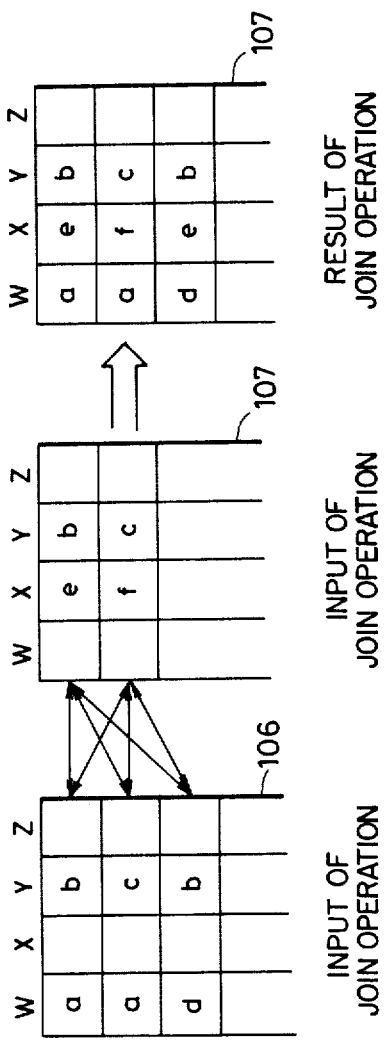
FIG. 17a-c is a diagram showing an example of generating the combinations of variable values JOIN operation generated in the AND logic processor.

FIG. 17 is a diagram showing an example of making the combination of the AND condition met variables generated by JOIN operation. FIG. 17(a) shows the variable value temporary storing table (I) 106, and FIGS. 17(b) and 17(c) show the AND logic condition met variable value storing table (I) 107.

In this example, the first-line variable value (W=a, X=blank, Y=b, and Z=blank) of the variable value temporary storing table (I) 106 and the first-line variable value (W=blank, X=e, Y=b, and Z=blank) of the AND condition met variable value storing table (I) 107 meet the AND condition, and the combination of W=a, X=e, Y=b and Z=blank of the variable values meeting the AND condition is made newly on the first line of the AND condition met variable value storing table (I) 107.

Thus, according to the present invention, the various control logics can be described easily by using the IF-THEN rules so that the logic judging control of the various control logics can be executed simply by storing the information coded internally on the basis of the description in each table of the memory part 601. Moreover, the change in the content of the logic judging control following the changes in the control target and the control system can be easily coped with by altering the IF-THEN rules. According to the present embodiment, furthermore, the plural rules can be processed simultaneously in parallel by executing the JOIN operation processings in a device separate from the controller 602 while advancing the processings of other rules in the controller 602. As a result, the process time after a control command is determined from the occurrence of a certain facility status and before the control command is transmitted is shortened more than in the prior art so that the present embodiment can also be used for the control of the target required to have a high-speed control response. Furthermore, the number of rules to be processed for a unit time and the number of the statuses of the targets are increased so that the present embodiment can be applied to a large-scale target having a great number of rules and statuses.

Incidentally, in the embodiment, the end of the processings of the JOIN operation processor 606 is observed by the so-called "polling method" using the loop of the boxes 1514, 1515, 1523 and 1524, as shown in FIG. 14. However, there is another method by which the signal of the end signal line 608 is made an interruption signal so that the the processing end of the JOIN operation processor 606 is awaited by the interruption. In the embodiment, however, the two JOIN operation processor 606 are used, but three or more can be processed likewise merely by adding the observing loop of the boxes 1514, 1515, 1523 and 1524 shown in FIG. 14. This also applies to the interruption method.

Figure 20:
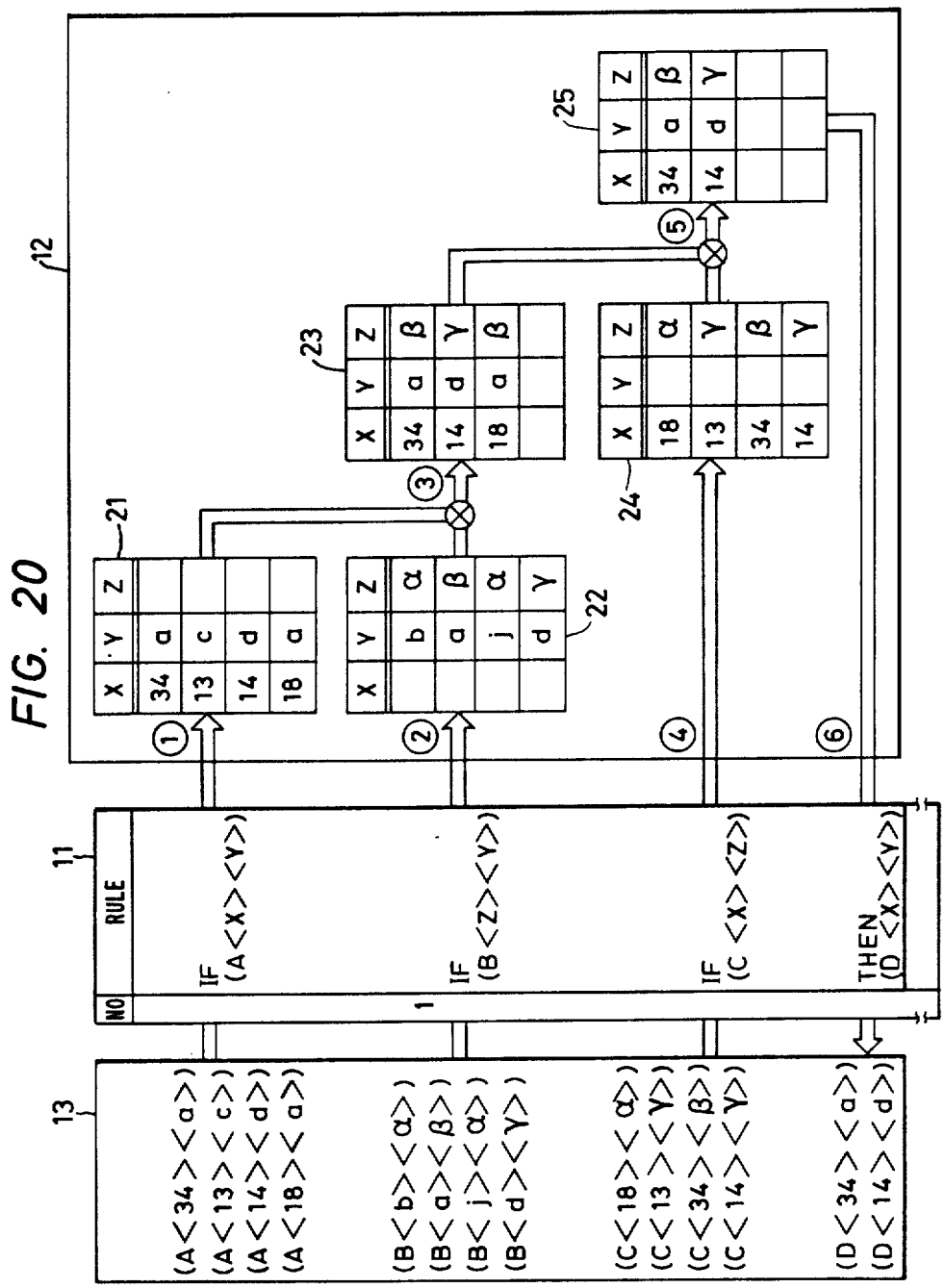
FIG. 20 is a diagram for explaining the rule processings of rule based software.

Next, a second embodiment corresponding to the above-specified second object will be described in the following. FIG. 20 is a detailed diagram showing the processings in case variables are described in the parameter parts of rules in the system of FIG. 2.

In rule memory part 11, there is shown only one rule which is being processed (or picked up) by a rule applying part 12. This rule applying part 12 first judges the coincidence between the letter row "(A<X><Y>) of the first IF of the IF part of the rule and the letter row stored in a status memory part 13. The coincidence judgement at this instant is conducted at "(A)", i.e., a part of the letter row except the parameter part. If the coincident letter row is present in the status memory part 13, the value of the parameter part in the coincident letter row is picked up (at ①) as the value of a variable described in the corresponding parameter part in the letter row of the IF part into a table 21. Moreover, the rule applying part 12 conducts the same processing for the letter row "(B Z Y)" of the next IF to pick up (at ②) the value of the parameter part of the letter row of the status memory part 13 as the variable value of the letter row of the IF part into another work table 22. After this, the rule applying part 12 combines the variable values picked up into the two work tables 21 and 22 and generates a variable value meeting the AND condition (in which the condition of the IF part of the rule is handled as the AND logic) to store (at ③) it in another work table 23. In case three or more letter rows of the IF part are present, the rule applying part 12 picks up (at ④) a variable value from the letter row of a next IF part, combines the variable value picked up and the variable value (which is stored in the work table 23 in this case) generated until then and satisfying the AND condition, generates such a variable value including the variable value picked up as meets the AND condition, and stores (at ⑤) the variable value generated in the work table. These processings are repeated for all the letter rows of the third or later IFs. If a variable value meeting the AND condition is finally present, it is written to the corresponding variable of the letter row of the THEN part, and the written value is newly written (at ⑥) in the status memory part 13.

Figure 21:
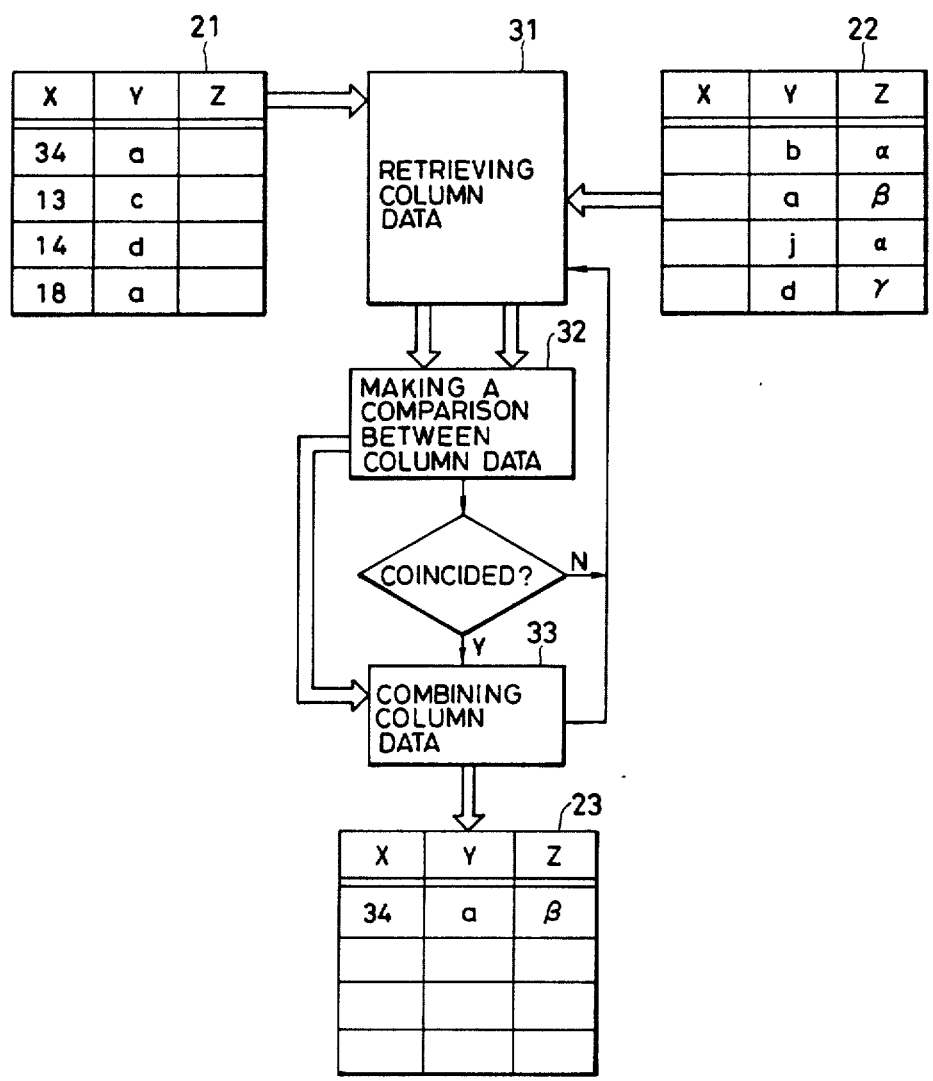
FIG. 21 is a diagram for explaining the AND logic met variable generating processing (i.e., JOIN operation) in the rule processing.

FIG. 21 is a diagram for explaining the AND condition met variable value generating processing (i.e., the JOIN operation) of the prior art.

FIG. 21 represents the intermediate status in which a variable value meeting the AND condition is generated from the variable values of the work tables 21 and 22 of FIG. 20 and stored in the work table 23. The processing for generating the variable value meeting the AND condition is conducted by searching all of the combinations of the respective rows of one and other work tables, in which the values of common variables (i.e., the variables into which the values are picked up in the two tables) are coincident, and by generating a new variable value of another variable (which will be called the combination of row data), while leaving the value of the common variable as it is. In the example of FIG. 21, for instance, in the first row of the work table 21 and in the second row of the work table 22, the value of the common variable Y is coincident at "a", from which X=34, Y=a and Z=β of the first row of the work table 23 are generated as a new variable value. This processing is the so-called "JOIN operation of the table data", which is generally executed by the programs in the prior art.

Even in the rule based system proposed, as shown in FIG. 21, there is used a method of picking up (at a box 31) all the combinations of the individual rows of the row tables 21 and 22, judging (at a box 32) whether or not the value of the common variable is coincident sequentially for the rows, and generating (at a box 33) a new variable value if YES, and setting the new variable value in another work table 23.

Figure 22:
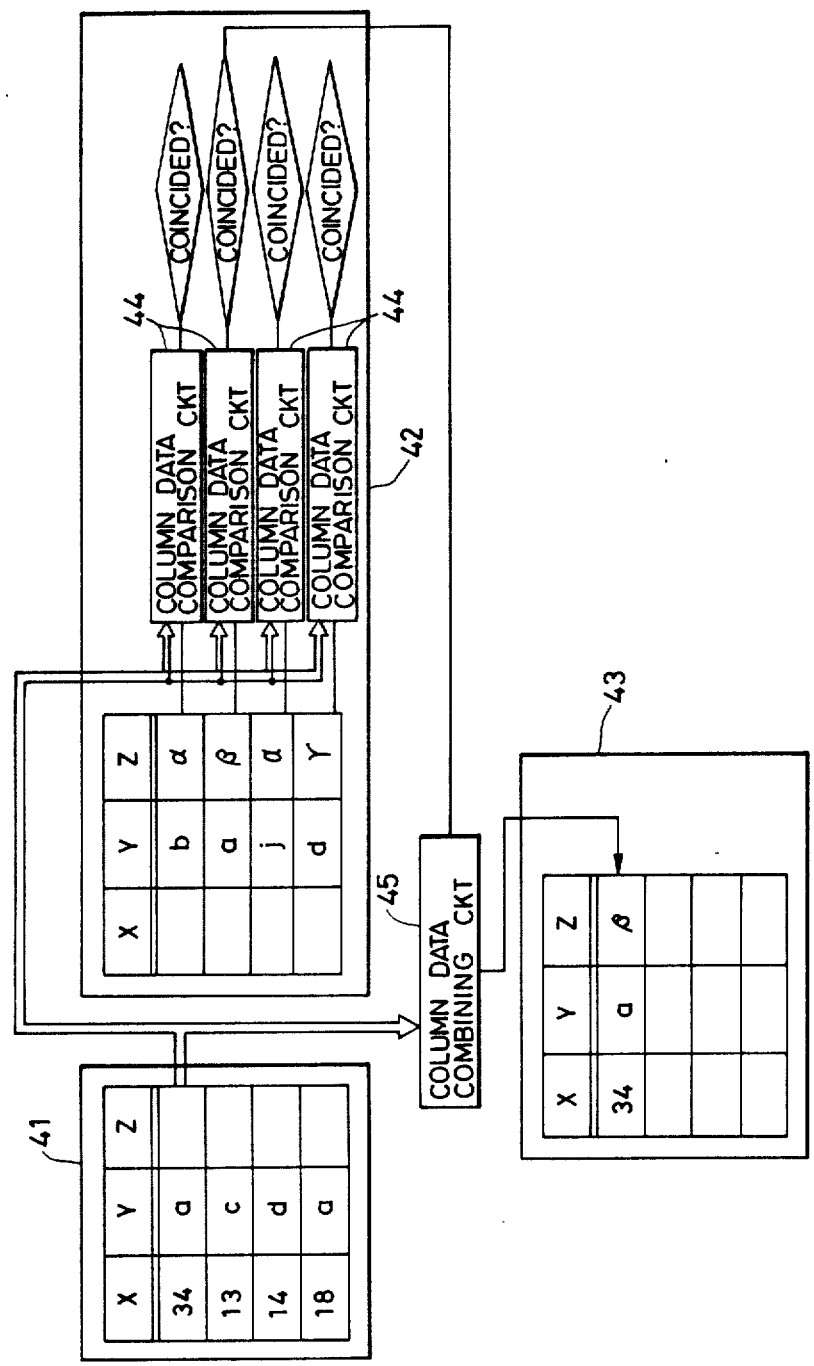
FIG. 22 is a diagram for explaining the operational principle of the present invention.

FIG. 22 is a diagram showing the operational principle of the present invention. Since the JOIN operation of the AND condition met variable value generating processing in the rule based system proposed is realized by the programs, the processings cannot be executed except serially, and the respective rows of the two work tables are combined and to have their common variables compared thereby to search a pair of rows having an equal value. In other words, the system is one for searching the combination of variable values meeting the AND condition by the sequential retrieval, and the processing takes an excessively long time. According to the present invention, on the contrary, the associative memory device (which is called under the name of "Content Addressable Memory" and will be shortly referred to as "CAM") capable of comparing and retrieving simultaneously all the data stored is used to retrieve the combination of variable values meeting the AND condition at a high speed.

In FIG. 22, first of all, one of the work tables to be subjected to the JOIN operation is stored in an ordinary memory unit 41 whereas the other is stored in one CAM 42. The table data of the results of the JOIN operation are stored in another CAM 43. The operations will be described in the following. Specifically, the data is picked up one row by one row from the ordinary memory unit 41 and is used as the retrieval data of the CAM 42 (Incidentally, at this time, the data X and Z other than the common variable Y are masked). In the CAM 42, the data comparing processings are conducted simultaneously for all the rows of the table data in the CAM 42 by comparing units 44. The rows of the table in the CAM 42, in which the values of the retrieval data and the common data are coincident, are pointed up one by one and are subjected to the same processings as those of the box 33 in FIG. 21 by a row data combining circuit 45 so that they are combined with the retrieval data and stored sequentially in the CAM 43. In the present system, the two CAMs 43 are prepared so that the JOIN operation can be executed continuously without any transfer of data by picking up new variable values in the memory unit 41 and by suitably exchanging the roles of the CAMs 42 and 43 in case there are three or more letter columns describing the conditions of the IF parts and if the variable value meeting the AND logic generated at this time and the new variable value picked up for the condition of the subsequent IF have to be combined to repeat the JOIN operation again. As a result, the processings of the rules of the rule based software can be executed efficiently.

Figure 18:
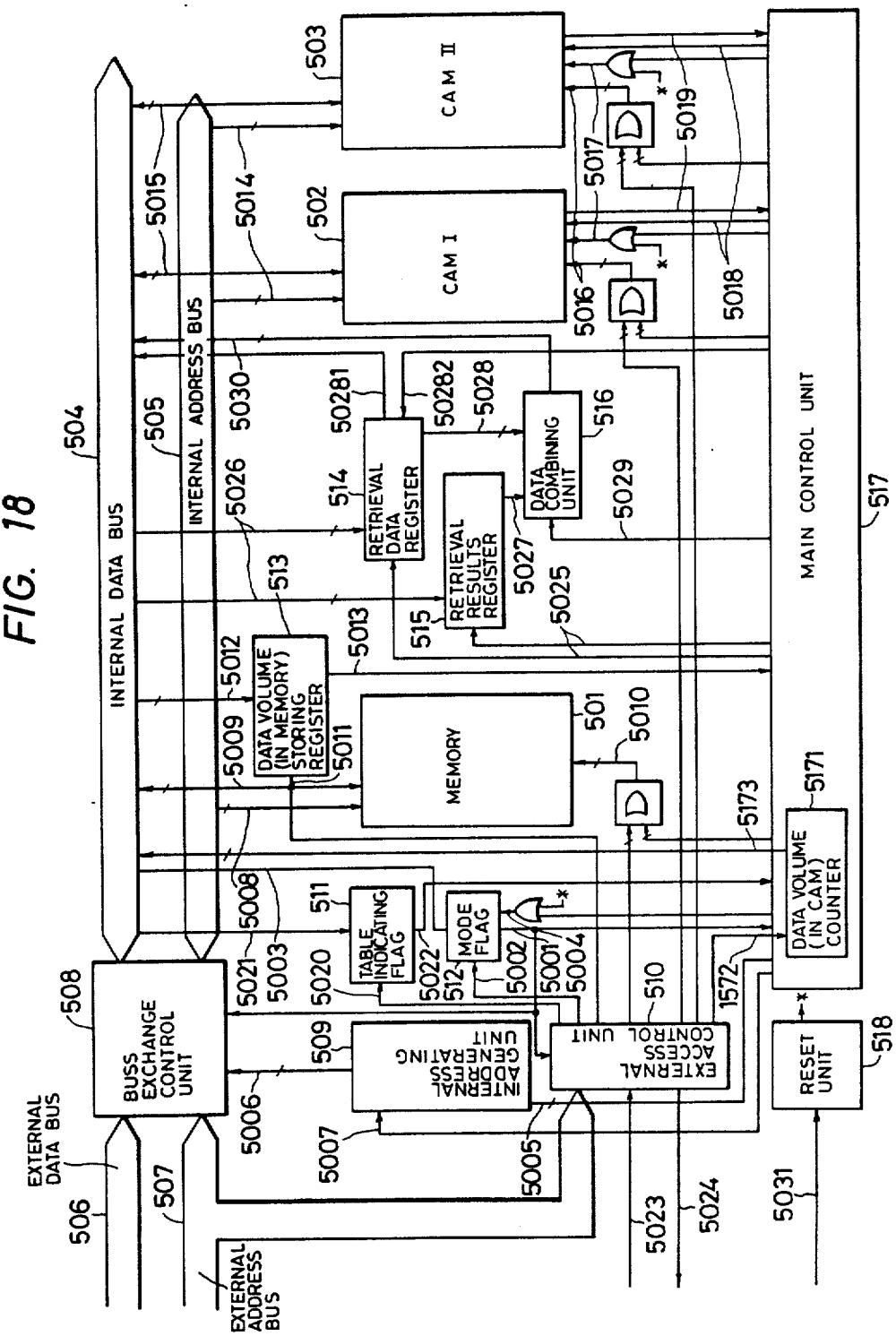
FIG. 18 is a block diagram showing a JOIN operation system according to another embodiment of the present invention.

FIG. 18 is a block diagram showing one embodiment of the JOIN operation system according to the present invention.

In FIG. 18, an internal data bus 504 and an internal address bus 505 are bus lines for the internal data and address signals of the present system, respectively. On the other hand, an external data bus 506 and an external address bus 507 are bus lines for data signals for accessing a memory 501, a CAMI 502, CAMII 503, and other flags and registers, respectively, from the outside. In the present system, there are two modes of an external access mode and an internal operation mode. The external access mode is a mode capable of nominating the address in the external address bus 507 from the outside, writing the data on the external data bus 506 into the present system, and reading the data inside of the present system onto the external data bus 506, whereas the internal operation mode is a mode for executing the JOIN operation automatically on the basis of the principle shown in FIG. 22. The exchange of the modes is nominated by a mode flag 512. In other words, the external access mode is nominated when the mode flag is at "0" whereas the internal operation mode is nominated when the mode flag is at "1". The mode flag 512 is set at "1" by latching the signal of the internal data bus 504 through a signal line 5003 in response to a latch signal and is reset at "0" in response to a reset signal of a signal line 5004. Moreover, the status of the mode flag is transmitted to a signal line 5001. Usually, the mode flag is in the status of "0" and in the external access mode.

A bus exchange control unit 508 responds to the signal of the signal line 5001 representing the status of a mode flag 512 to join the external data bus 506 and the external address bus 507 to the internal data bus 504 and the internal address bus 505, respectively, when in the external access mode and to disconnect them in the internal operation mode while joining an address signal line 5006 of an internal address generating unit 509 to the internal address bus 505.

The internal address generating unit 509 is a part for generating addresses for reading and writing the data of the memory 501, the CAM 1502 and the CAMII 503 when in the internal operation mode. When control signals for nominating one of the registers and memory cells of the memory 501, the CAMI 502 and CAMII 503 are generated on a signal line 5005 by a main control unit 517, that internal address generating unit 509 generates and transmits the addresses corresponding to those signals, respectively, onto the signal line 5006. The address generations are so conducted for the memory 501, the memory cells of the CAMI 502 and the memory cells of the CAMII 503 as to access the address spaces sequentially from their head.

Figure 19:
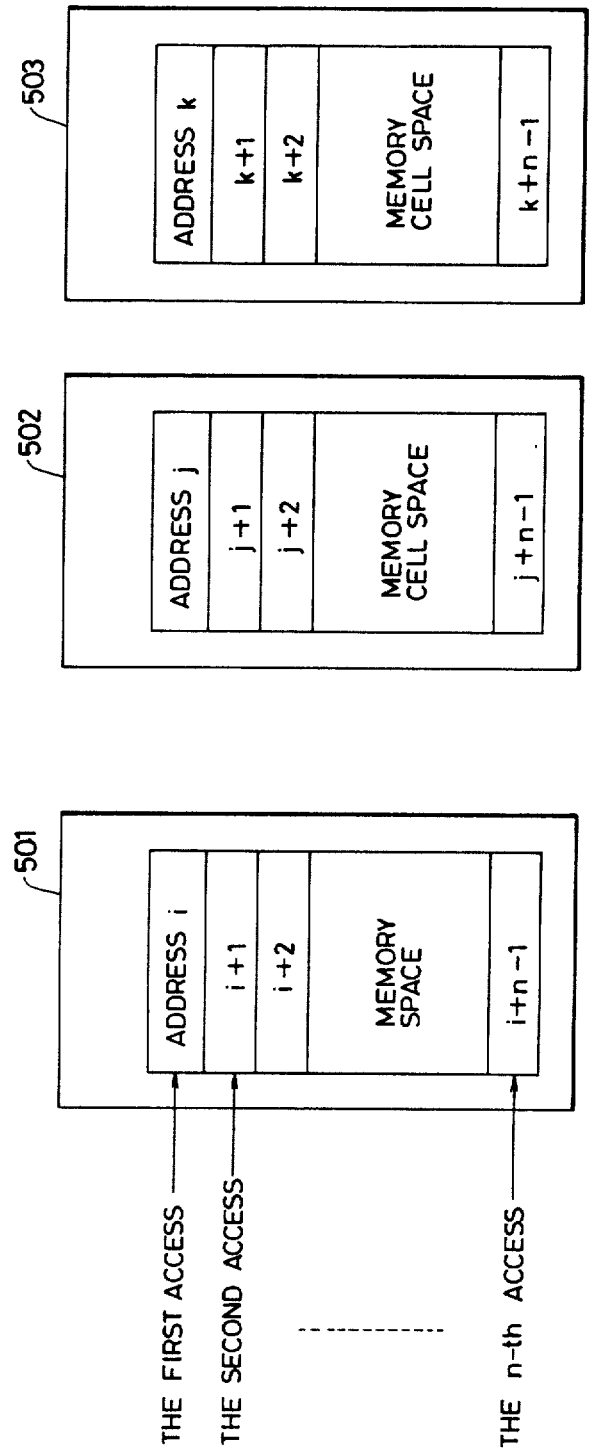
FIG. 19 is a diagram showing the layout of the memory and CAM of FIG. 1.

FIG. 19 is a diagram showing the relations between the addresses of the memory and the two CAMs of FIG. 18.

As shown in FIG. 19, each time the accesses of the memory 501 and the memory cells of the CAMI 502 and CAMII 503 are nominated, the addresses to be generated next are incremented by respectively necessary volumes. For the registers or the like in the CAMI 502 and CAMII 503, on the other hand, addresses nominated respectively therefor are generated. In response to the reset signal of a signal line 5007, incidentally, the generated addresses for the memory 501 and the memory cells of the CAMI 502 and II 503 are reset at the heads of the memory spaces.

The memory 501 is used for storing one of the work tables for the JOIN operation, as shown in FIG. 22. The in-memory data nominated by the address signal on an address signal line 5008 can be accessed through a data signal line 5009 in accordance with a control signal on a control signal line 5010. Incidentally, an in-memory data volume storing register 513 indicates the number of rows in which the data are stored actually in the work table stored in the memory 501. That register is set in response to a latch signal on a signal line 5011 by latching the data of the internal data bus 504 through a signal line 5012. The set content is transmitted onto a signal line 5013.

The CAMI 502 and CAMII 503 are used, as shown in FIG. 22, to store the other work table for the JOIN operation and the work table resulting from the JOIN operation. The CAMI 502 and CAMII 503 are accessed like the ordinary memory 501 by using an address signal line 5014, a data signal line 5015 and a control signal line 5016 and have their associative retrieval functions controlled by a reset signal line 5017, a retrieval signal line 5018 and a retrieved result signal line 5019.

Figure 23:
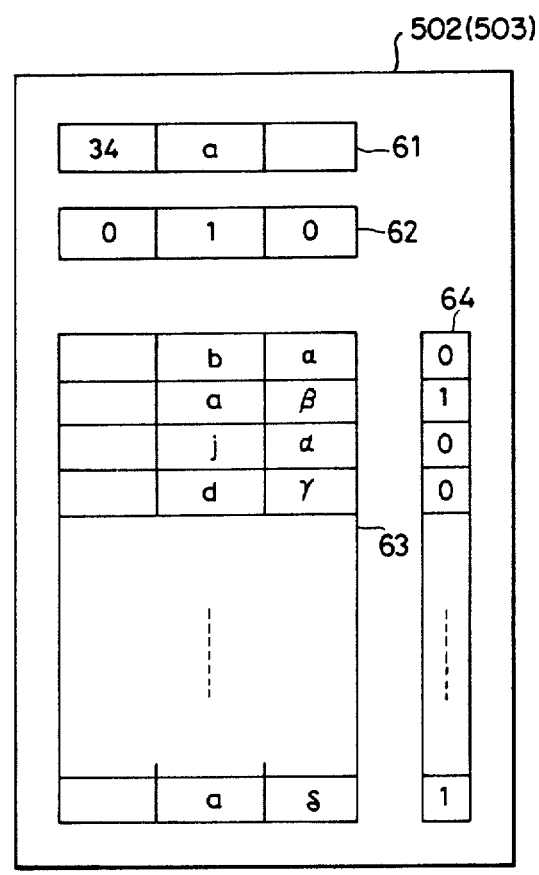
FIG. 23 is a diagram showing the construction of a register in an associative memory device.
Figure 24:
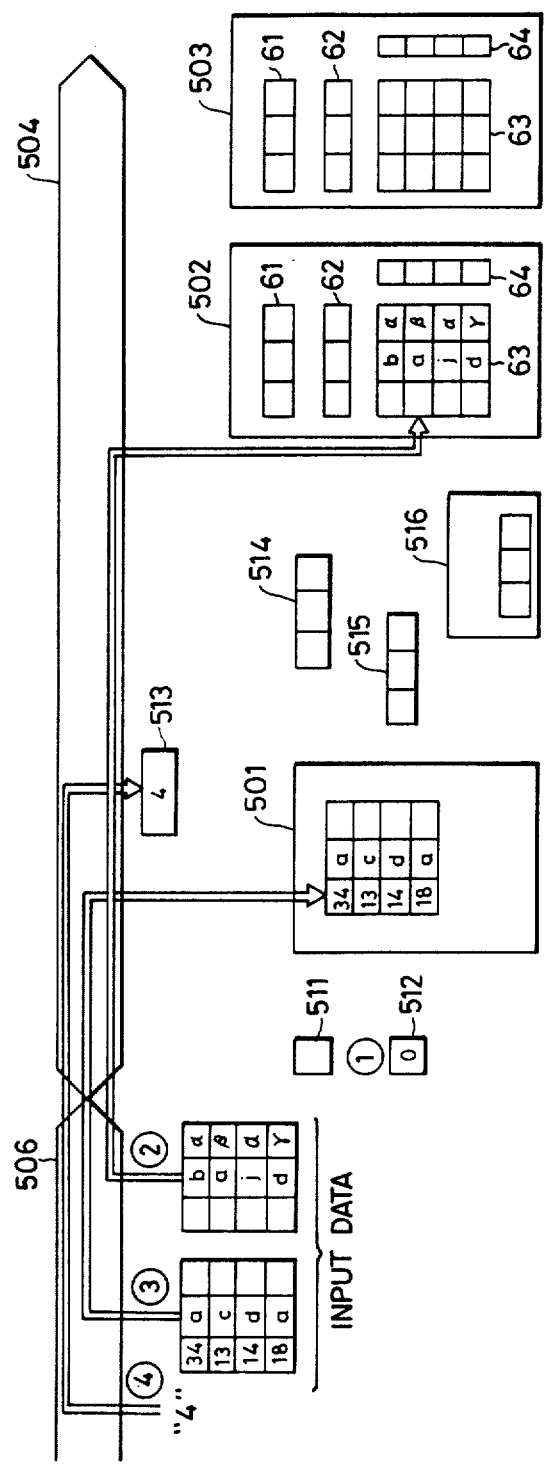
FIGS. 24 to 29 are data flow charts of the individual embodiments of the present invention.
Figure 25:
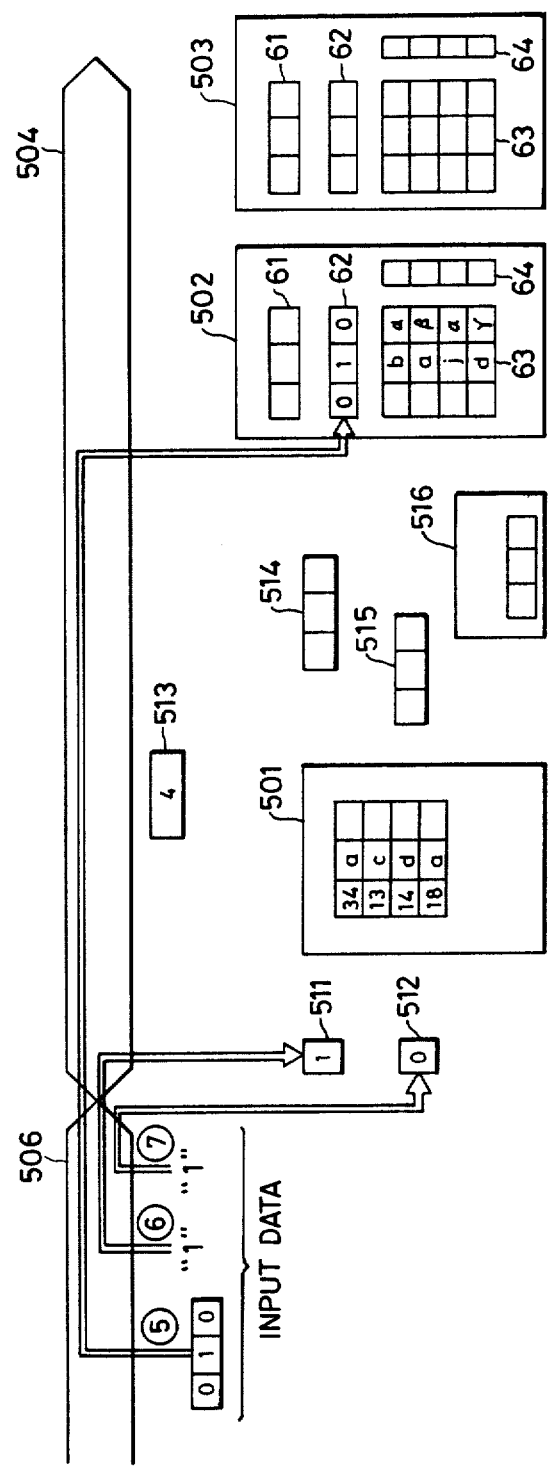
Figure 26:
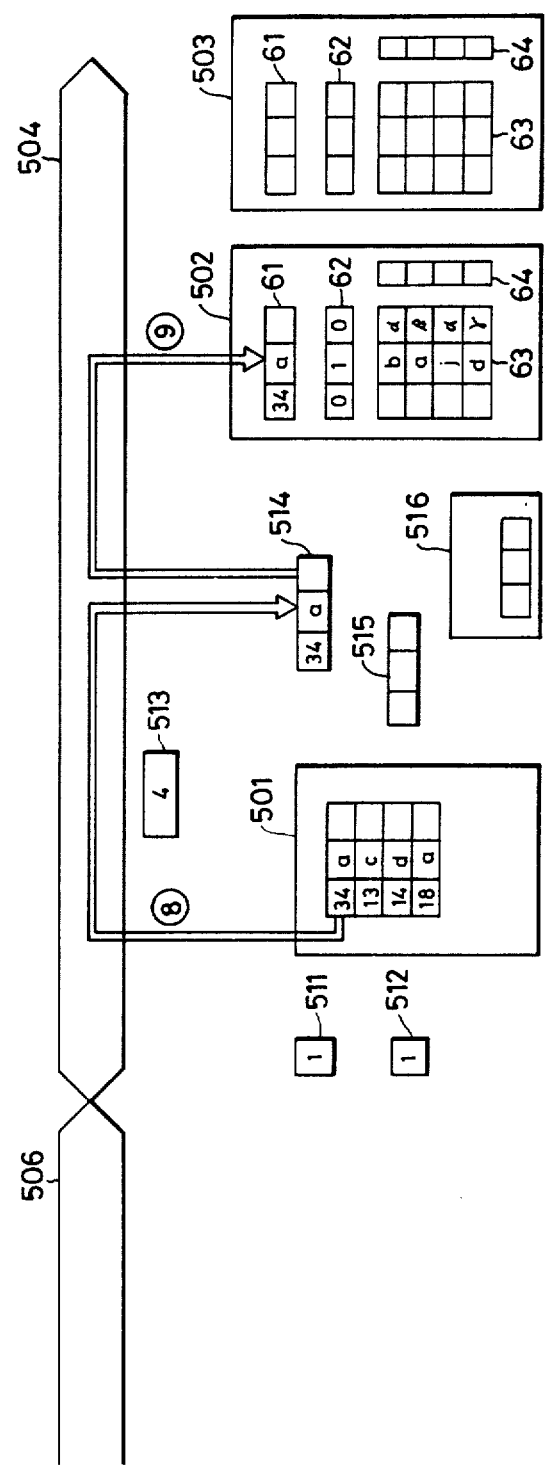
Figure 27:
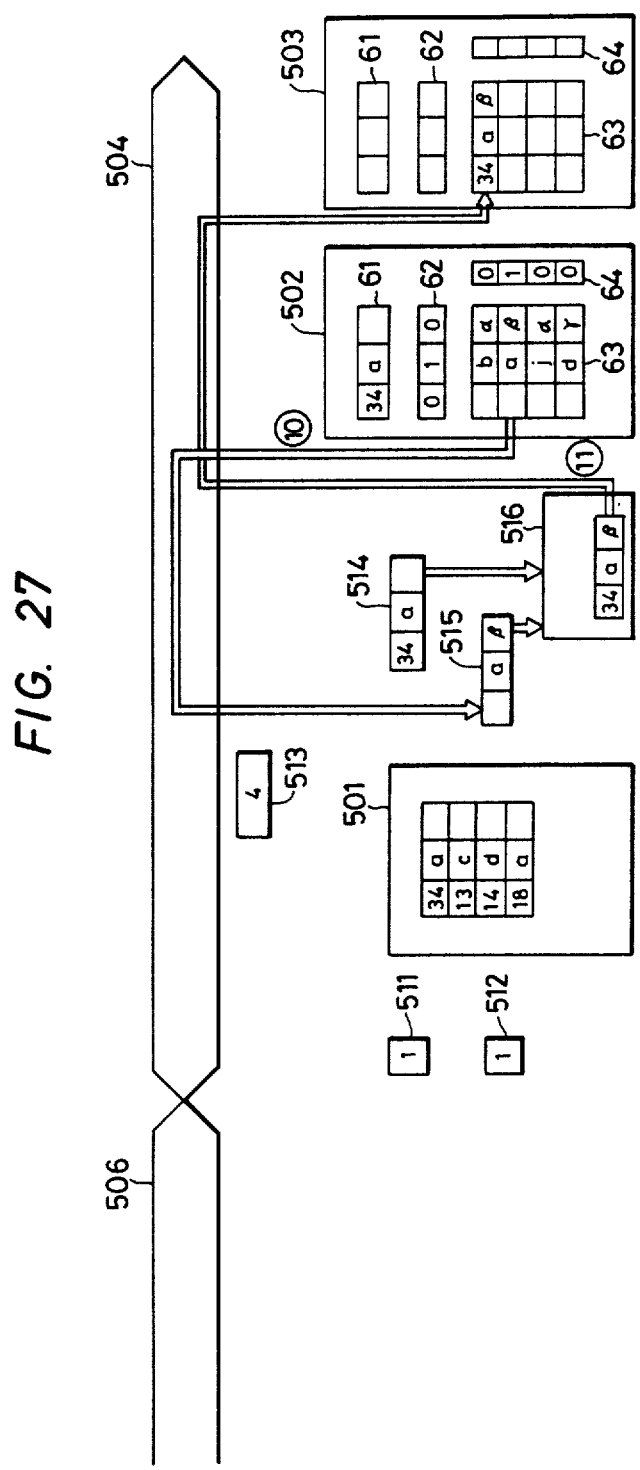

FIG. 23 is a diagram showing the layout of the individual registers in the CAM. The associative retrieving functions of the CAM will be described with reference to FIG. 23.

As shown in FIG. 23, a memory cell 63 is stored with data to be associatively retrieved. On the other hand, a retrieval data register 61 stores data to be retrieved. A mask data register 62 nominates a mask of such a portion of the data of the retrieval data register 61 as is not taken into consideration when in the retrieving operation. In the mask data register 62, such data of the retrieval data register 61 as corresponds to the part stored with "0" is masked so that it is not subjected to the comparison of data coincidence when in the retrieving operation (whereas only the part stored with "1" is subjected to the comparison). Those registers 61 and 62 and the memory cell 63 are accessed like the ordinary memory by making use of the signal lines 5014, 5015 and 5016. The associative retrieval is conducted by turning the retrieval signal line 5018 on after the data has been stored in those registers 61 and 62 and the memory cell 63. Of the data in the retrieval data register 61 and the memory cell 63, more specifically, the data of the part nominated with "1" by the mask data register 62 is subjected to a coincidence comparison simultaneously for all the data in the memory cell 63, and a retrieval result flag 64 corresponding to the row of the memory cell 63 of the coincident data is set at "1". If at least one of the retrieval result flags 64s is set at "1", this fact is indicated on the retrieval result signal line 5019 of FIG. 18 and is transmitted to the outside. If none of the flags is set at "1", on the contrary, the retrieval result of no flag is indicated on the signal line 5019. Moreover, the data in the memory cell of the first row in which the retrieval result flag 64 is set at "1" is transmitted to the data signal line 5015. Next, if the retrieval signal line 5018 is turned on again, the data in the memory cell 63 on the second row, in which the retrieval result flag 64 is set at "1", are transmitted to the data signal line 5015, and the first flag is eliminated. Incidentally, all the contents of the memory cell 63 are cleared by turning the reset signal line 5017 on.

Which of the CAMI 502 and CAMII 503 is used for the work table of the JOIN operation or the work table for storing the results of the JOIN operation is indicated by the table indicating flag 511. When that flag is set at "1", the CAMI 502 is used as the work table for the JOIN operation whereas the CAMII 503 is used as the work table for storing the results of the JOIN operation. This usage is reversed for "0". The table indicating flag 511 is set by latching the signal of the internal data bus 504 through a signal line 5021 in response to the latch signal of a signal line 5020. The set content is transmitted to a signal line 5022.

An external access control part 510 is a controlling part for accessing the aforementioned memory 501, CAMI 502, CAMII 503, mode flag 512, table indicating flag 511 and in-memory data volume storing register 513 and a later-described in-CAM data volume counter 5171 from the outside. In this external access control part 510, the signal on the external address bus 507 is decoded to determine which of the aforementioned ones is to be accessed and to transmit the control signal and the latch signal to the access target in response to the read/write signal of a signal line 5023. At the end of the JOIN operation (i.e., when the mode flag 512 is switched from "ON" to "OFF"), an interruption signal indicating the end of the JOIN operation to the outside is transmitted onto a signal line 5024.

A retrieval data register 514 is a register for picking up and storing the data of one row of the work table stored in the memory 501, and a retrieval result register 515 is a register for picking up and storing coincident retrieval result data when the CAMI 502 or CAMII 503 is associatively retrieved by using the same data as the content of that register as the retrieval data. Those registers are set by latching the signal of the internal data bus 504 through a signal line 5026 in response to a latch signal on a signal line 5025. The sent contents are transmitted signals lines 5027 and 5028, respectively. In the retrieval data register 514, moreover, the content can be transmitted onto the internal data bus 504 through a signal line 50281 by turning on a signal line 50282.

A data combining unit 516 is a unit for conducting the data combining arithmetic, as has been described with reference to FIG. 21. The signals of the signal lines 5027 and 5028 are combined, and the combined resultant signal is transmitted onto a signal line 5030 in response to a timing signal of a signal line 5029.

The main control unit 517 is a unit for controlling the operational timings of the aforementioned individual units to advance the JOIN operation when in the internal operation mode. In accordance with the statuses of the mode flag 512 and table indicating flag 511, the CAMI 502 and CAMII 503, and the result of the associative retrieval (i.e., the status of the retrieval result signal line 5019), the controls are conducted by transmitting signals suitable to other units. Incidentally, the main control unit 517 has the in-CAM data volume counter 5171 in its inside to count the resultant data volume of the JOIN algorithm. In this counter 5171, there is indicated the number of the rows in which the data are actually stored in the work table for storing the results of the JOIN algorithm. The content of that counter 5171 can be read out, when in the external access mode, by indicating in the external address bus 507 the address nominated in that counter 5171 thereby to generate the read signal on the signal line 5023. In response to this read signal, more specifically, the external access control unit 510 can generate a read signal on a signal line 5172 so that the content of the counter 5171 can be read out to the external data bus 506 through a signal line 5173.

The reset unit 518 is a unit for setting the initial status of the JOIN operation system to generate a signal for resetting the mode flag 512 and the CAMI 501 and CAMII 503 in response to a reset signal of an external reset signal line 5031.

FIGS. 24 to 29 are data flow charts when in the operations of the present invention. The operations of the present embodiment will be described in the following with reference to FIGS. 18, 19, 23, and 24 to 29.

The reference symbols and numerals appearing in FIGS. 24 to 29 are identical to those of FIGS. 18 and 19.

Figure 28:
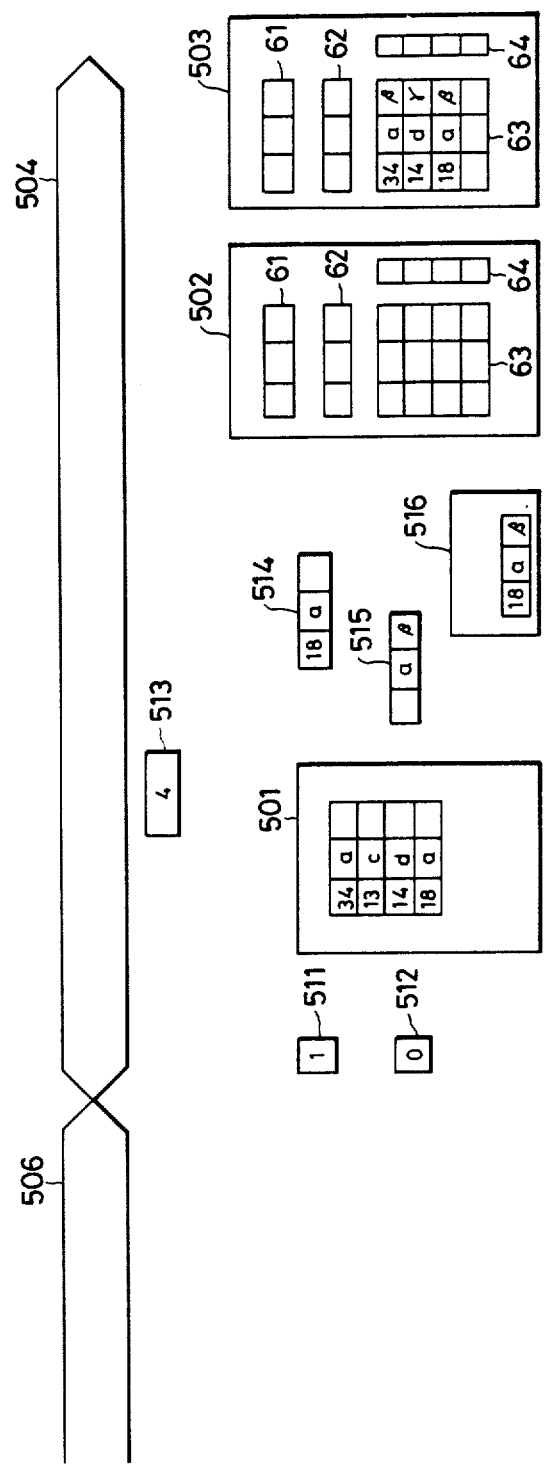
Figure 29:
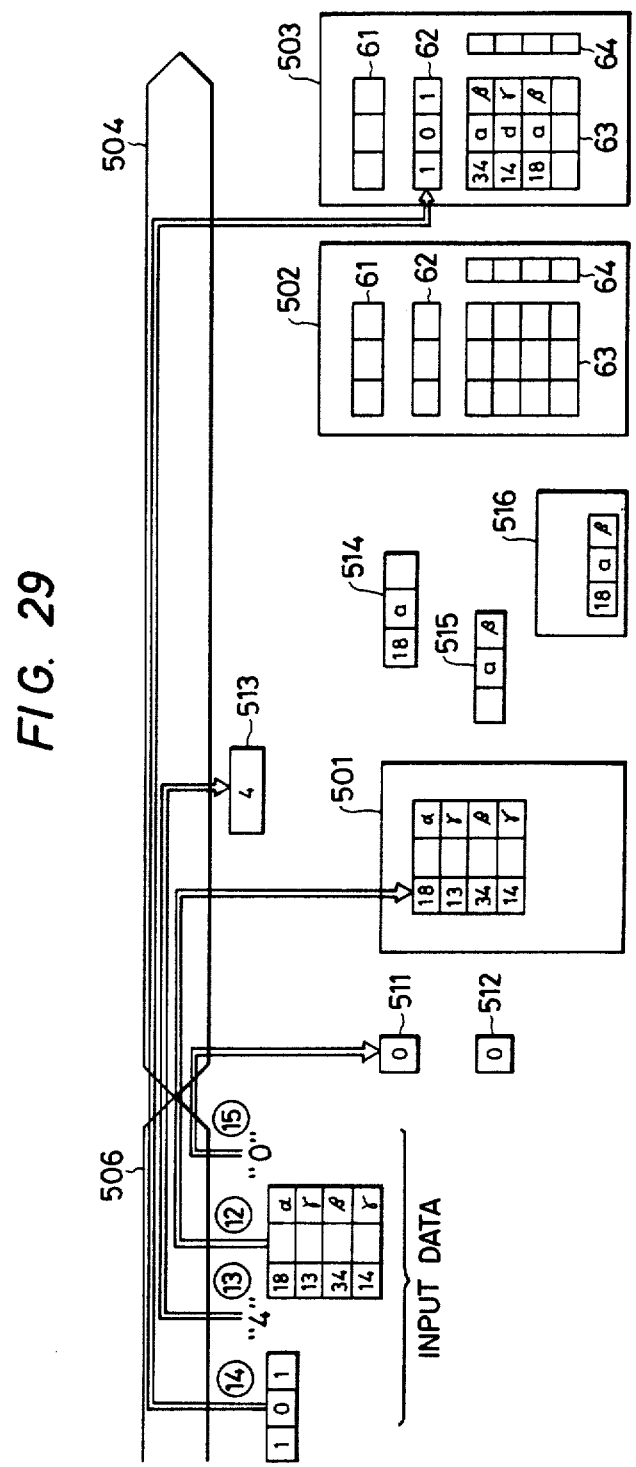

Prior to the start of the JOIN operation, the user first transmits the reset signal to the signal line 5031 and sets the initial status of the present system. In response to the reset signal, the reset unit 518 generates the internal reset signal on the signal lines 5017 and 5004 to clear the registers 61 and 62, the memory cells 63 and the flags 64 in the CAMI 502 and CAMII 503 and to set (at ① of FIG. 24) the mode flag 512 at "0". When the mode flag 512 is set at "0", the bus exchange control unit 508 joins the external data bus 506 and the internal data bus 504, and the external address bus 507 and the internal address bus 505 so that the data can be set from the outside. Next, the user sets (at ② of FIG. 24) the data of one of the work tables, which are to be subjected to the JOIN operation, in the memory cells 63 of the CAMI 502. The case will be described in the following, in which the data to be subjected to the JOIN operation are set in the CAMI 502 whereas the data resulting from the JOIN operation are set in the CAMII 503. The setting control of the data in the memory cells 63 of the CAMI 502 is conducted by the external access control unit 510. The user sets the data on the external data bus 506, sends out the address, which is nominated to the memory cells 63 of the CAMI 502 to be stored with the data, to the external data bus 507 and transmits the write signal to the signal line 5023. The data and addresses are transmitted to the internal data bus 504 and the internal address bus 505 and further to the signal lines 5015 and 5014 of the CAMI 502. The external access control unit 510 generates the access control signal of the CAMI 502 to the signal line 5016 of the CAMI 502 and stores the data in the memory cells 63 of the CAMI 502. Likewise, the CAMII 503 and the memory 501 are also accessed by the external access control unit 510 and are stored with the data. The user further sets (at ③ of FIG. 24) one remaining data, which is to be subjected to the JOIN operation, in the memory 501. Simultaneously with this, the user sets (at ④ of FIG. 24) the number of the rows of the set data of the memory 501 in the in-memory data volume storing register 513. This setting in the register 513 is conducted by the external access control unit 510 like the setting in the memory 501, the CAMI 502 and the CAMII 503. By sending out the data to be set to the external data bus 506, more specifically, the data is transmitted to the internal data bus 504. By setting the address assigned to the in-memory data volume storing register 513 in the external address bus 507 and by transmitting the write signal to the signal line 5023, moreover, the external access control unit 510 generates the latch signal on the signal line 5011 of the in-memory data volume storing register 513 and picks up the data on the internal data bus 504 through the signal line 5012. Incidentally, the settings of the table indicating flag 511 and the mode flag 512 from the outside are conducted absolutely similarly. After having set those data, the user stores (at ⑤ of FIG. 25) the master data registers 62 of the CAMI 502 with the data for masking the variables (i.e., X and Y of FIG. 21) except the common variable value of the two sets of data to be joined, indicates (at ⑥ of FIG. 25) the CAM (i.e., CAMI 502 in this instance), which is stored with the data to be subjected to the JOIN operation, as the partner of the JOIN operation of the memory 501 in the table indicating flag 511, and sets the mode flag 512 at "1" thereby to start (at ⑦ of FIG. 25) the JOIN operation. When the mode flag 512 is set at "1", the bus exchange control unit 508 disconnects the external data bus 506 and the internal data bus 504, and the external address bus 507 and the internal address bus 505 but joins the signal line 5006 to the internal address bus 505 and sends out the address signal which is generated by the internal address generating unit 509. The main control unit 517 starts the control operation of the JOIN operation when the signal of the signal line 5001 takes the value "1" (i.e., the internal operation mode). The main control unit 517 first generates the reset signal on the signal line 5007 to reset the internal address generating unit 509 (Incidentally, the reset content should be referred to the foregoing description of the internal address generating unit 509). After this, the main control unit 517 executes the JOIN operation in accordance with the operational principle which has been described with reference to FIG. 22. More specifically, the work table data stored in the memory 501 are picked up sequentially from the head row by row, and the subsequent processings are repeated by the number of times, which is designated in the in-memory data volume storing register 513. First of all, the main control unit 517 clears the internal in-CAM data volume storing register 5171 to zero. Next, the main control unit 517 transmits the control signal indicating the memory 501 to the signal line 5005 to generate in the internal address generating unit 509 the address for accessing the memory 501 (Incidentally, the address generating method should be referred to the foregoing description of the internal address generating unit 509). After this, the main control unit 517 generates the memory reading control signal on the signal line 5010 and read out the content of one row of the work table data stored in the memory 501 on the internal data bus 504. The data thus read out is latched (at ⑧ of FIG. 26) in the retrieval data register 514 through the signal line 5025 by transmitting the latch signal onto the signal line 5025 of the retrieval data register 514. Next, the main control unit 517 generates the data sending signal on the signal line 50282 and sends out again the content of the retrieval data register 514 onto the internal data bus 504 through the signal line 50281. The data thus read out are is read into retrieval data register 61 of the CAMI 502. More specifically, the main control unit 517 picks up (at ⑨ of FIG. 26) in the CAMI 512 by generating the address of the retrieval data register 61 of the CAMI 502 and by transmitting the write signal to the signal line 5016 of the CAMI 502. In the following, the explanations of the accessing procedures of the memory 501, the CAMI 502, the CAMII 503 and other registers will be omitted because they are the same as the aforementioned ones. After having stored the data in the retrieval data register 61 of the CAMI 502, the main control unit 517 generates the retrieval signal on the signal line 5018 of the CAMI 502 to effect the associative retrieval. The main control unit 517 repeats the following operations, until the retrieval result signal (on the signal line 5019) of the CAMI 502 is turned off, to store the results of the JOIN operation in the CAMII 503. More specifically, the main control unit 517 turns on the retrieval signal (on the signal line 5018) sequentially and sends out the retrieval result data onto the internal data bus 504 to (at ⑩ of FIG. 27) latch them in the retrieval result register 515. After this, the content of the retrieval data register 514 and the content of the retrieval result register 515 are combined by the data combining unit 516, and the sending signal is transmitted to the signal line 5029 so that the data combined results are sent out to the internal data bus 504 through the signal line 5030. The data thus sent out is stored (at ⑪ of FIG. 27) sequentially from the head of the memory cells 63 of the CAMII 503. Incidentally, the storage address is generated in the aforementioned procedures by the internal address generating unit 509. When in the data storing operation, moreover, the incam data volume counter 5171 is counted up. If the operations thus far described are repeated a number as times as indicated in the in-memory data volume storing register 513, the main control unit 517 generates the reset signals on the signal line 5017 of the CAMI 502 and the signal line 5004 to clear the CAMI 502 thereby to reset (as shown in FIG. 28) the mode flag 512 at "0". This makes it again possible to access the inside of the system from the outside. Incidentally, the end of the JOIN operation is indicated by transmitting the interruption signal from the external access control unit 510 to the signal line 5024 at the instant when the mode flag 512 is switched from "1" to "0". In case the results of the JOIN operation, are picked up as they are, the contents of the memory cells 63 of the CAMI 503, which are determined by the content indicated by the table indicating flag 511 from the outside, may be read out by the number of rows indicated in the in-CAM data volume counter 5171. The reading from the outside is controlled by the external access control unit 510, as has been described hereinbefore. On the other hand, in case three or more conditions are indicated in the IF parts of the rules of the rule based software so that the JOIN operation has to be executed again, this JOIN operation may be started by setting (at ⑫ of FIG. 29) in the memory 501 the work table data picked up into third or later IF, by setting (at ⑬ of FIG. 29) the row number (e.g., 4 in FIG. 29) in the in-memory data volume storing register 513, by setting (at ⑭ of FIG. 29) the mask data in the CAM (i.e., CAM 503 in this instance) having the JOIN operation results left, and by indicating (at ⑮ of FIG. 29) that CAM as the partner of the JOIN operation.

Thus, in the rule based system of the prior art, the combination of the rows of the work table having an equal common variable value is sought for by the sequential retrievals. According to the present embodiment, on the contrary, the processing speed can be drastically improved by making use of the parallel retrieving functions of the CAMs. Especially, in the prior art, the processing time period is augmented in proportion of the product of the volume (i.e., the row numbers) of the data stored in the two work table data to be subjected to the JOIN operation. According to the present embodiment, on the contrary, the processing time is not augmented in the multiplied manner with respect to the increase in the amounts of the target statuses because it is substantially proportional only to the data volume of one table. The estimation based on the data of the rule based software of the prior art has revealed that the processing time is about 0.5 msec/rule for the M68000 microcomputer, for example, and is about one tenth as long as that of the prior art. Since the present embodiment is equipped with the two CAMs, moreover, the continuous JOIN operation, if necessary, can be efficiently processed without any data transfer.

Still moreover, the present embodiment is effective, too, for a system for the set-valued arithmetic of data such as the relational data base.

Next, as a modification of the second embodiment, there will be described an embodiment which can execute the JOIN operation of a large volume of work so as to apply the logic descriptive system using rules and in a highly readable manner, and which is understandable and easily changeable to a target required to handle a great quantity of status. In the present embodiment, two work tables for taking the AND condition and one table for storing the result are stored in three ordinary memories so that a relatively small-scaled CAM can be efficiently used to execute the AND processing by decomposing those tables for a large volume of data. Next, the operational principle of the present system will be described with reference to FIG. 30.

Figure 30:
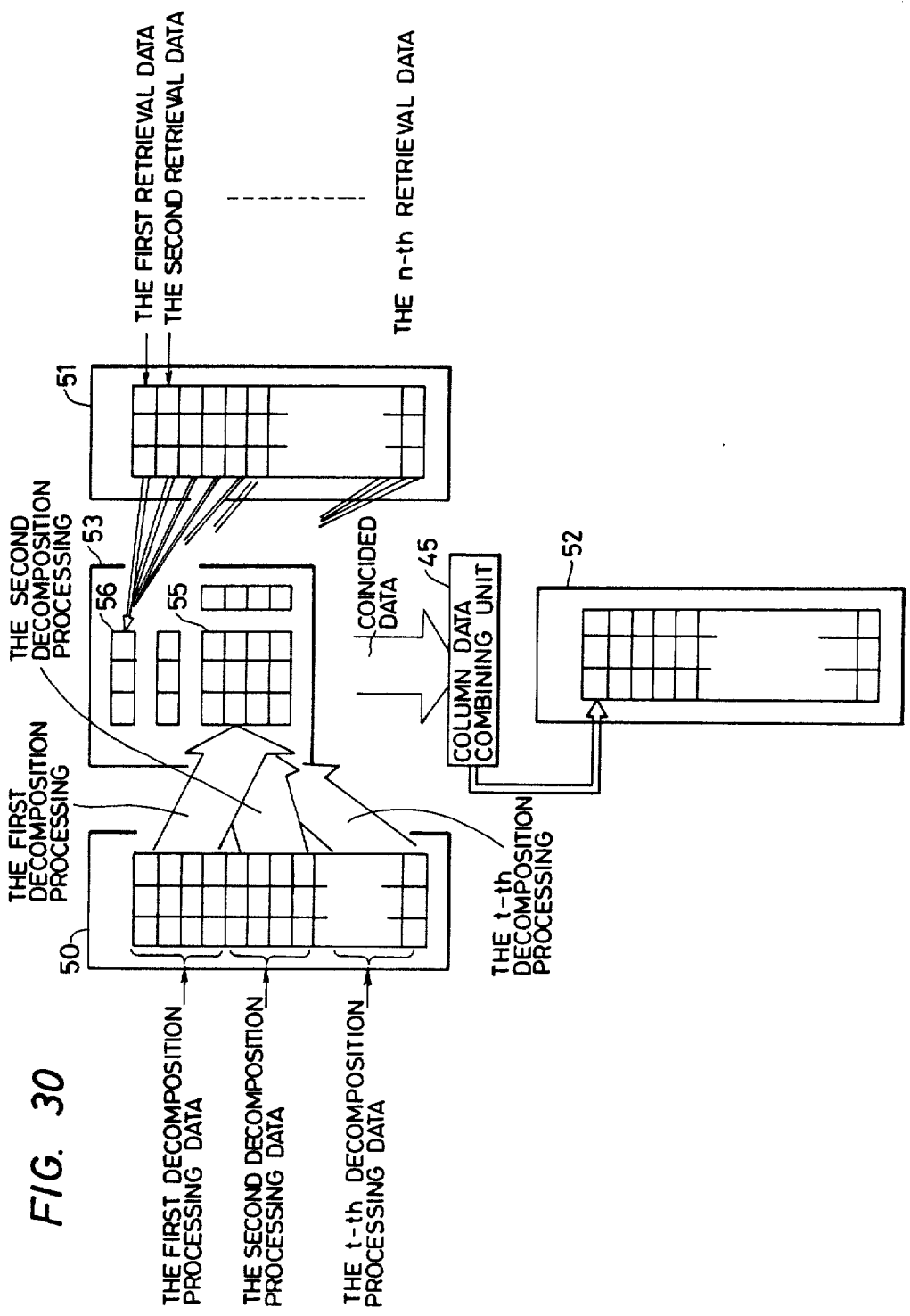
FIG. 30 is a diagram for explaining a JOIN operation system according to the present invention.

In FIG. 30, a work decomposition processing is conducted when data exceeding the capacity of memory cells 55 in the CAM are picked up into a work table 50. In the first decomposition processing, the data to fill up the memory cells 55 in the CAM 53 are picked up from the work table 50 and sent out into the memory cells 55. Next, the first retrieval data of a work table 51 is sent out to retrieval data registers 56 in the CAM 53 to operate the CAM 53 thereby to store the coincident data in a table 52 through a data combining unit 54. Next, second data is sent out from the work table 51 to the retrieving registers 56 to operate the CAM 53 thereby to store the result in the table 52. These operations are repeated until the n-th retrieval to operate the CAM 53. Next, in the second decomposition processing, the second decomposed data left in the table 50 is newly sent out to the memory cells 55 in the CAM 53 to operate the CAM 53 for an n number of retrieval data thereby to store the result in the table 52. Likewise, the decomposition processings are repeated by t times until the data of the work table 50 is exhausted. By the data processing system thus far described, the JOIN operation can be effected by a CAM of relatively small capacity even when a large volume of work data is written in.

If the volume of data to be subjected to the JOIN operation has m and n rows, according to the system of the present invention, the processing time is proportional to m×n, in case no arithmetic system is used, to m+n, in case the arithmetic system of the prior art using the two CAMs is used, and to αm+2n if an average number of decomposition processings is designated at α in case the arithmetic system of the present invention is used. The arithmetic system of the present invention has a lower processing speed than that of the system using the two CAMs but can realize the JOIN operation system which is efficient for using a CAM of relatively small capacity, by determining the capacity of the ordinary memories and the capacity of the CAM if the volume of data varying with the JOIN operation is known.

The embodiment based upon the aforementioned principle will be described with reference to the accompanying drawings.

Figure 31:
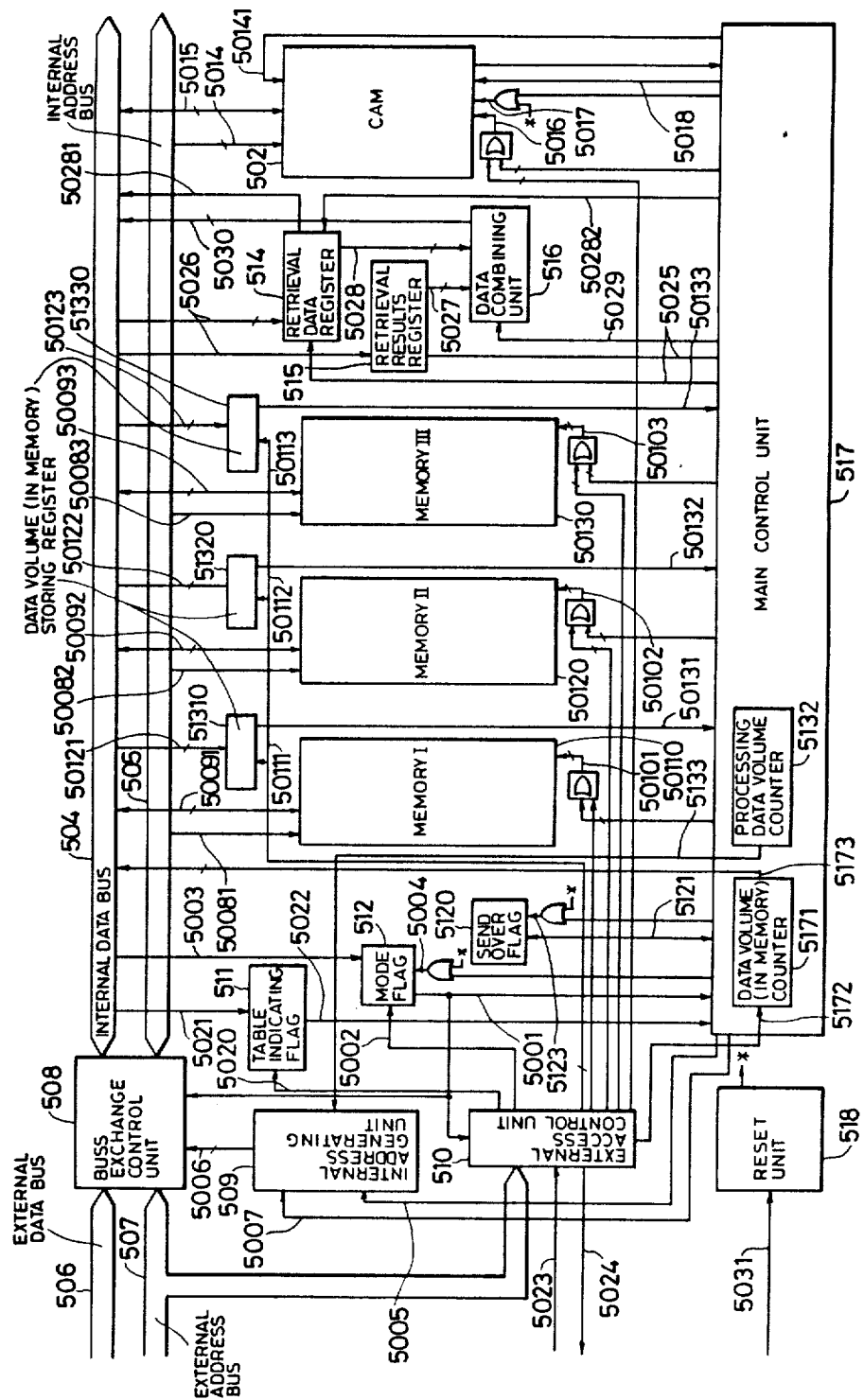
FIG. 31 is a block diagram showing another embodiment of the present invention.

FIG. 31 is a block diagram showing another embodiment of the JOIN operation system according to the present invention.

In FIG. 31, an internal data bus 504 and an internal address bus 505 are the bus lines for a data signal and an address signal inside of the present system. On the other hand, an external data bus 506 and an external address bus 507 are bus lines for data and address signals for accessing a memory I 50110, a memory II 50120, a memory III 50130, a CAM 502 in the present system and other flag registers or the like from the outside.

The present system has both an external access mode capable of nominating an address in the external address bus 507 from the outside and writing the data on the external data bus 506 into the present system or reading the data inside of the present system onto the external data bus 506, and an internal operation mode of decomposing a large volume of work in accordance with the processing system shown in FIG. 30 and executing the JOIN operation automatically. The mode exchange is nominated by a mode flag 512. The external access mode is indicated when the mode flag is at "0", and the internal operation mode is indicated when the mode flag is at "1". The mode flag 512 is set at "1" in response to the latch signal of a signal line 5002 by latching the signal of the internal data bus 504 through a signal line 5003 and is reset in response to a reset signal of a signal line 5004. Moreover, the status of the mode flag is sent out to a signal line 5001. Usually, the mode flag is in the status of "0" and in the external access mode.

In response to the signal of the signal line 5001 indicating the status of the mode flag 512, a bus exchange control unit 508 joins the external data bus 506 and the external address bus 507 to the internal data bus 504 and the internal address bus 505, respectively, when in the external access mode, but disconnects them and joins the address signal line 5006 of an internal address generating unit 509 to the internal address bus 505 when in the internal operation mode.

Figure 32:
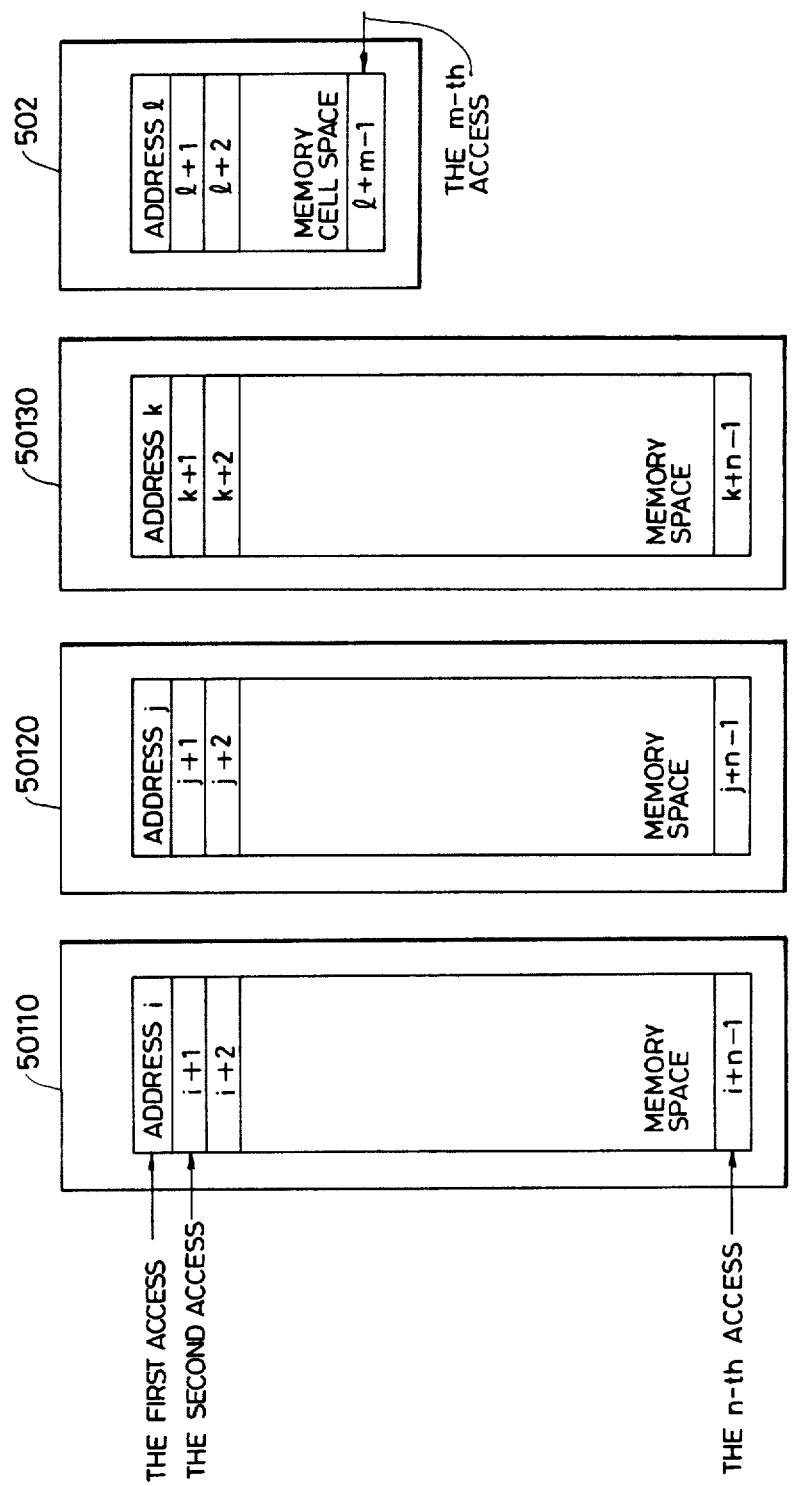
FIG. 32 is a diagram for explaining the memory spaces of the present system.
Figure 33:
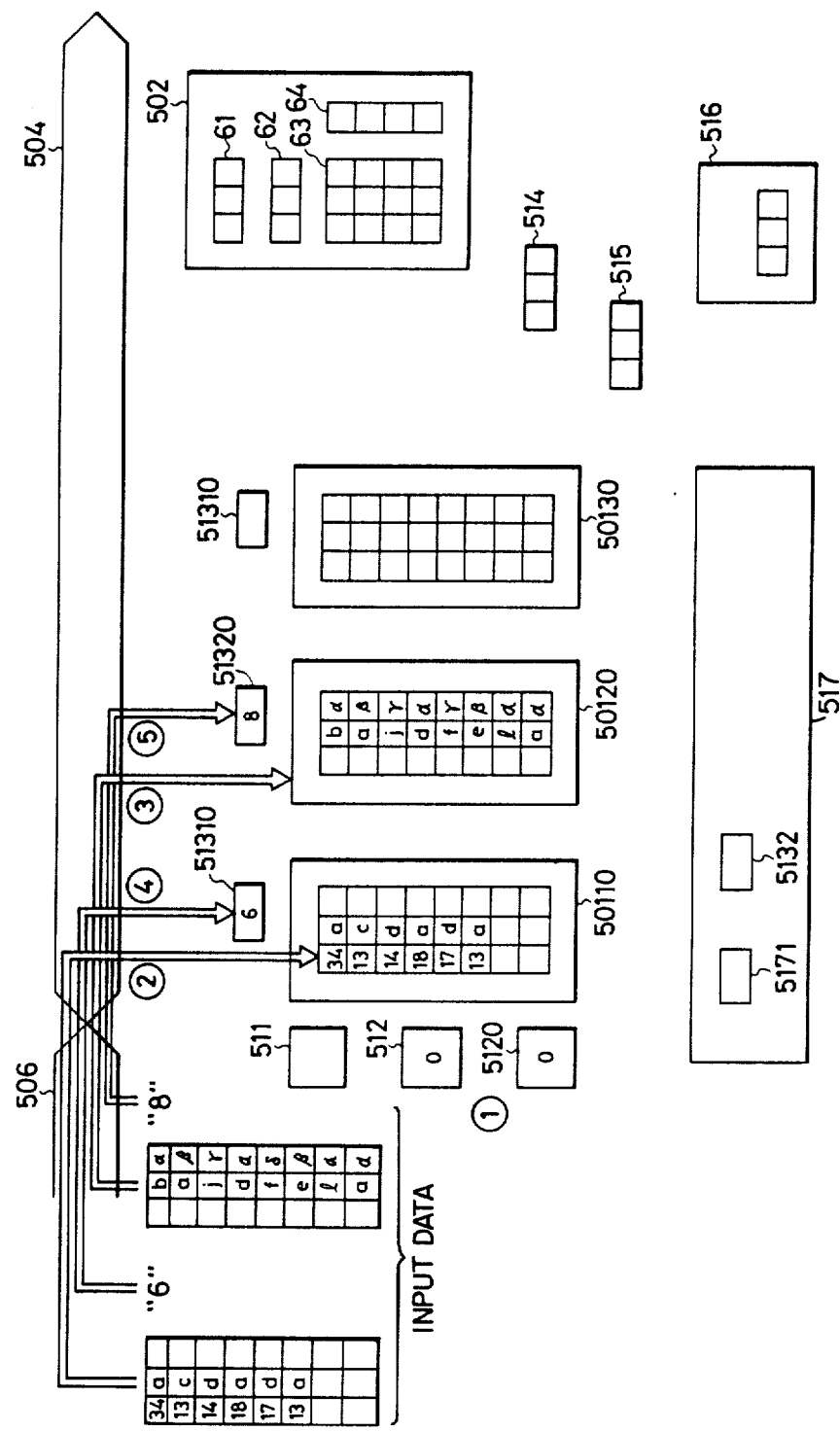
FIGS. 33 to 40 are data flow charts showing the operations of the individual embodiments.
Figure 34:
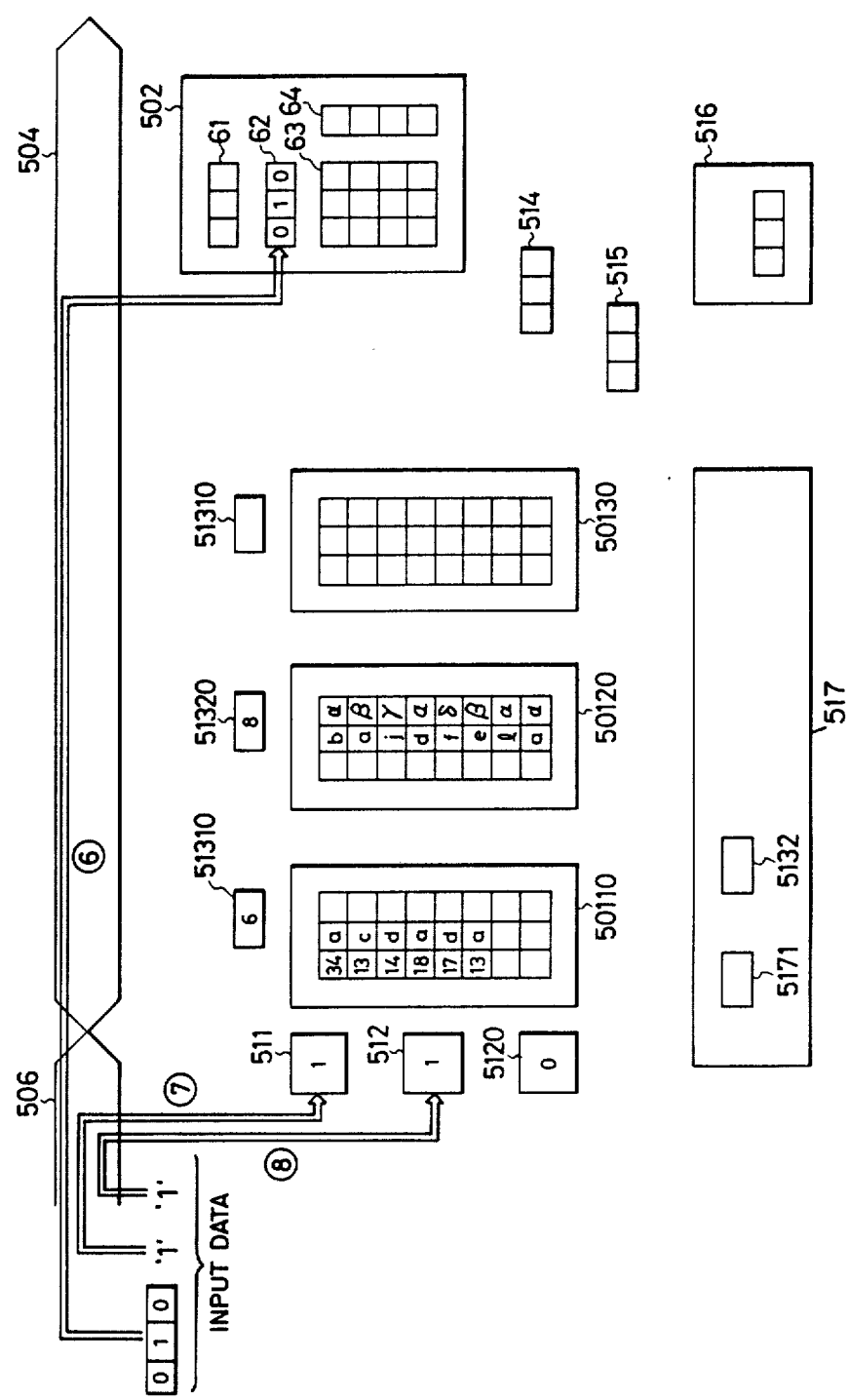
Figure 35:
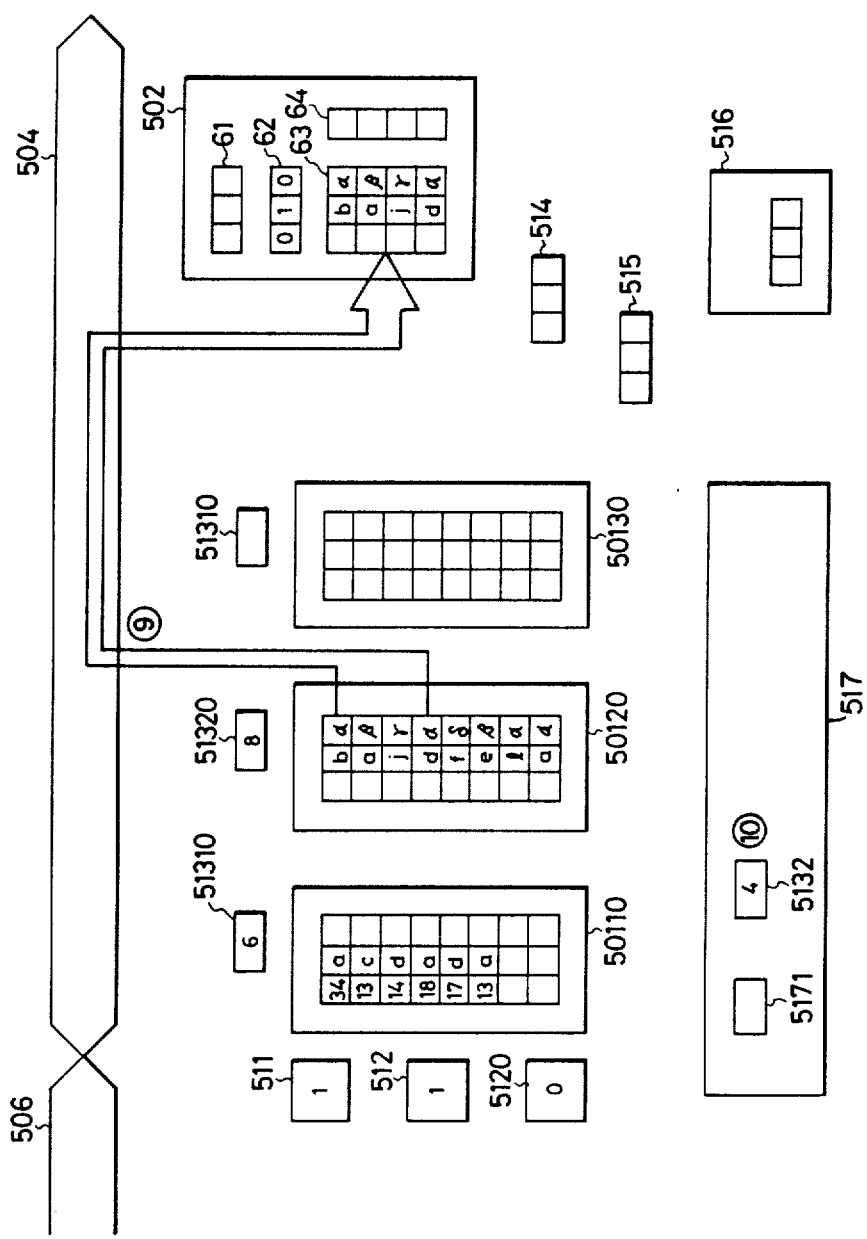
Figure 36:
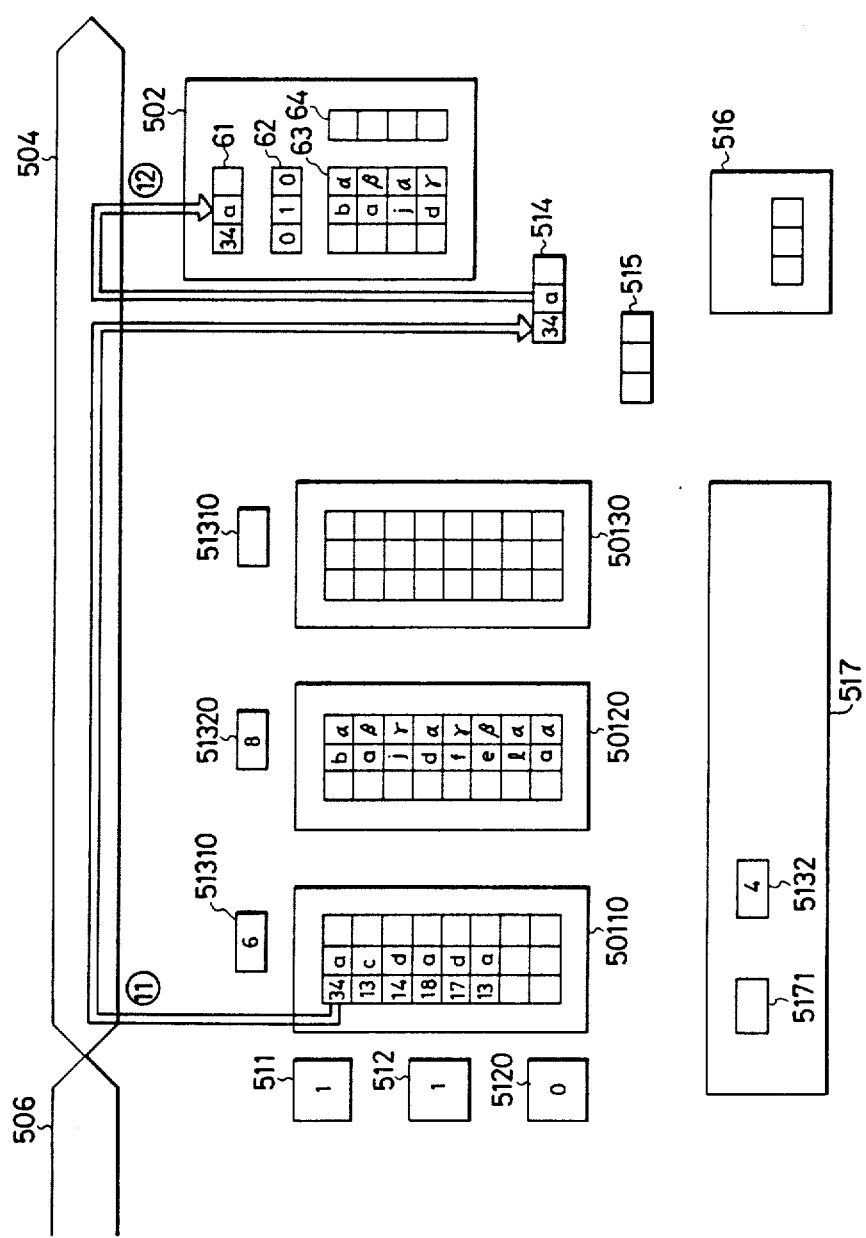
Figure 37:
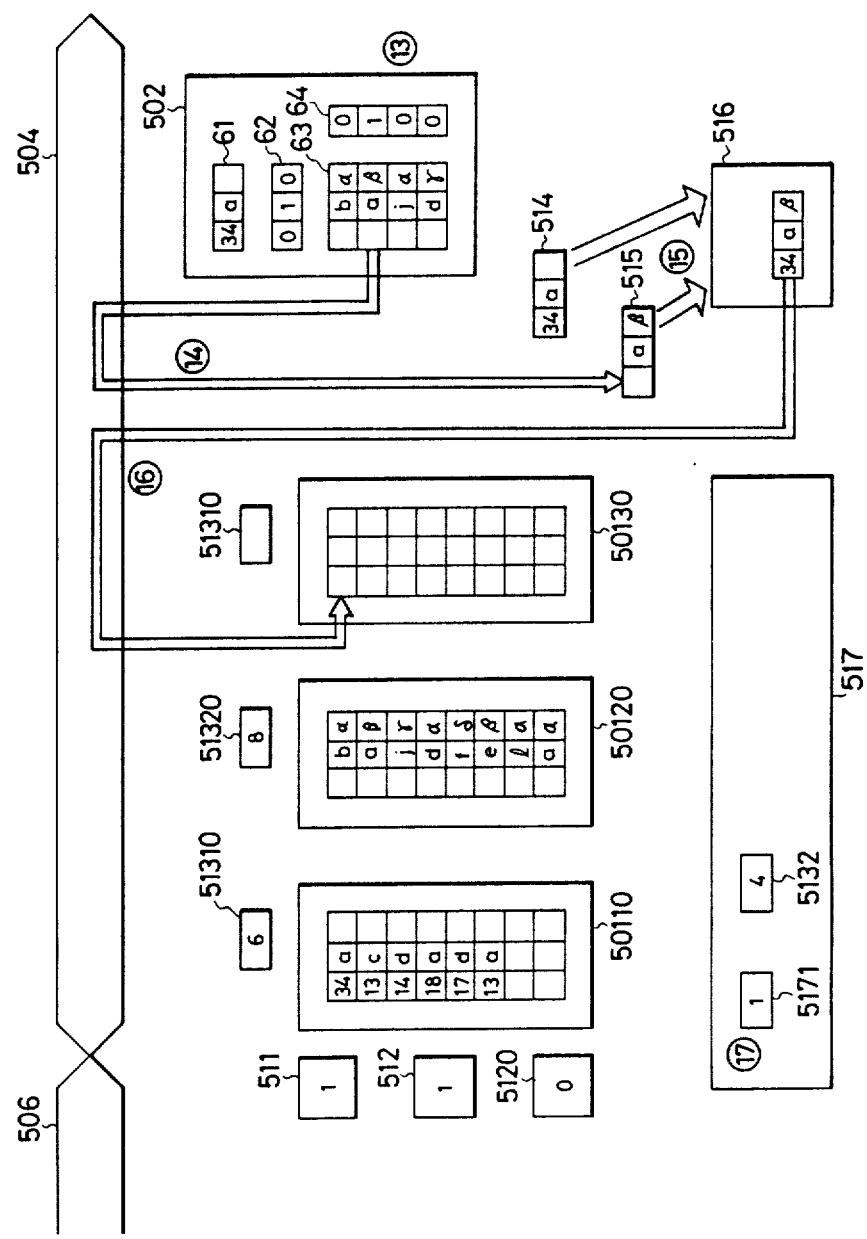

The internal address generating unit 509 is a unit to generate addresses for reading and writing the data of the memory I 50110, the memory II 50120, the memory III 50130 and a CAM 502 when in the internal operation mode. When a main control unit 517 generates on a signal line 5005 a control signal for nominating one of the registers and memory cells in the memory I 50110, the memory II 50120, the memory III 50130 and the CAM 502, it generates and sends out respectively corresponding addresses onto a signal line 5006. The generation of the addresses is conducted in a manner to access the address spaces sequentially from the head for the memory cells of the memory I 50110, the memory II 50120, the memory III 50130 and the CAM. As shown in FIG. 32, more specifically, each time the accesses to the memory I 50110, the memory II 50120, the memory III 50130 and the CAM I 502 are nominated, the address to be generated next is incremented in respectively necessary amounts. For the registers in the CAM 520, on the other hand, addresses nominated respectively thereto are generated. Incidentally, in response to the reset signal of a signal line 5007, the addresses generated for the memory cells of the memory I 50110, the memory II 50120, the memory III 50130 and the CAM 502 are reset at the heads of the memory spaces.

The memory I 50110 is used, as shown in FIG. 30, to store one work table 51 for the JOIN operation. The in-memory data indicated by the address signal on the address signal line 50081 can be accessed through a data signal line 50091 in response to a control signal on a control signal line 50101. Incidentally, an in-memory data volume storing register 51310 indicates the number of rows on which the data is stored actually in the work table 51 stored in the memory I 50110. The present register is set by latching the data of the internal data bus 504 through a signal line 50121 in response to the latch signal on a signal line 50111. On the other hand, the set content is sent out onto a signal line 50131.

The memory II 50120 and the memory III 50130 are used, as shown in FIG. 30, to store another work table 50 for the JOIN operation and the work table 52 resulting from the JOIN algorithm so that the data of the internal data bus is accessed like the memory I 50110 through signal lines 50092 and 50093. Incidentally, signal lines 50082, 50102, 50112, 50083, 50103 and 50113 are similar to the case of the memory I 50110. Moreover, in-memory data registers 51320 and 51330 indicate the number of rows of the data stored in the memory II 50120 and the memory III 50130 like the register 51310. Incidentally, signal lines 50122, 50132, 50123 and 50133 have meanings similar to that of the in-memory data register 51320.

The CAM 502 is accessed by using a control signal line 5016 and has its associative retrieving functions controlled by a reset signal line 5017, a retrieval signal line 5018 and a retrieved result signal line 5019. The associative retrieving functions of the CAM have been described with reference to FIG. 23. The registers 61 and 62 and the memory cells 63 of FIG. 23 are accessed like the ordinary memories by using the signal lines 5014, 5015 and 5016. The associative retrieval is effected by turning on the retrieval signal line 5018 after the data have been stored in the aforementioned registers and memory cells. Of the data in the retrieval data register 61 and the memory cells 63, more specifically, the coincidence comparison of the portion in which the master data register 62 is indicated at "1" is conducted simultaneously for all the data, and the retrieval result flag 64 corresponding to the row of the memory cells 63 of the coincident data is set at "1". If even one of the retrieval result flags 64 is set at "1", this fact is indicated on the retrieval result signal line 5019 and is transmitted to the outside. With no flag being set at "1", it is indicated on the signal line 5019 that there is no retrieval result. Moreover, the data in the memory cell of the first row in which the retrieval result flag 64 is set at "1" are sent out to the data signal line 5015. Next, when the retrieval signal line 5018 is turned on again, the data in the memory cells 63 on a row in which the second retrieval result flag 64 is set at "1" are sent out to the data signal line 5015, and the first flag is diminished. Incidentally, the contents of all the memory cells are cleared by turning on the reset signal 5017.

Which of the memory II 50120 and the memory III 50130 is used for the work table 50 for the JOIN operation and the work table 52 for storing the result of the JOIN operation is indicated by a table indicating flag 511. When the present flag is set at "1", the memory II 50120 is used as the work table 50 for the JOIN operation, and the memory III 50130 is used as the work table 52 for storing the result of the JOIN operation. This usage is reversed when that flag is at "0". The table indicating flag 511 is set by latching the signal of the internal data bus 504 through a signal line 5021 in response to a latch signal of the signal line 5020. Moreover, the set content is sent out to a signal line 5022.

A send over flag 5120 indicates whether or not all the data of the work table 50 (e.g., the memory II 50120 or the memory III 50130), which is decomposed for the JOIN operation processing, are set in the CAM 502. When the present flag is at "0", it is indicated that unprocessed data is left in the work tables. For the level "1", it is indicated that all the data of the work tables is divided and set in the CAM 502. The send over flag 5120 is set by a signal line 5121 in response to a latch signal 5123 of the main control unit 517, and the set content is sent out to the main control unit through the signal line 5121. The present flag is set at "0" through the signal line 5121 before the main control unit 517 sets (in the external operation mode) the mode flag 512 at "0".

The external access control unit 510 is a unit for accessing the aforementioned memory I 50110, the memory II 50120, the memory III 50130, CAM 502, mode flag 512, table indicating flag 511, and in-memory data volume storing registers 51310, 51320 and 51330 from the outside. In the present unit, the signal on the external address bus 507 is decoded to decide what of the aforementioned ones is to be accessed, and the control signal and the latch signal are sent out to the object to be accessed in response to a read/write signal of a signal line 5023. On the other hand, the external access control unit 510 sends out an interruption signal indicating the end of the JOIN operation onto a signal line 5024 to the outside at the end of the JOIN operation (i.e., when the mode flag 512 is switched from its ON to OFF states).

A retrieval data register 514 is a register for picking up and storing the data of one row of the work table which is stored in the memory I 50110. A retrieval result register 515 stores the coincident data which is obtained by associatively retrieving the data of the retrieval data register 514 and the data of the memory cells in the CAM 502. Moreover, the data of the retrieval data register 514 and the retrieval result data register 515 are sent out to a data combining unit through lines 5028 and 5027. These registers are set by latching the signal of the internal data bus 504 through a signal line 5026 in response to a latch signal on a signal line 5025. The set contents are sent out to the signal lines 5027 and 5028, respectively. Moreover, the content of the retrieval data register 514 can be sent out onto the internal data bus 504 through a signal line 50281 by turning on a signal line 50282.

A data combining unit 516 is a unit for combining the data of the retrieval data register 514 and the retrieval result data register 515. The signals of the signal lines 5027 and 5028 are combined, and the signal of the combined result is sent out onto a signal line 5030 in response to a timing signal of a signal line 5029.

The main control unit 517 is a unit for controlling the operation timings of the individual units thus far described, when in the internal operation mode, to advance the JOIN operation. In accordance with the statuses of the mode flag 512 and the table indicating flag 511, the contents of the in-memory data volume storing registers 51310, 51320 and 51330, the result of the associative retrieval of the CAM 502 (i.e., the status of a retrieval result signal line 5019), and the status of the send over flag 5120, the main control unit 517 transmits the signals suitably to control the other parts. Incidentally, the main control unit 517 is equipped therein with an in-memory data volume counter 5171 for counting the data volume of the result of the JOIN operation. The present counter indicates the number of the rows of the data, which is stored in the work table 52 for storing the result of the JOIN operation. The content of the present counter is indicates the address, which is nominated to the present register, in the external address bus 5078 and generates the read signal on the signal line 5023, when in the external access mode, so that an external access control unit 510 generates a read signal on a signal line 5172 and can read it on the external data bus 506 through a signal line 5173.

A processing data volume counter 5132 is used when the decomposition processing shown in FIG. 30 is to be conducted. The counter 5132 is counted up each time the data of the memory II 50120 or the memory III 50130 are transferred to the memory cells 63 in the CAM 502. When the present counter has a larger content than that of the in-memory data volume storing register 51320 or 51330, on the other hand, the main control unit 517 sets the send over flag 5120 at "1" (i.e., the end of the transfer).

A reset part 518 is a unit for setting the initial status of the present JOIN operation system to generate a signal for resetting the mode flag 512, the CAM 502 and the send over flag 5120 in response to a reset signal of an external reset signal line 5031.

Next, the operations of the present embodiment will be described with reference to FIGS. 33 to 40. FIGS. 33 to 40 are data flow charts when in the operations of the present embodiment. Reference numerals appearing in FIGS. 33 to 40 should be referred to FIGS. 23, 30 and 31. Before JOIN operation is initialized, the user first sends the reset signal to the signal line 5031 to set the initial status of the present system. In response to the reset signal, the reset unit 518 generates the internal reset signal on the signals lines 5017, 5004 and 5123, clears the memory cells 63 and flags 64 in the CAM 502, and sets (at ⑥) of FIG. 33, as will be shortly indicated at ①)the mode flag 512 at "0". Moreover, the send over flag 5120 is set at "0". In response to this, the bus exchange control unit 508 joins the external data bus 506 and the internal data bus 504, and the external address bus 507 and the internal address bus 505 so that the data can be set from the outside. Next, the user sets (at ② and ③) the two work tables to be subjected to the JOIN operation in the memory I 50110 and the memory II 50120. The description to be made in the following is directed to the case the the memory II 50120 is to be set with the data for the JOIN operation whereas the memory III 50130 is to be set the data of the result of the JOIN operation. The user sets (at ④ and ⑤) the in-memory data volume storing registers 51310 and 51320 with the number of the rows set in the memory I 50110 and the memory II 50120, when he sets the data to be subjected to the JOIN operation. The setting in the present registers is conducted by the external access control unit 510. More specifically, the data to be set is sent out to the external data bus 506 and transmitted to the internal data bus 504. By setting the external address bus 507 with the addresses nominated to the in-memory data volume storing registers 51310 and 51320 and by transmitting the write signal to the signal line 5023, moreover, the external access control unit 510 generates latch signals on the signal lines 50111 and 50112 of the in-memory data volume storing registers 51310 and 51320 of the memory I 50110 and the memory II 50120 thereby to pick up the data on the internal data bus through the signal lines 50121 and 50122. Incidentally, the settings of the table indicating flag 511 and the mode flag 512 from the outside are absolutely similar. After the settings thus far described, the user stores (at ⑥) the mask data registers 62 of the CAM 502 with the data for masking the values other than the two sets of common variable values (which should be referred to FIG. 22) to be subjected to the JOIN operation, indicates (at ⑦) the memory (i.e., the memory II 50120 in this instance), which stores the data to be subjected to the JOIN operation, as the partner of the JOIN operation of the memory I 50110 in the table indicating flag 511 and sets the mode flag 512 at "1" thereby to invite the internal operation mode. When the mode flag 512 is set at "1", the bus exchange control unit 508 disconnects the external data bus 506 and the internal data bus 504, and the external address bus 507 and the internal address bus 505, and joins the signal line 5006 of the address signal, which' is to be generated by the internal address generating unit 509, to the internal address bus 505. The main control unit 517 starts the operation of controlling the JOIN operation when the signal of the signal line 5001 is set at "1" (i.e., at ⑧ in the internal operation mode). The main control unit 517 first generates the reset signal on the signal line 5007 and resets the internal address generating unit 509 (The reset content should be referred to the foregoing description of the internal address generating unit). Next, in order to set the memory cells in the CAM with the data set in the memory II 50120, the main control unit 517 compares the capacities (i.e., the row numbers of the memory cells) of the in-memory data volume storing register 51320 and the memory cell 63 indicted in advance by the user and determines the row number (i.e., the smaller one of the row number of the data of the memory II 50120 and the row number of the memory cells 63 of the CAM 502) of the data to be set in the memory cells in the CAM 502. Moreover, the main control unit 517 sends out the addresses of the memory cells 63 in the CAM 502 through a signal line 50141, generates the address of the memory II 50120 in the internal address generating unit 509, and decomposes and sets (at ⑨ of FIG. 35) the one word data for the JOIN operation in the memory cells in the CAM through the internal data bus from the memory II. Moreover, the processing counter 5132 in the main control unit 517 counts up (at ⑩) the row number set in the memory cells in the CAM 502 from the memory II 50120. The main control unit 517 compares through the signal line 50131 the content (i.e., the row number of the work data int he memory II 50120 to be processed in the CAM 502) of the processing data volume counter 5132 and the content of the in-memory data volume storing register 51320. The main control unit 517 sets the send over flag at "1" through the signal line 5121, when the contents compared are coincident, and sets the same flag at "0" in the absence of the coincidence (i.e., when the data to be subjected to the JOIN operation are left in the memory II). After this, the main control unit 517 executes the JOIN operation in accordance with the procedures of FIG. 30. More specifically, the data of the work table 51 stored in the memory I 50110 are picked up sequentially row by row from the head thereof, and the following processings are repeated for the data at such a number of times as is indicated in the in-memory data volume storing register 51310. The main control unit 517 first clears its internal in-memory data volume counter 5171 to zero. Next, the main control unit 517 transmits the signal indicating the memory I 50110 to the signal line 5005 and causes the internal address generating unit 509 to generate the address for accessing the memory I 50110 (For the address generating method reference should be mode to the foregoing description of the internal address generating unit 509). After this, the main control unit 517 generates the control signal for the memory read operation on the signal line 50101 and reads out the content of one line of the data of the work table, which is stored in the memory I 50110, on the internal data bus. The data thus read is latched (at ⑪ of FIG. 36) by the retrieval data register 514 through the signal line 5026 by transmitting the latch signal to the signal line 5025 of the retrieval data register 514. After this, the main control unit 517 transmits the data send signal to the signal line 50282 to send out again the content of the retrieval data register 514 onto the internal data bus 504 through the signal line 50281. The data thus sent is read in the retrieval data register 61 in the CAM 502. More specifically, the main control unit 517 transmits the signal indicating the retrieval data register 61 of the CAM 502 to the signal line 5005 to cause the internal address generating unit to generate the address of the retrieval data register 61 of the CAM 502, and incorporates (at ⑫ of FIG. 36) the write signal into the CAM 502 by transmitting it to a signal line 5016 of the CAM 502. As described hereinbefore, the descriptions of the accessing procedures of the memory I 50110, the memory II 50120, the memory III 50130, the CAM 502 and other registers will be omitted because they are similar. After having stored the data in the retrieval data register 61 of the CAM 502, the main control unit 517 transmits a retrieval signal to a signal line 5018 of the CAM 502 to effect the associative retrieval (at ⑬ of FIG. 37 which will be omitted). The main control unit 517 repeats the following operations, until the retrieval result signal (on the signal line 5019) of the CAM is turned off, and stores the JOIN operation result in the memory III 50130. More specifically, the main control unit 517 turns on the retrieval signals (on the signal line 5018) sequentially and sends out the retrieval result data onto the internal data bus 504 to latch it in the retrieval result register 515 (at ⑭). After this, the data combined result is sent out to the internal data bus 504 through the signal line 5030 by combining (at ⑮) the content of the retrieval data register 514 and the content of the retrieval result register 515 by the data combining unit 516 and by transmitting the send signal to the signal line 5029. The data thus sent out is stored (at ⑯) sequentially from the head in the memory III 50130. Incidentally, the stored addresses are generated in the aforementioned procedures by the internal address generating unit 509. During the data storage, moreover, the in-memory data volume counter 5171 is counted up (at (17)). The operations thus far described are repeated until the retrieval result signal (on the signal line 5019) is turned off. Next, the main control unit 517 sends the reset signal to the CAM 502 through the signal line 5121 and the signal line 5017, if the content of the send over flag is at "0" (i.e., in the status in which decomposed and unprocessed data to be subjected to the JOIN operation is left in the memory II 50120), to clear (at (17) of FIG. 38 which will be omitted) the memory cells 63 and retrieval result flags 64 in the CAM 502. Next, the unprocessed data is sent over. If the content of the processing data volume counter 5132 is lower than the value of the in-memory register 51320, the main control unit 517 counts up (at (18))) the processing data volume and sends out that content as the address of the memory II 50120 to the internal address bus 505 by the action of the internal address generating unit 509. On the contrary, the addresses of the memory cells 63 in the CAM 502 are sent out into the CAM 502 through the signal line 50141 by the main control unit 517. The addresses of the memory cells 63 are indicated sequentially from the head of the memory cells 63. The data to be transferred is sent out from the memory II 50120 through the signal line 50092 to the internal data bus 504 and further to the memory cells 63 in the CAM 502 through a signal line 5015. The data transfer is conducted in the aforementioned manner, and this transfer is interrupted either in case the memory cells 63 in the CAM 502 are filled up with the data or in case the content of the processing data volume counter 5132 becomes larger than that (i.e., the data volume of the memory II 50120) of the in-memory register 51320. Incidentally, in the latter case, the main control unit 517 sets (at (20)) the send over flag 512 at "1" (i.e., the end of transfer) through the signal line 5121. If the memory cells 63 in the CAM 502 are set with the data, the main control unit 517 executes again the JOIN operation in accordance with the data processing method of FIG. 30 to store the result in the memory III 50130 (as shown in FIG. 39).

Figure 38:
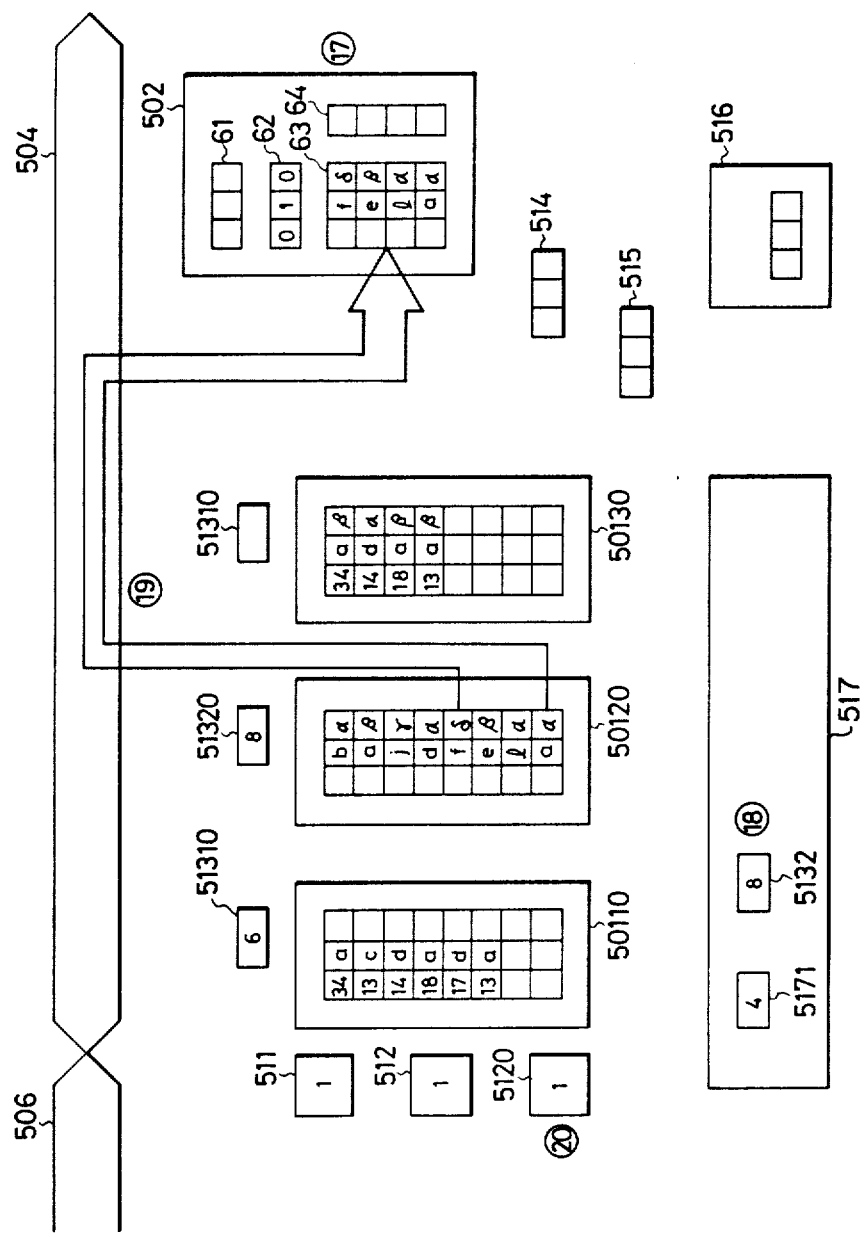
Figure 39:
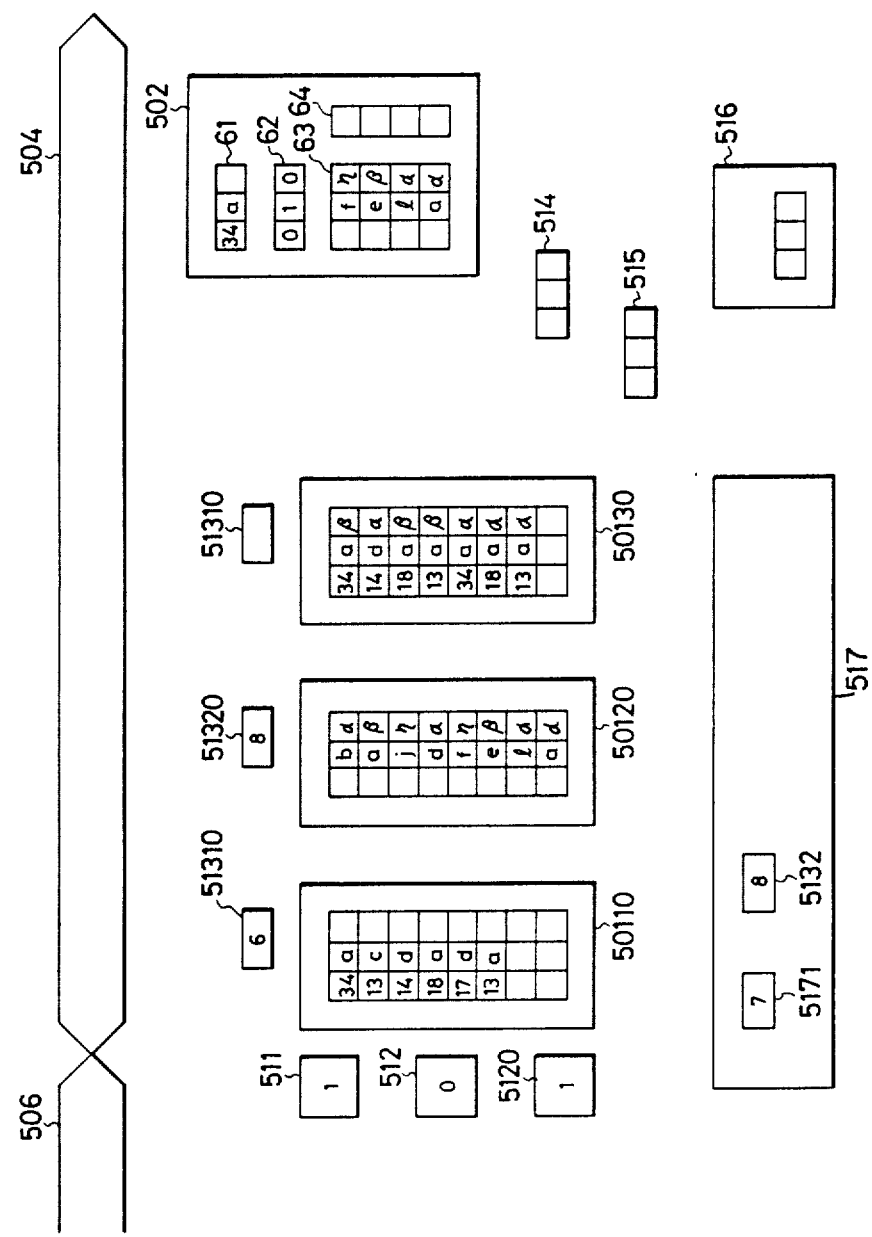
Figure 40:
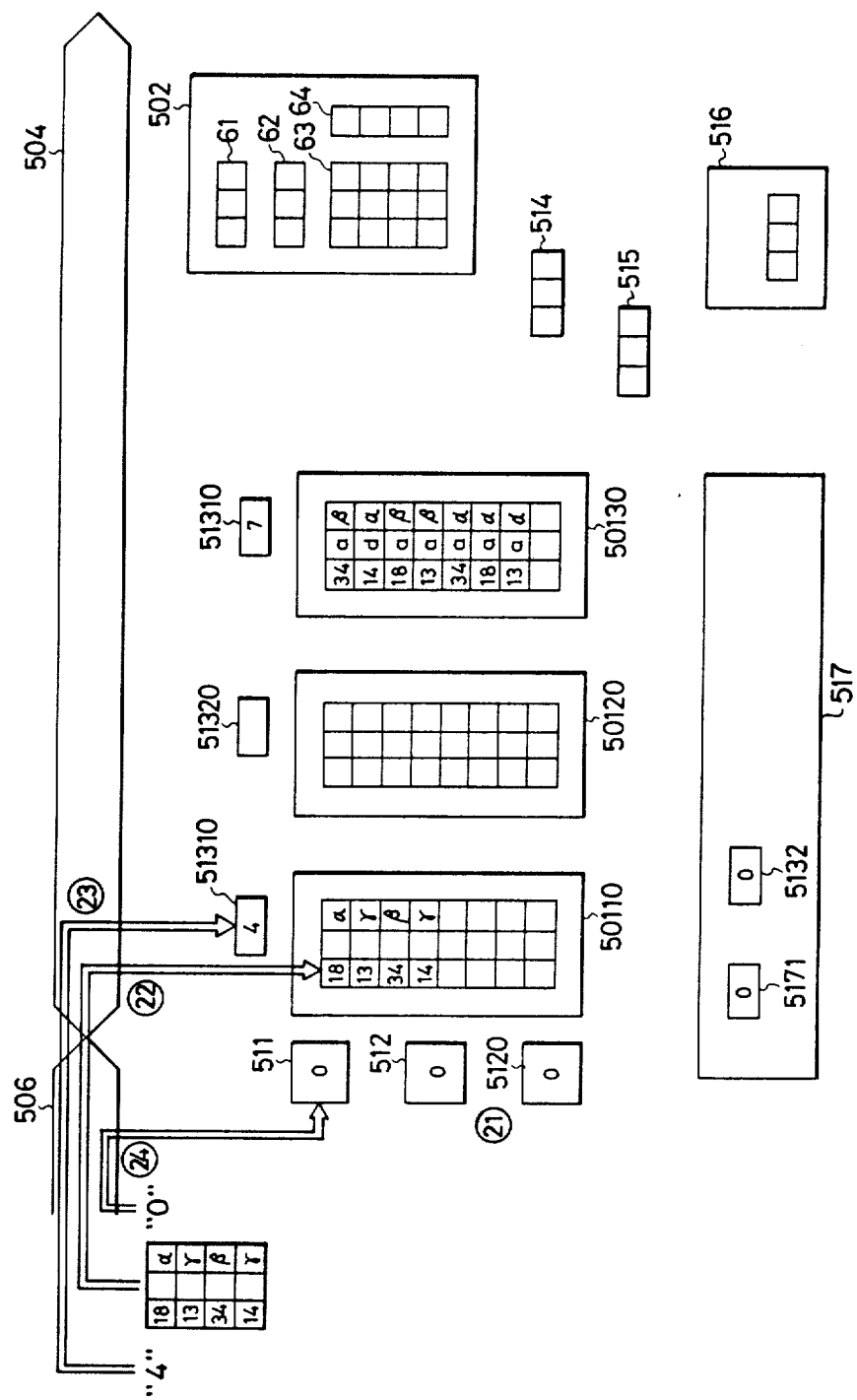

In the manner thus far described, the operations of FIGS. 38 and 39 are repeated until the main control unit 517 sets the send over flag at "1". If the processings of all the work data of the memory II 50120 are completed, the main control unit 517 generates the reset signals on the signal line 5017 of the CAM 502 and on the signal line 5004 to clear (at (21) of FIG. 40 which will be omitted) the CAM 502 and the mode flag 512. This makes it possible again to access the inside of the present system from the outside. The end of the JOIN operation is indicated by the fact that the external access control unit 510 transmits an interruption signal to the signal line 5024 at the instant when the mode flag 512 is switched from "1" to "0". In case the arithmetic result is to be picked up as it is, the content of the memory III 50130 indicated by the table indicating flag 511 from the outside may be read out by the number of rows indicated by the in-memory data volume counter 5071. The reading from the outside is controlled by the external access control unit 510, as has been described hereinbefore. On the other hand, in case three or more conditions are nominated in the IF part of the rules in the rule based software so that they have to be subjected again to the JOIN operation, the user sets (at (22) of FIG. 40 which will be omitted) the data of the work table 51 picked up from the outside for the third or later IF sentences likewise the operations of 2 and 4 of FIG. 34 in the memory I 50110 by the use of the external access control unit 510. The user further sets the in-memory data volume and the mask data in the in-memory data volume storing register 51310 (at (23)) and in the mask data register 62 in the CAM 502, respectively. By exchanging (at (24)) the indicating flag 512 (e.g., "1"→"0" or "0"→"1"), moreover, the table 52 stored with the previous JOIN operation result is exchanged to the table 51 for the JOIN operation to repeat the operations of FIGS. 34 to 39. As a result, the JOIN operation indicated by three or more IF sentences can be carried out.

By decomposing and processing the work tables of large capacities, as shown in FIG. 30, according to the present embodiment, even the associative memory system having a relatively small capacity can make use of its parallel retrieving functions.

Next, another modification of the second embodiment will be described int he following.

According to the present embodiment, two work tables for the JOIN operation are placed together on the CAM so that the number of times of comparison processings may always be minimized to effect the JOIN algorithm at a high speed by using such one of the work tables for the retrieval data as has a smaller number of rows stored with variable values.

Figure 42:
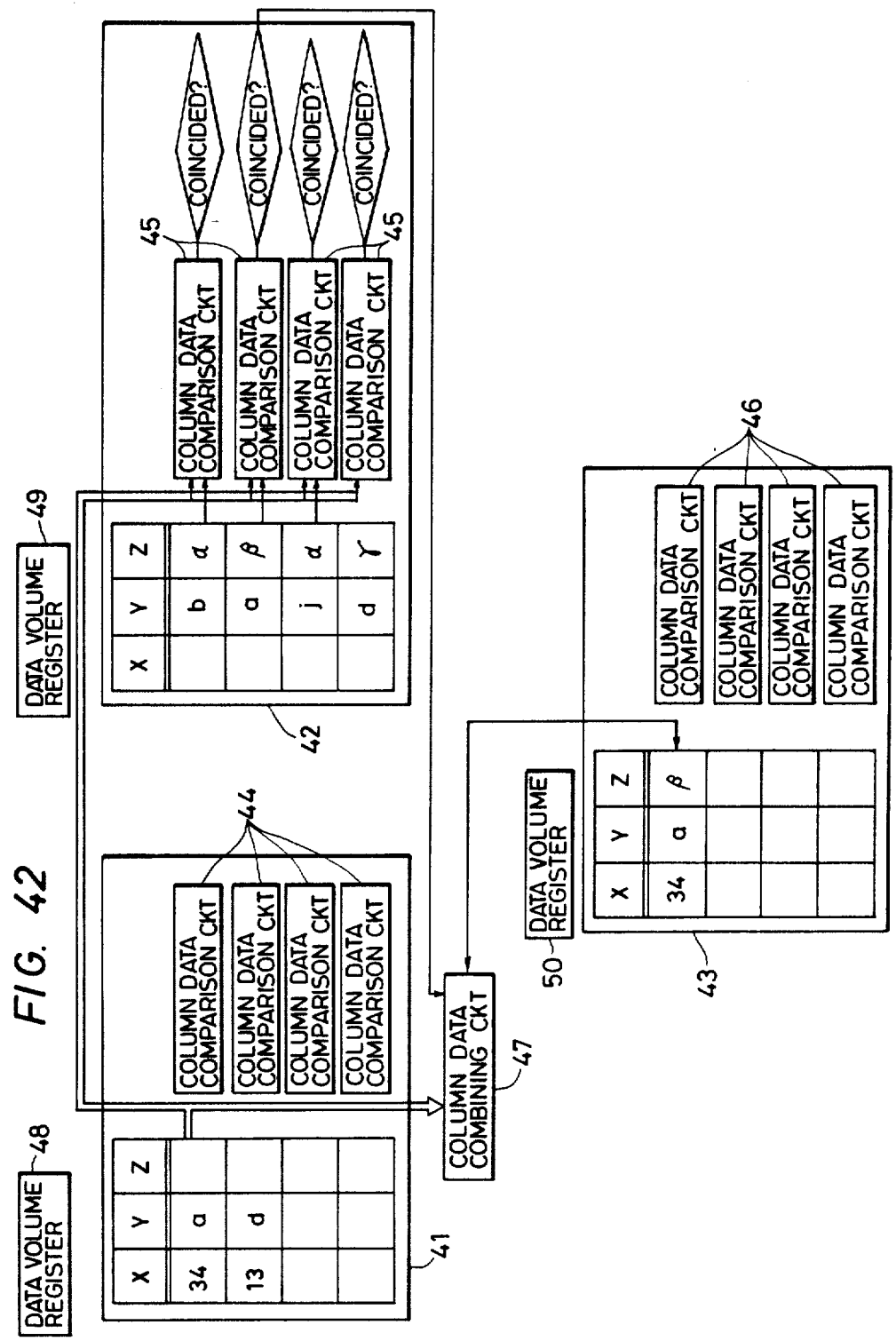
FIG. 42 is a diagram for explaining the operational principle of the present invention.
Figure 43:
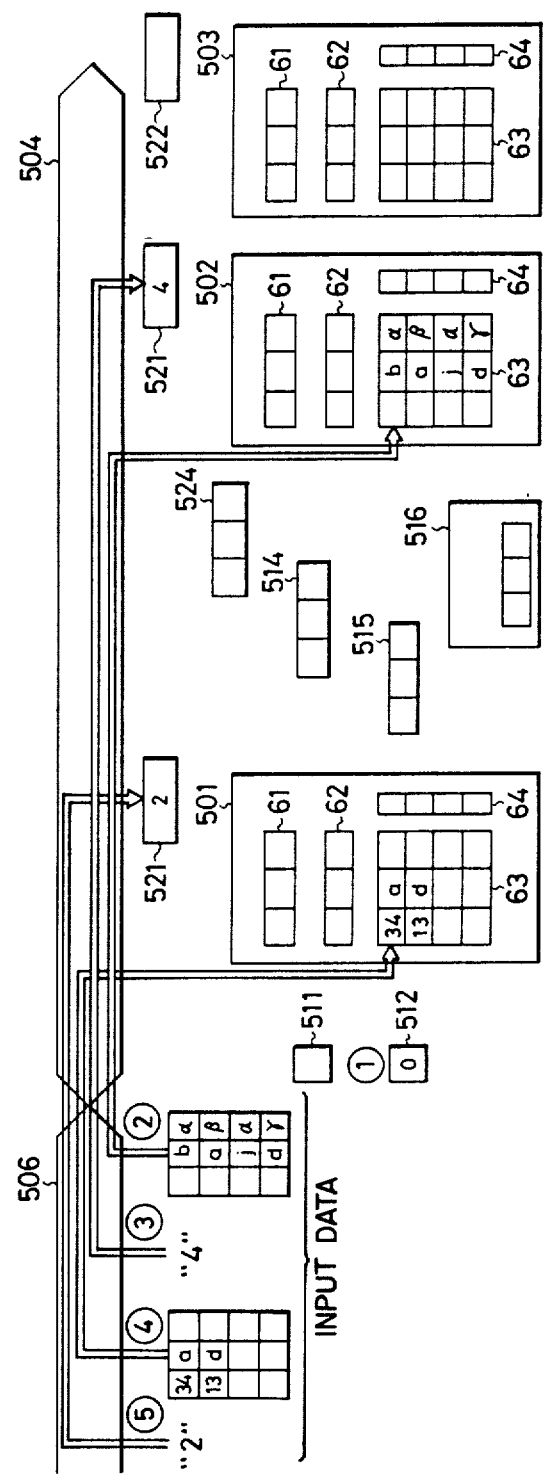
FIG. 43 to 48 are data flow charts showing other embodiments of the present invention.
Figure 44:
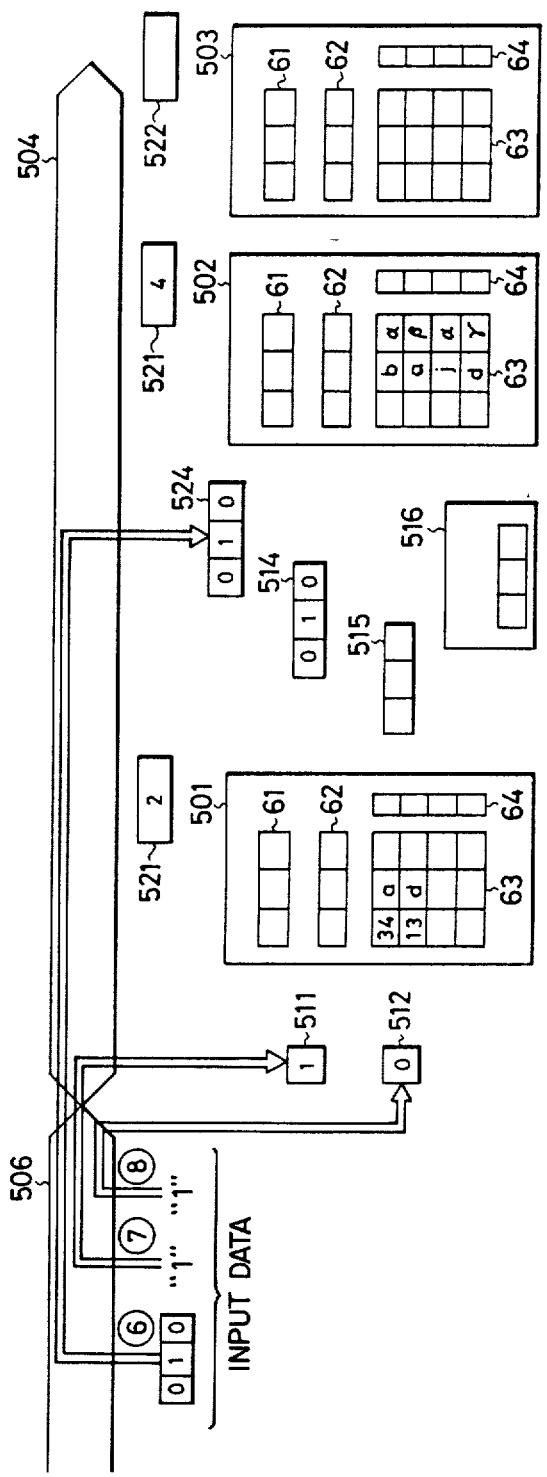
Figure 45:
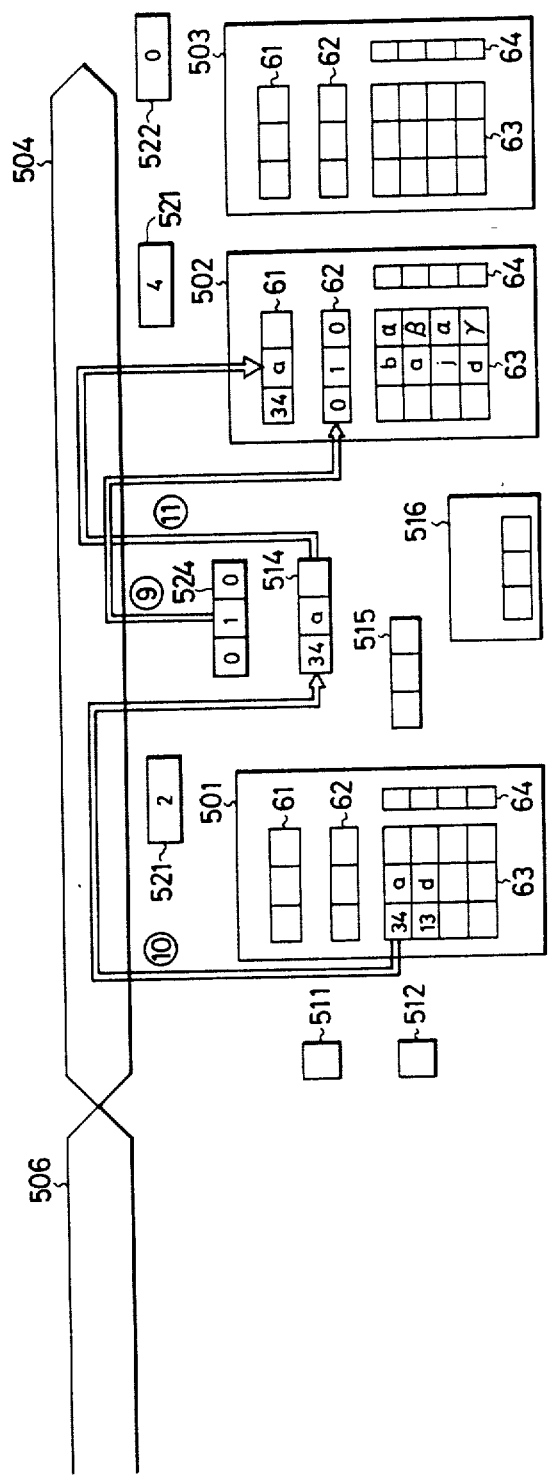
Figure 46:
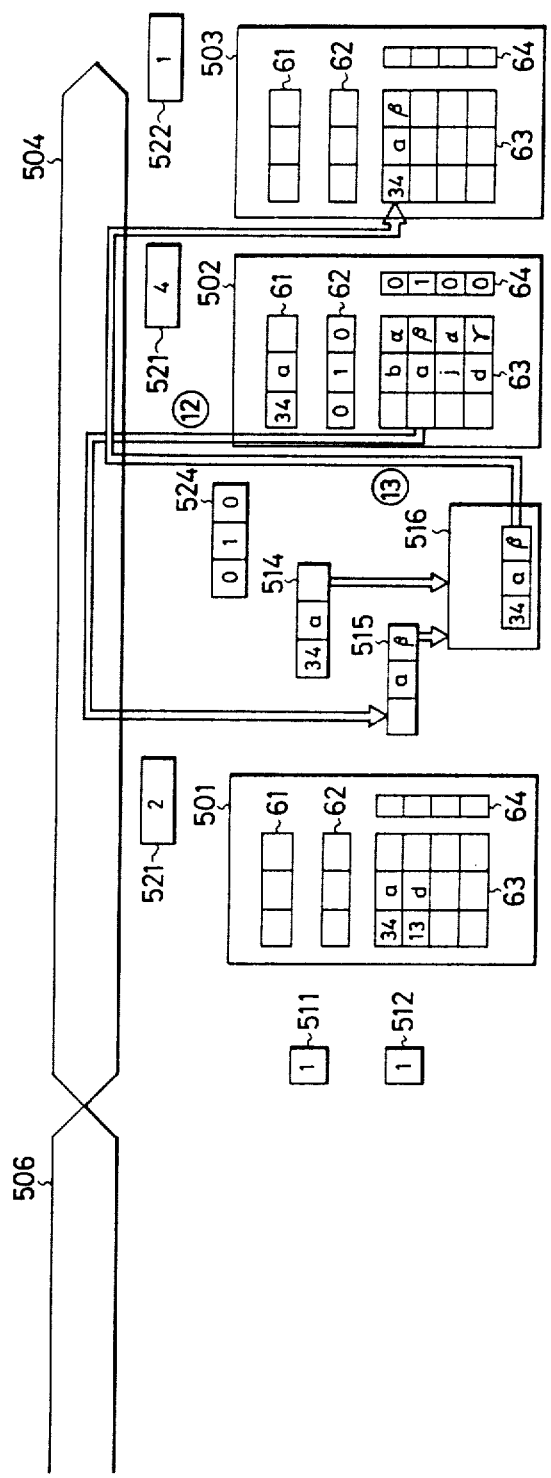

As shown in FIG. 42, more specifically, the two work tables for the JOIN operation and the data volumes are stored in a CAM 41, a CAM 42, a data volume register 48 and a data volume register 49, respectively. Incidentally, the table data resulting from the JOIN operation is stored in a CAM 43, and the its volume is stored in a data volume register 50. The operations will be described in the following. The contents of the two data volume registers 48 and 49 are compared, and the retrieval data is picked up (while masking the data X and Z other than the common variable Y) row by row from the CAM stored with the work table of smaller data volume. In the example of FIG. 42, the retrieval data is picked up from the CAM 41. In the CAM 42, the comparison processings of the data are conducted simultaneously for all of the rows of the table data in the CAM 42 by a comparing unit 55. The rows of the tables in the CAM 42, in which the retrieval data and the common data have identical values, are picked up one by one and combined with the retrieval data by the row data combining especial circuit 49 so that the combined data is stored sequentially in another CAM 43. At this instant, the data volume register 50 memories the number of the data stored in the CAM 43. By using the three CAMs, in case there are three or more letter columns having the conditions of the IF parts described therein so that the variable value meeting the AND condition generated and new variable values incorporated for a subsequent IF condition have to be combined and subjected again to the repeated JOIN operation, the present system is enabled to execute the JOIN operation continuously without any data transfer by incorporating the new variable values into the CAM 41 and by exchanging the roles of the CAMs 42 and 43 suitable. Upon the JOIN operation, moreover, the retrieval data can always be picked up from the CAM having a less data volume by storing the data volumes sotred in the respective CAMs so that the number of times of the comparison processings can always be minimized. This makes it possible to execute the processings of the rules of the rule based software efficiently.

Figure 41:
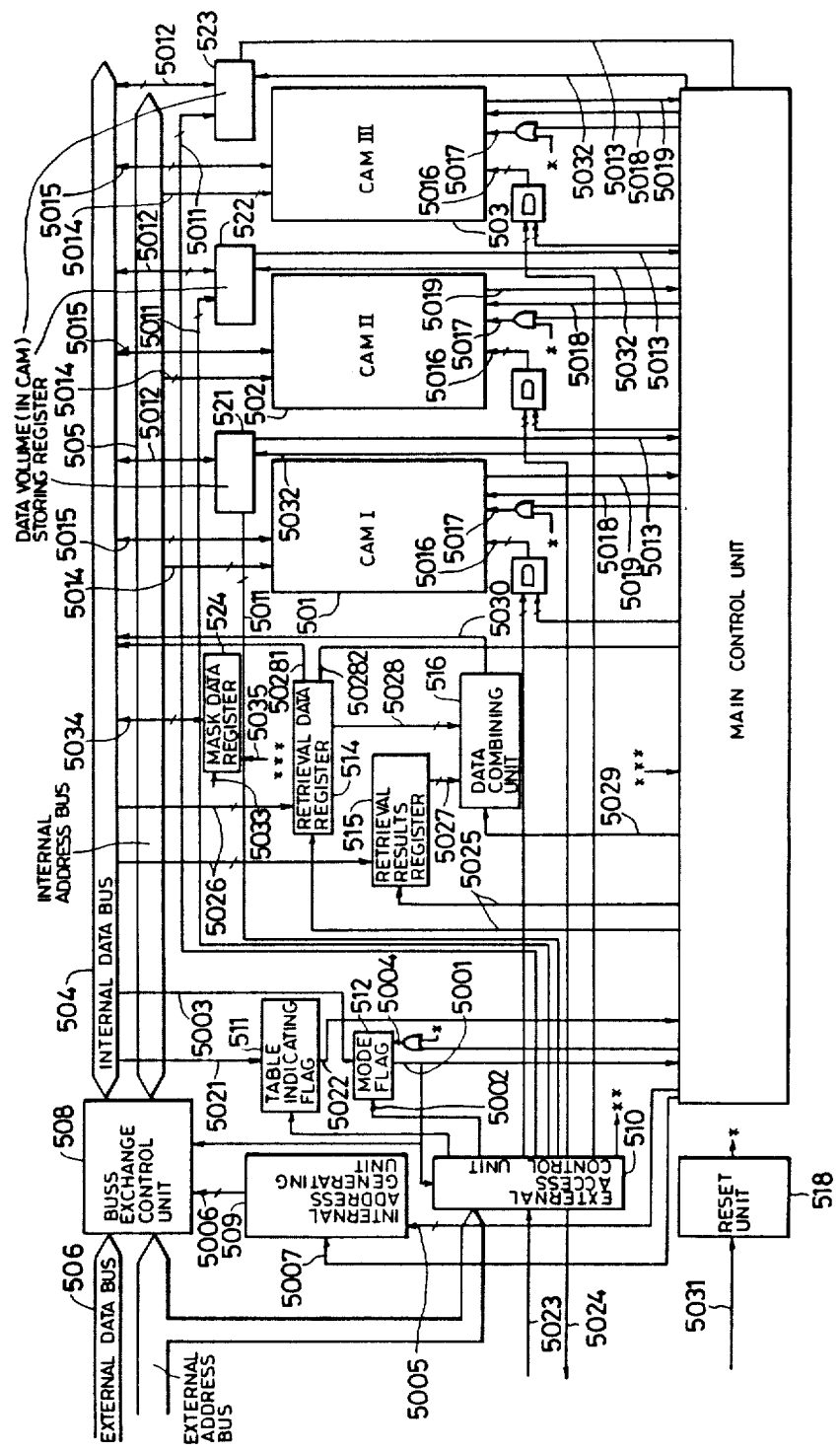
FIG. 41 is a block diagram showing a JOIN algorithm device according to the present invention.

FIG. 41 is a block diagram showing still another embodiment of the JOIN operation system according to the present invention.

In FIG. 41, an internal data bus 504 and an internal address bus 505 are bus lines for a data signal and an address signal in the present system, respectively. On the other hand, an external data bus 506 and an external address bus 507 are bus lines for data signals for accessing a CAMI 501, a CAMII 502, a CAMIII 503 and other flags and registers in the present system, respectively, from the outside. The present system has two modes, i.e., an external access mode and an internal operation mode. The external access mode is a mode capable of indicating addresses in the external address bus 507 from the outside to write the data on the external data bus 506 into the present system, and reading out the data in the present system onto the external data bus 506. The internal operation mode is a mode for executing the JOIN operation automatically on the basis of a principle shown in FIG. 42. The exchange of the modes is indicated by a mode flag 512. The mode flag indicated the external access mode, when it is set at "0", and the internal operation mode when it is set at "1". The mode flag 512 is set at "1" by latching the signal of the internal data bus 504 through a signal line 5003 in response to a latch signal of a signal line 5002 and is reset at "0" in response to a reset signal of a signal line 5004. Moreover, the status of the mode flag is sent out to a signal line 5001. Usually, the mode flag is in the status of "0" and in the external access mode.

In response to the signal of the signal line 5001 indicating the status of a mode flag 512, a bus exchange control unit 508 operates to join the external data bus 506 and the external address bus 507 to the internal data bus 504 and the internal address bus 505, when in the external access mode, and to disconnect them, when in the internal operation mode, to join an address signal line 5006 of an internal address generating unit 509 to the internal address bus 505.

The internal address generating unit 509 is a unit for generating addresses for reading and writing the data of the CAMI 501, the CAMII 502 and the CAMIII 503 when in the internal operation mode. When a main control unit 517 generates on the signal line 5005 control signals for indicating one of the registers and memory cells in the CAMI 501, the CAMII 502 and the CAMIII 503, that internal address generating unit 509 addresses corresponding to those control signals, respectively, and send out them onto the signal line 5006. The generations of the addresses are conducted in a manner to access the address spaces sequentially from the head therof for the memory cells of the CAMI 501, the CAMII 502 and the CAMIII 503.

Foregoing FIG. 19 is a block diagram showing the relations among the addresses of the three CAMs of FIG. 41. Each time the accesses of the memory cells of the CAMI 501, the CAMII 502 and the CAMIII 503 are indicated, as shown in FIG. 19, the next addresses generated are incremented by respectively necessary amounts. For the registers in the CAMI 501, the CAMII 502 and the CAMIII 503, on the other hand, there are generated addresses assigned thereto, respectively. Incidentally, in response to a reset signal of a signal line 5007, the generated addresses for the memory cells of the CAMI 501, the CAMII 502 and the CAMIII 503 are reset at the head of the memory spaces.

The CAMI 501 is used, as shown in FIG. 42, to store one work table for the JOIN operation, whereas the CAMII 502 and the CAMIII 503 are used, as shown in FIG. 42, to store the other work table for the JOIN operation and the work table for the result of the JOIN operation. The CAMI 501, the CAMII 502 and the CAMIII 503 can access the in-CAM memory cell data indicated by an address signal on an address signal line 5014 through a data signal line 5015 in response to a control signal on a control signal line 5016 and can have its associative retrieving functions controlled by a reset signal line 5017, a retrieval signal line 5018 and a retrieval result signal line 5019.

The associative retrieving functions of the CAMs have already been described with reference to FIG. 23.

The registers 61 and 62 and the memory cells 63 of FIG. 23 are accessed like the ordinary memories by using the signal lines 5014, 5015 and 5016. After the data has been stored in those registers 61 and 62 and memory cells 63, the associative retrievals are conducted by turning on the retrieval signal line 5018. More specifically, the coincidence comparisons of such data of the portion of the portion, in which the mask data register 62 is indicated at "1", as belong to the data in the retrieval data registers 61 and the memory cells 63 are conducted simultaneously for all the data in the memory cells 63 so that the retrieval result flag 64 corresponding to the row of the memory cells 63 of the coincident data is set at "1". If even one of the retrieval result flags 64 is set at "1", this fact is indicated on the retrieval signal line 5019 and is transmitted to the outside. If no flag is set at "1", on the other hand, it is indicated on the signal line 5019 that there is no retrieval result. Moreover, the data in the memory cells 63 on the first row, in which the retrieval result flag 64 is set at "1", are sent out to the data signal line 5015. Next, when the retrieval signal line 5018 is turned on again, the data in the memory cells 63 on the row, in which the second retrieval result flag 64 is set at "1", are sent out to the data signal line 5015 so that the first flag is diminished. Incidentally, the contents of all the memory cells 63 are cleared by turning on the reset signal line 5017.

Which of the CAMII 502 and the CAMIII 503 is to be used for the work table for the JOIN operation or for the work table for storing the JOIN operation result is indicated by a table indicating flag 511. When this flag is at "1", the CAMII 502 is used as the work table for the JOIN operation whereas the CAMIII 503 is used as the work table for storing the result of the JOIN algorithm. This usage is reversed for the value "0". The table indicating flag 511 is set by latching the signal of the internal data bus 504 through a signal line 5021 in response to a latch signal of a signal line 5020. Moreover, the set content is sent out to a signal line 5022.

An external access control unit 510 is a control unit for accessing the CAMI 501, the CAMII 502, the CAMIII 503, the mode flag 512, the table indicating flag 511, an in-CAMI data volume storing register 521, an in-CAMII data volume storing register 522, an in-CAMIII data volume storing register 523 and a mask data register 524 from the outside. This external access control unit 510 decodes the signal on the external address bus s507 to decide which of the aforementioned ones is to be accessed, and sends out the control signal and the latch signal to a target to be accessed in response to a read/write signal of a signal line 5023. At the end of the JOIN operation when the mode flag 512 is switched from its ON to OFF state, moreover, the interruption signal indicating the end of the JOIN operation to the outside is sent out onto a signal line 5024.

The mask data register 524 can be written by indicating the address, which is assigned thereto, to the external address bus 507 and by generating the write signal on the signal line 5023. By the aforementioned write signal, more specifically, the external access control unit 510 is enabled to generate the write signal on a signal line 5033 and to write the content of the external data bus 506 in the register through a signal line 5034. Moreover, the content of the register is sent out to the internal bus 504 in response to the read signal of a signal line 5035.

A retrieval data register 514 is a register for picking up and storing the data of one row of such one of the two work tables for the JOIN operation as is stored in the CAM having a less data volume, whereas a retrieval result register 515 is a register for picking up the coincident retrieval result data from the CAM having a more data volume and for storing the same when the CAM is associatively retrieved by using the data identical to the content of the register 515 as the retrieval data. These registers are set by latching the signal of the internal data bus 504 through a signal line 5026 in response to the latch signal on a signal line 5025. The set contents are sent out to signal lines 5027 and 5028, respectively. Moreover, the retrieval data register 514 is enabled to send out the content onto the internal data bus 504 through a signal line 50281 by turning on a signal line 50282.

The in-CAMI data volume storing register 521, the in-CAMII data volume storing register 522 and the in-CAMIII data volume storing register 523 indicate the number of rows in which the data are stored actually in the work tables stored in the CAMs. These registers 521, 522 and 523 can be written when in the external access mode by indicating the addresses, which are assigned to the respective registers, to the external address bus 507 and by generating the write signal on the signal line 5023. In response to the aforementioned write signal, more specifically, the external access control unit 510 can generate the write signal on a signal line 5011 to write the content of the external data bus 506 in the registers through a signal line 5012. Likewise, the contents of the registers can also be read out to the external data bus 506 through the aforementioned signal lines. Moreover, those registers store the data volumes of the JOIN algorithmic results through a signal line 5032. Incidentally, the contents of the registers are sent out onto a signal line 5013.

A data combining unit 516 is a unit for data combining arithmetic. This combining unit combines the signals of the signal lines 5027 and 5028 and sends out the signal of the combined result onto a signal line 5030 in response to a timing signal of a signal line 5029.

A main control unit 517 is a unit for controlling the operation timings of the respective units thus far described, when in the internal operation mode, to advance the JOIN operation. In accordance with the statuses of the mode flag 512 the table indicating flag 511 and the associative retrieval results (i.e., the status of the retrieval result signal line 5019) of the in-CAM data volume storing registers 521, 522 and 523, the CAMI 501, the CAMII 502 and the CAMIII 503, the main control unit 517 perform its controls suitably by transmitting signals to other units.

A reset unit 518 is a unit for setting the initial status of the JOIN operation system and generates signals for resetting the mode flag 512, the CAMI 501, the CAMII 502 and the CAMIII 503 in response to a reset signal of an external reset signal line 5031.

FIGS. 43 to 48 are data flow charts showing the operations of the present embodiment. The operations of the present embodiment will be described in the following with reference to FIGS. 41, 19, 23, and 43 to 48.

Reference symbols and numerals appearing in FIGS. 43 to 48 designate elements similar to those of FIGS. 19 and 41.

Prior to the start of the JOIN operation, the user first sends the reset signal to the signal line 5031 to set the initial status of the present system. In response to the reset signal, the reset unit 518 generates the internal reset signals on the signal lines 5017 and 5004 to clear the registers 61 and 62, the memory cells 63 and the flags 64 in the CAMI 501, the CAMII 502 and the CAMIII 503 and to set (at ① of FIG. 43) the mode flag 512 at "0". As a result, the bus exchange control unit 508 joins the external data bus 506 and the internal data bus 504, and the external address bus 507 and the internal address bus 505 so that the data can be set from the outside. Next, the user sets (at ② of FIG. 43 which will be omitted) the data of one of the two work tables for the JOIN operation in the memory cells 63 of the CAMII 502. The following description is directed to the case in which the CAMII 502 is set with the data to be subjected to the JOIN operation whereas the CAMIII 503 is set with the data of the result of the JOIN operation. The control of the setting of the data in the memory cells 63 of the CAMII 502 is performed by the external access control unit 510. The user sets the data on the external data bus 506 and sends out the addresses, which are assigned to the memory cells 63 of the CAMII 502 to be stored with the data, to the external address bus 507, and transmits the write signal to the signal line 5023. The data and addresses are transmitted to the internal data bus 504 and the internal address bus 505 and further to the signal lines 5015 and 5014 of the CAMII 502. The external access control unit 510 generates the access control signal of the CAMII 502 for the signal line 5016 of the CAMII 502 to store the data in the memory cells 63 of the CAMII 502. Simultaneously with this, the set row number of the CAMII 502 is set (at ③) in the in-CAMII data volume storing register 522. This setting of the register 522 is conducted by the external access control unit 510 like the setting in the CAMII 502. In other words, the data is transmitted to the internal data bus 504 by sending out the data to be set to the external data bus 506. By setting the address, which is assigned to the in-CAMII data volume register 522, to the external address bus 507 and by transmitting the write signal to the signal line 5023, the external access control unit 510 generates the latch signal on the signal line 5011 of the in-memory data volume storing register 513 and incorporates the data on the internal data bus 504 through the signal line 5012.

Likewise, the data is stored by the access of the external access control unit 510, too, in the CAMI 501, the CAMIII 503, the in-CAMI data volume storing register 521, the in-CAMIII data volume storing register 523, the table indicating flag 511, the mode flag 512 and the mask data register 524. Moreover, the user sets (at ④ and ⑤) the CAMI 501 and the in-CAMI data volume storing register 524 with the remaining data for the JOIN operation and its row number, respectively.

After having set that data, the user stores (at ⑥ of FIG. 44 which will be omitted) the mask data register 524 with the variables (which should be referred to X and Z of FIG. 22) other than the common variable value of the two sets of data to be subjected to the JOIN operation, indicates the CAM (i.e., CAMII 502 in this instance) stored with the data for the JOIN operation as a partner of the JOIN operation of the CAMI 501 in the table indicating flag 511, and sets the mode flag 512 at "1" to start (at ⑧) the JOIN operation. When the mode flag 512 is set at "1", the bus exchange control unit 508 disconnects the external data bus 506 and the internal data bus 504, and the external address bus 507 and the internal address bus 505 but joins the signal line 5006 to the internal address bus 505 and sends out the address signal generated in the internal address generating unit 509. The main control unit 517 starts the control operations of the JOIN operation when the signal of the signal line takes the value "1" (i.e., in the internal operation mode). The main control unit 517 first generates the reset signal on the signal line 5007 to reset the internal address generating unit 509 (Incidentally, the reset content should be referred to the foregoing description of the internal address generating unit 509). After this, the main control unit 517 executes the JOIN operation in accordance with the operation principle which has been described with reference to FIG. 44.

The description to be made in the following is directed to the case in which the data for the JOIN operation is set in the CAMI 501 and the CAMII 502 so that the data volume set in the CAMI 501 is smaller than that set in the CAMII 502. First of all, the main control unit 517 incorporates the data volume storing registers in the CAMI 501 and the CAMII 502 through the signal line 5013 and compares their contents to write the content of the mask data register 524 in the mask data register 62 in the CAM having the more data volume. More specifically, the main control unit 517 generates the data sending signal on the signal line 5035 to send out the content of the mask data register 524 to the internal data bus 504 through the signal line 5034. Then, the main control unit 517 incorporates (at ⑨ of FIG. 45) the data into the CAMII 502 by generating the address of the mask data register 62 of the CAMII 502 and by transmitting the write signal to the signal line 5016 of the CAMII 502. Next, the main control unit 517 picks up the work table data, which is stored in the CAM having the less data volume, i.e., in the CAMI 501, row by row sequentially from the head and repeats the subsequent processings by a number of times indicated in the in-CAMI data volume storing register 521.

Figure 47:
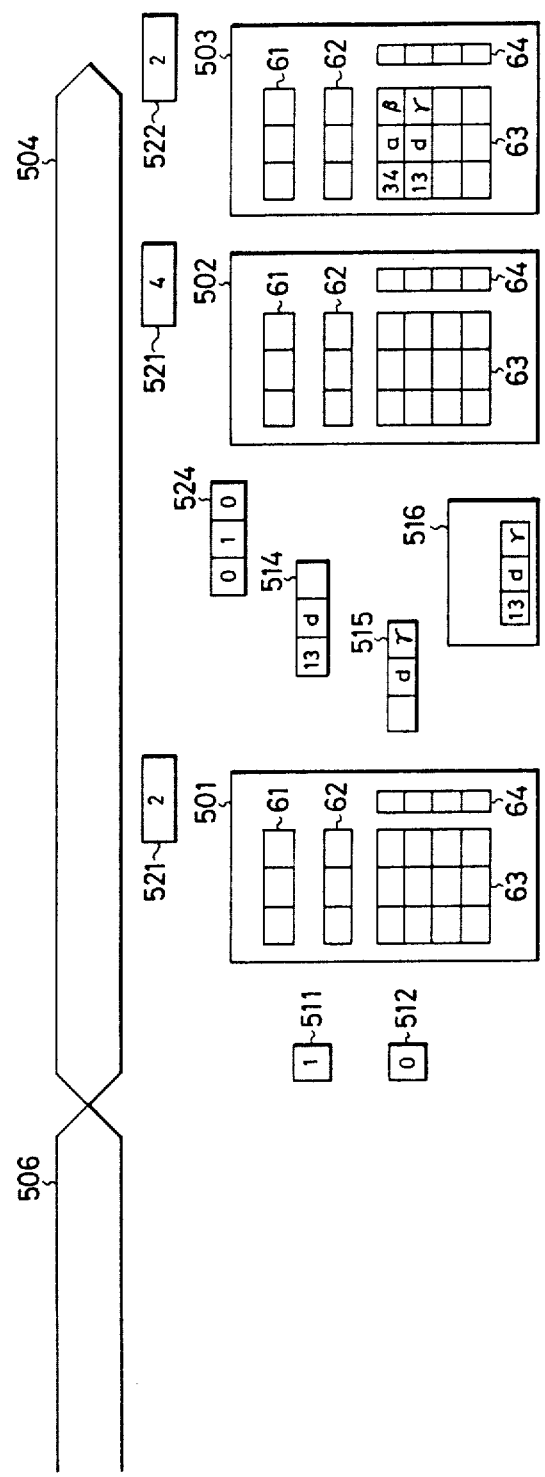
Figure 48:
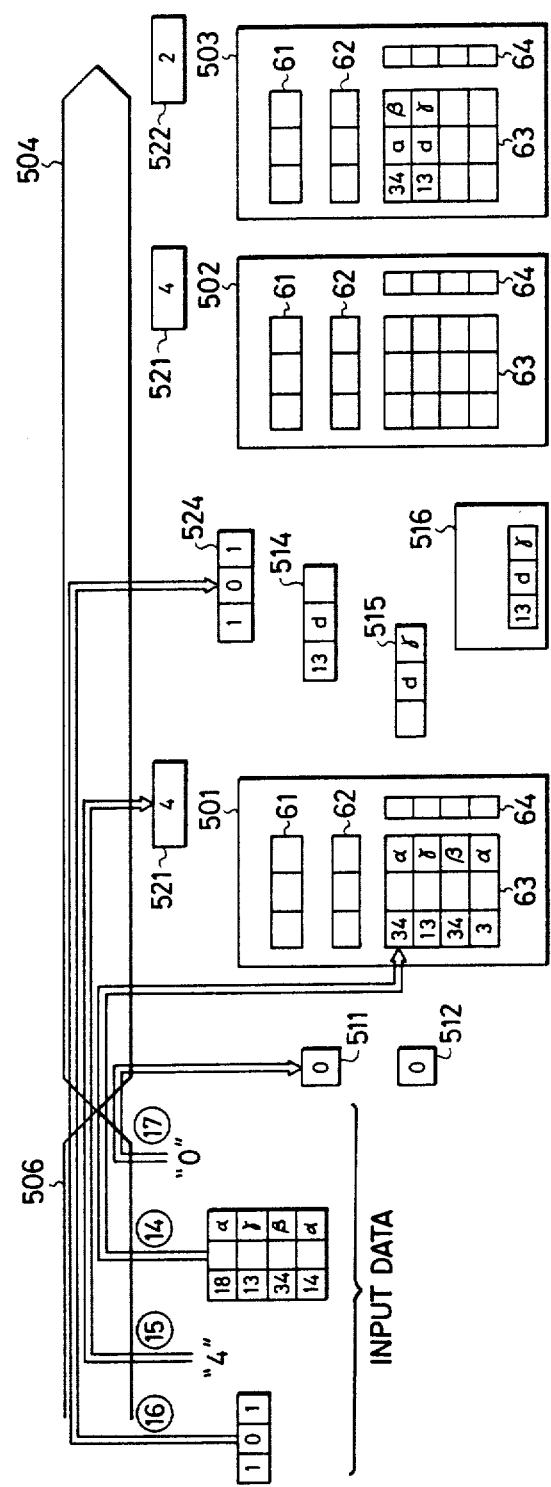

The main control unit 517 first clears the in-CAMIII data volume storing register 522 to zero. Then, the main control unit 517 transmits the control signal indicating the memory cell 63 of the CAMI 501 to the signal line 5005 and causes the internal address generating unit 509 to generate the address for accessing the memory cell 63 of the CAMI 501 (Incidentally, the address generating method should be referred to the foregoing description of the internal address generating unit 509). After this, the main control unit 517 generates the control signal of the memory read on a signal line 5010 to read out the content of the one row of the work table data, which is stored in the memory cell 63 of the CAMI 501, on the internal data bus 504. The data thus read is latched (at ⑩ of FIG. 45) in the retrieval data register 514 through the signal line 5025 by transmitting the latch signal to the signal line 5025 of the retrieval data register 514. Next, the main control unit 517 generates the data sending signal to the signal line 50282 to send out again the content of the retrieval data register 514 onto the internal data bus 504 through the signal line 50281. The data thus sent out is written in the retrieval data register 61 in the CAMII 502. More specifically, the main control unit 517 incorporates (at ⑪ of FIG. 45) the data into the CAMII 502 by generating the address of the retrieval data register 61 of the CAMII 502 and by transmitting the write signal to the signal line 5016 of the CAMII 502. The accessing procedures of the CAMII 502, the CAMIII 503 and other registers will not be described here because they are similar to the aforementioned ones. The main control unit 517 stores the data in the retrieval data register 61 of the CAMII 502 and then generates the retrieval signal on the signal line 5018 of the CAMII 502 to effect the associative retrievals. The main control unit 517 repeats the following operations, until the retrieval result signal (on the signal line 5019) of the CAMII 502 is turned off, and stores the result of the JOIN algorithm in the CAMIII 503. More specifically, the main control unit 517 turns on the retrieval signals (on the signal line 5018) sequentially to send out the retrieved result data onto the internal data bus 504 and to latch (at ⑫ of FIG. 46) the result data in the retrieval result register 515. After this, by combining the content of the retrieval data register 514 and the content of the retrieval result register 515 by the data combining unit 516 and by transmitting the sending signal to the signal line 5029, the data combined result is sent out to the internal data bus 504 through the signal line 5030. The data thus sent is stored (at ⑬ of FIG. 46) sequentially from the head of the memory cells 63 of the CAMIII 503. Incidentally, the storage address is generated by the internal address generating unit 509 in the aforementioned procedures. When in the data storing operation, moreover, the value of the in-CAMII data volume storing register 521 is counted up by the signal line 5032. If the operations thus far described are repeated a number of times indicated by the in-CAMI data volume storing register 521, the main control unit 517 generates the reset signal on the signal line 5017 of the CAMII 502 and on the signal line 5004 to clear the CAMII 502 and to reset the mode flag 512 at "0" (as shown in FIG. 47). This makes it possible again to access the inside of the system from the outside. Incidentally, the end of the JOIN algorithm is indicated when the external access control unit 510 transmits the interruption signal to the signal line 5024 at the switching instant of the mode flag 512 from "1" to "0". In case the result of the JOIN operation is picked up as it is, the content of the memory cell 63 of the CAMIII 503 determined by the content indicated by the table indicating flag 511 from the outside may be read out by a number of rows indicated in the in-CAMIII data volume storing register 522. The reading from the outside is controlled by the external access control unit 510, as has been described hereinbefore. In case three or more conditions are indicated in the IF parts of the rules of the rule based software so that the JOIN operation has to be executed again, moreover, the JOIN operation may be started by setting (at ⑭ of FIG. 48 which will be omitted) the CAMI 501 with the work table data incorporated for the third or later IFs, by setting (at ⑮) the row number (at ④) in the in-CAMI data volume storing register 521, by setting (at ⑯) the mask data in the mask data register 524, and by indicating (at ⑰) that CAM as a partner of the JOIN operation.

As has been described hereinbefore, according to the present embodiment, by picking up the retrieval data from the table data having a less data volume when in the JOIN operation, the number of times of the comparison processings can always be minimized to improve the processing speed of the rules.

As has been described hereinbefore, according to the present invention, the following advantages can be attained.

1. Since, simultaneously with the execution of the AND logic processing in the processings the IF-THEN rules, the processing of another rule can be executed so that the plural rules can be executed in parallel, it is possible to shorten the time period required for attaining a final conclusion from the rule start of the rule based system.

2. Since rows having coincident data can be sought from the two table data by the parallel retrieving functions of the associative memory system, the JOIN algorithm of the table data can be executed at a high speed.

3. The work data of high capacity can be processed at a high speed by the parallel retrieving functions of the associative memory system and by decomposing one of the two work tables to store the data in the associative memory system.

4. Since the two sets of table data for the JOIN algorithm are stored in the CAMs and since the retrieval data is picked up from such one of the two CAMs as has a less data volume, the number of times of the comparison processings can be minimized to execute the processings of the rules at a high speed.

As a result, the processing speed of the rules having variables can be drastically improved in the rule based system, and a highly readable, understandable and changeable logic describing method can be applied to a target system required to handle many statuses and a target system required to have a high response time.

What is claimed is:

1. A rule based multiprocessor system comprising:
   rule memory means for storing rules composed of conditions of facilities to be examined and conclusions describing control commands to be given for said facilities if said conditions are met;
   status memory means for storing the statuses of facilities and contents concluded by said rules;
   rule applying means for performing comparing processing of the data stored in said status memory means and the conditions stored in said rule memory means and for storing the conclusions of the rules meeting said conditions to determine a desired processing in accordance with said conclusions;
   and executing means for executing JOIN operation processing of said rules;
   wherein the improvement comprises said executing means including a plurality of JOIN operation executing means for executing JOIN operation processing of the rules in a pipeline manner;
   each of said plurality JOIN operation executing means including at least one buffer for latching a set of data which is composed of status data coincident with one condition described in a rule;
   associative memory means for latching another set of data which is composed of status data coincident with another condition described in a same rule;
   an output buffer for latching and outputting a result of a JOIN of data operation for generating a set of data composed of all of combination of said set of data and said another set of data, which have equal values corresponding to a common item of said one condition and said another condition;
   data combining means for replacing an item value of data in said set of data and said another set of data by a meaningful value to generate one data;
   retrieving means for retrieving data from said associative memory means by using data picked up sequentially from said at least one buffer as retrieval data and said common item as a retrieval key; and
   control means for executing repeatedly a series of operations from the retrieval processing of said retrieving means to the operation of storing in said output buffer a combined result of said retrieval and retrieved data combined by said combining means.

2. A rule based multiprocessor system according to claim 1, wherein said JOIN operation executing means executes judgement processing to determine whether or not all conditions in the rule are met when comparing said status data and said conditions.

3. A rule multiprocessor system according to claim 1 wherein:
   said plurality of JOIN operation executing means execute said JOIN operation processings of the rules in a pipeline manner such that, while a JOIN operation processing of an arbitrary one of said rules is being executed by one of said executing means, said comparing processing of data stored in said status memory means to conditions of another rule and JOIN operation processing of said another rule are being executed successively by said rule applying means and another of said plurality of JOIN operation executing means, and a JOIN operation processing is being executed by still another of said plurality of JOIN operation executing means to process said rules in parallel.

4. A rule based multiprocessor system according to claim 1 wherein said control means executes at least two JOIN operation continuously while exchanging said output buffer having an associative function and said associative memory means.

5. A rule based multiprocessor system according to claim 1, wherein said at least one buffer includes: a first input buffer for latching one of the two sets of said data; and a second input buffer for latching the other set of said data, wherein said associative memory means latches sequentially the decomposed data which are prepared by decomposing the data in said first input buffer, and wherein said retrieving means retrieves associatively the decomposed data, which are latched in said associative memory means, by using the data latched in said second input buffer as said retrieval data.

6. A rule based multiprocessor system according to claim 5, wherein said control means executes the JOIN operation continuously while exchanging said output buffer and said first input buffer.

7. A rule based multiprocessor system according to claim 1, wherein said input buffer includes a second associative memory means for latching such one of the two sets of said data as has a less data volume, and wherein said retrieving means retrieves associatively the data latched by said associative memory means by using the data latched in said second associative memory means as said retrieval data.

8. A rule based multiprocessor system according to claim 6, wherein said control means executes the JOIN operation continuously while exchanging said output buffer having the associative memory function and said associative memory means.

9. A rule based multiprocessor system according to claim 1, wherein said data combining means retrieves data latched in said associative memory means by using the data latched in said at least one buffer and said status data latched in said output buffer.

* * * * *